(12) United States Patent
Matsutani et al.

(10) Patent No.: US 7,408,587 B2
(45) Date of Patent: Aug. 5, 2008

(54) IMAGE CONVERSION DEVICE, IMAGE CONVERSION METHOD AND DATA CONVERSION CIRCUIT AS WELL AS DIGITAL CAMERA

(75) Inventors: Takashi Matsutani, Osaka (JP); Gen Sasaki, Osaka (JP)

(73) Assignee: Mega Chips Corporation, Osaka-shi (JP)

( * ) Notice: Subject to any disclaimer, the term of this patent is extended or adjusted under 35 U.S.C. 154(b) by 322 days.

(21) Appl. No.: 11/226,387

(22) Filed: Sep. 15, 2005

(65) Prior Publication Data

US 2006/0007353 A1    Jan. 12, 2006

Related U.S. Application Data

(62) Division of application No. 10/103,795, filed on Mar. 25, 2002, now abandoned.

(30) Foreign Application Priority Data

| Mar. 26, 2001 | (JP) | 2001-087837 |
| Jun. 1, 2001 | (JP) | 2001-166787 |
| Sep. 27, 2001 | (JP) | 2001-297101 |

(51) Int. Cl.
  *H04N 7/01* (2006.01)
  *H04N 11/12* (2006.01)

(52) U.S. Cl. ........................ 348/441; 348/494

(58) Field of Classification Search ................. 348/441, 348/494
  See application file for complete search history.

(56) References Cited

U.S. PATENT DOCUMENTS

| 5,521,637 A | * | 5/1996 | Asaida et al. ........... 348/222.1 |
| 5,801,665 A | | 9/1998 | Zhaog et al. |
| 6,005,546 A | | 12/1999 | Keene |
| 6,005,632 A | * | 12/1999 | Cahill, III .................... 348/465 |
| 6,031,937 A | * | 2/2000 | Graffagnino ................ 382/236 |
| 6,101,038 A | | 8/2000 | Hebert et al. |

(Continued)

FOREIGN PATENT DOCUMENTS

JP    6-105805    4/1994

(Continued)

*Primary Examiner*—Lin Ye
*Assistant Examiner*—Hung H Lam
(74) *Attorney, Agent, or Firm*—Oblon, Spivak, McClelland, Maier & Neustadt, P.C.

(57) ABSTRACT

An image conversion device is provided with a first buffer area for storing either one of even field and odd field of inputted dot sequential data and a second buffer area for storing the other thereof. A data transfer control circuit controls in such a manner that, during a period in which one of the two fields is written in the first buffer area, the other field, stored in the second buffer area, is read out in a color field sequential format, and during a period in which the other field is written in the second buffer area, the other field, stored in the first buffer area, is read out in a color field sequential format. A pixel interpolating circuit carries out an insertion-interpolating process on the field read out from the image storing unit, and outputs the resulting data. Thus, it becomes possible to prevent color breaking at the time of displaying motion images on a color field sequential type display by using a buffer area having a capacity of one frame.

6 Claims, 41 Drawing Sheets

U.S. PATENT DOCUMENTS

| | | | |
|---|---|---|---|
| 6,212,234 B1 | 4/2001 | Andoh et al. | |
| 7,158,178 B1 * | 1/2007 | Acharya | 348/280 |
| 2004/0201767 A1 | 10/2004 | Niikawa et al. | |
| 2005/0151745 A1 * | 7/2005 | Ford et al. | 345/501 |

FOREIGN PATENT DOCUMENTS

| | | |
|---|---|---|
| JP | 8-248381 | 9/1996 |
| JP | 10-23448 | 1/1998 |
| JP | 10-84557 | 3/1998 |
| JP | 11-103407 | 4/1999 |

* cited by examiner

FIG. 9

| FIG.10 | FIG.11 |

F I G. 13
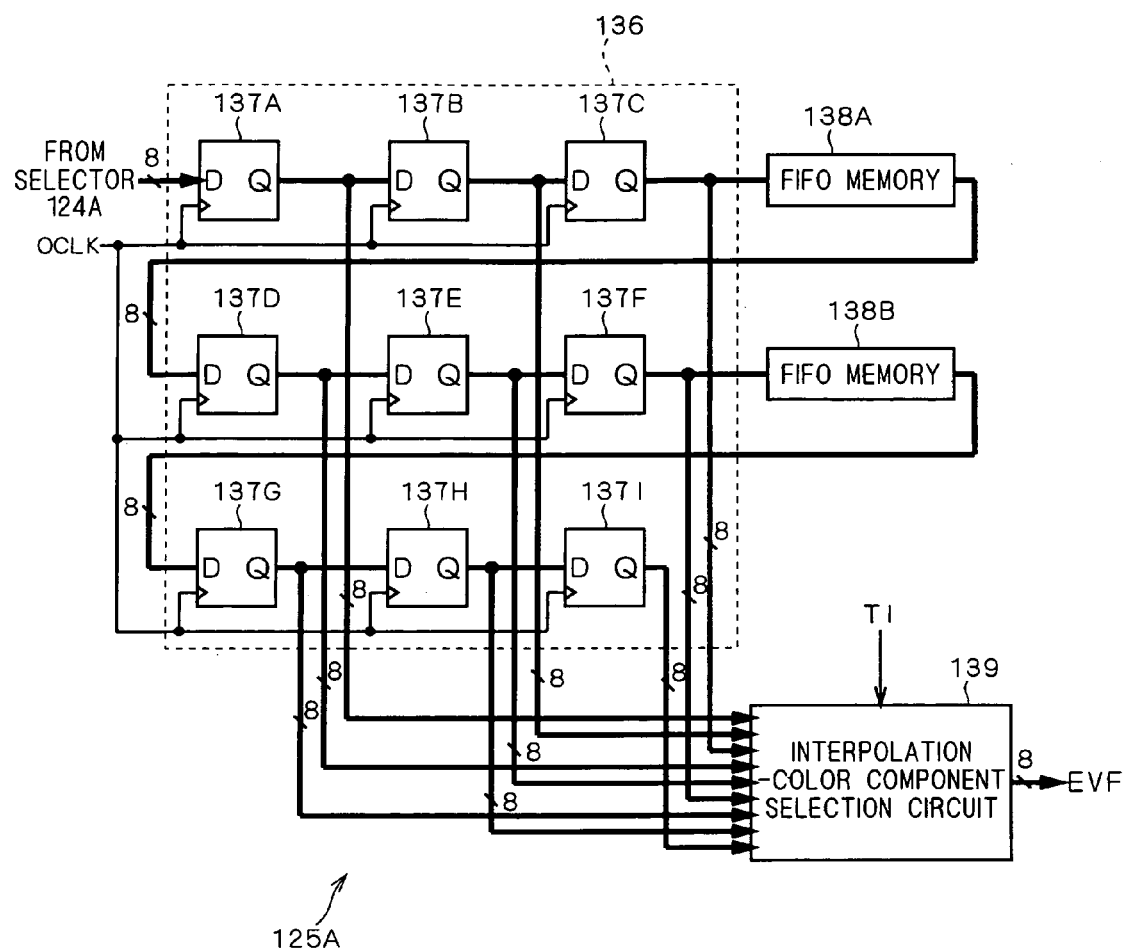

FIG. 18

| FIG.19 | FIG.20 |

FIG. 28

| FIG.26 | FIG.27 |

FIG. 29

HORIZONTAL PIXEL DIRECTION →

VERTICAL PIXEL DIRECTION ↓

| Y | U | Y | U | Y | U | Y | U | Y | U |
|---|---|---|---|---|---|---|---|---|---|
| V | Y | V | Y | V | Y | V | Y | V | Y |
| Y | U | Y | U | Y | U | Y | U | Y | U |
| V | Y | V | Y | V | Y | V | Y | V | Y |
| Y | U | Y | U | Y | U | Y | U | Y | U |
| V | Y | V | Y | V | Y | V | Y | V | Y |
| Y | U | Y | U | Y | U | Y | U | Y | U |
| V | Y | V | Y | V | Y | V | Y | V | Y |

| X | A | X |
|---|---|---|
| B | Z | C |
| X | D | X |

|  |  | ,-242 |
|---|---|---|
| A(0,0) | A(0,1) | A(0,2) |
| A(1,0) | A(1,1) | A(1,2) |
| A(2,0) | A(2,1) | A(2,2) |

FIG. 32

|  |  | ,-242A |
|---|---|---|
| -1 | 2 | -1 |
| -1 | 2 | -1 |
| -1 | 2 | -1 |

FIG. 33

|  |  | ,-242B |
|---|---|---|
| -1 | -1 | -1 |
| 2 | 2 | 2 |
| -1 | -1 | -1 |

FIG. 37

|   |   |   |
|---|---|---|
| 1 | 1 | 1 |
| 0 | 0 | 0 |
| −1 | −1 | −1 |

|   |   |   |
|---|---|---|
| 0 | 1 | 1 |
| −1 | 0 | 1 |
| −1 | −1 | 0 |

|   |   |   |
|---|---|---|
| 1 | 1 | 0 |
| 1 | 0 | −1 |
| 0 | −1 | −1 |

242H

| FIG.41 | FIG.42 |

F / G. 49
Background Art
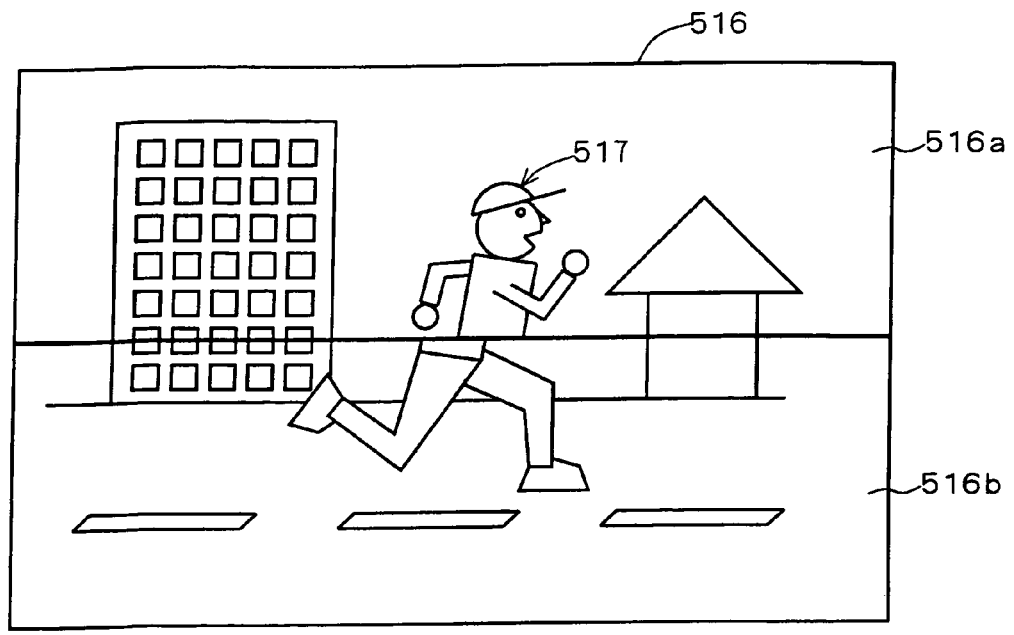
F / G. 50
Background Art
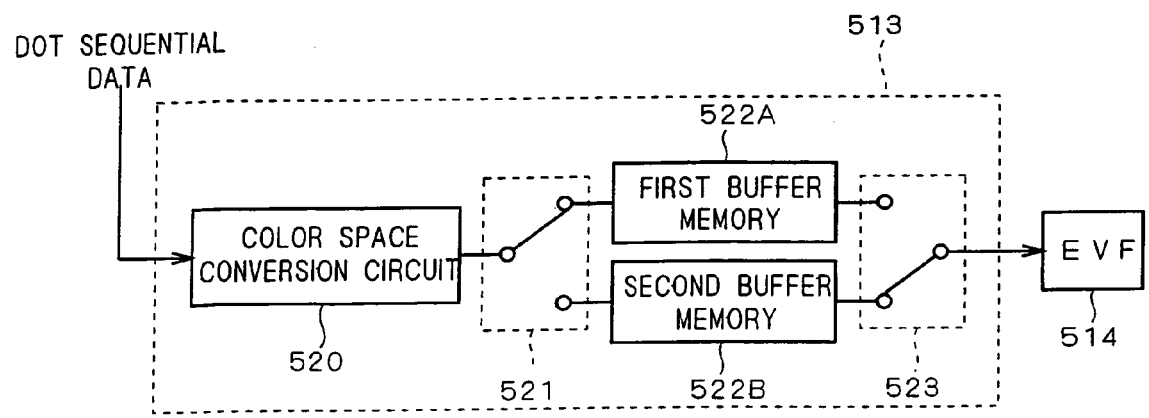

IMAGE CONVERSION DEVICE, IMAGE CONVERSION METHOD AND DATA CONVERSION CIRCUIT AS WELL AS DIGITAL CAMERA

BACKGROUND OF THE INVENTION

1. Field of the Invention

The present invention relates to a data conversion circuit for converting a component array, etc. of image data in an image processing device such as a digital camera.

2. Description of the Related Art

FIG. 44 is a block diagram that shows a schematic construction of a digital camera. In this digital camera, light that has passed through an optical system 500 is detected by a CCD image-pickup element 501 and converted to an analog signal. An analog signal processing unit 502 subjects the analog signal inputted from CCD image-pickup element 501 to a gain adjusting process and an A/D converting process so as to generate a digital signal (Raw Image Data), and outputs this signal to an image processing unit 503. An image processing unit 503 has subjected the raw image data to digital image processing such as a pixel interpolating process, an edge emphasizing process and a color space converting process and outputs processed data. And the processed data are transferred to a buffer area in a main memory 506, and stored therein. A CPU 507 carries out controlling processes so that the image data stored in the buffer area are read out to be subjected to a software process, and the read-out image data are compressed and encoded in a compression-expansion processing unit 510 to be recorded in an IC memory through a card interface 508. Here, CCD image-pickup element 501 is driven by a CCD driving unit 504. Moreover, a timing generator 505 generates signals for adjusting operation timings of CCD image-pickup sensor 501, analog signal processing unit 502 and image processing unit 503, and supplies these signals thereto.

Moreover, this digital camera is provided with two kinds of display devices that electronically display picked-up image data. One of these is an LCD (Liquid Crystal Display) device 511 having a comparatively large screen that is placed on a back face, etc. of a digital camera, and the other is an electronic view finder 514 (hereinafter, referred to as EVF) that is attached to an eye piece portion of a digital camera. A color field sequential display, which displays one frame in a color field sequential format, is used as a color field sequential display. In this application, each "field" consists of plural color pixels in a dot sequential format, and each "color field" consists of only single-color pixels in a color field sequential format. The user is allowed to select either one of the display devices by operating a switching button (not shown), etc., placed on the digital camera. When image data are displayed on these display devices as motion images, CPU 507 carries out controlling processing so as to successively output image data with a low resolution from image processing unit 503, and transfers the image data to a display signal processing unit 509 through a bus 515. When motion images are displayed on LCD device 511, display signal processing unit 509 converts the image data to picture signals such as analog RGB signals, and outputs the resulting signals to LCD device 511. LCD device 511 displays motion images by driving a liquid crystal panel and a backlight based upon the inputted picture signals. And, picture signals, outputted from display signal processing unit 509, can be transferred to an external TV monitor through a cable 512, and displayed as motion images.

When motion images are displayed on EVF514, display signal processing unit 509 transfers image data inputted through bus 515 to a data conversion circuit 513. Three primary color components of R (red), G (green), B (blue) per pixel, or three components of Y (luminance component), Cb (color difference component), Cr (color difference component) per pixel, are outputted from image processing unit 503 in a dot sequential format, and data conversion circuit 513 converts data in a dot sequential format (hereinafter, referred to as dot sequential data) formed by arranging respective components of transferred image data on a pixel basis to data in a color field sequential format (hereinafter, referred to as color field sequential data) that are arranged on a frame basis, and outputs the resulting data to EVF514. FIG. 45 is an explanatory drawing that schematically shows image data in a dot sequential format of R, G, B. As shown in this Figure, one frame is transferred in the order of R[0, 0], G[0, 0], B[0, 0], R[1, 0], G[1, 0], B[1, 0], . . . , R[i, j], G[i, j], B[i, j] . . . , R[w−1, h−1], G[w−1, h−1], B[w−1, h−1] (i: horizontal pixel number, j: horizontal line number). Moreover, FIG. 46 is an explanatory drawing that schematically shows image data in a color field sequential format of R, G, B. As shown in this Figure, one frame is transferred in the order of R[0, 0], . . . , R[w−1, h−1], G[0, 0], . . . , G[w−1, h−1], B[0, 0], . . . , B[w−1, h−1]. In other words, R field containing only R[0, 0], . . . , R[w−1, h−1], G field containing only G[0, 0], . . . , G[w−1, h−1], and B field containing only B[0, 0], . . . , B[w−1, h−1], are transferred in this order.

A data conversion circuit 513 is provided with a buffer memory having a capacity of at least one frame, and inputted dot sequential data of one frame are stored in the buffer memory, read out in a color field sequential format, and outputted to EVF514 at a high frame rate.

For example, in the case when the dot sequential data are constituted by three components, each color having 8-bits, it is necessary to provide a buffer memory having a capacity of total pixel number×3 bytes. However, in the case when a buffer memory has only the capacity of one frame, during a process in which dot-sequential data are written in the buffer memory, color field sequential data might be read out from the buffer memory. Since EVF514 acquires respective color fields in time series, it is susceptible to a problem, so-called "color breaking" phenomenon, in which a moving subject tends to be displayed at different positions in respective color fields.

FIG. 47 is a schematic explanatory drawing that shows one example of data conversion circuit 513 which converts dot sequential data to color field sequential data. Data conversion circuit 513 successively stores inputted dot sequential pixel data in a frame memory 536, and reads out the stored pixel data with address-specification so as to be outputted in a color field sequential format, and outputs the resulting data. Consequently, data conversion circuit 513 outputs R field 538R consisting of only R component, G field 538G consisting of only G component, and B field 538B consisting of only B component.

However, it has been known that the color field sequential data outputted from the above-mentioned data conversion circuit 513 tends to cause a phenomenon referred to as "color breaking" on EVF514 that is a color field sequential display. This "color breaking" is a phenomenon in which, since a color field sequential display acquires respective color fields in time series, a moving subject is displayed at different positions in respective color fields. Referring to FIG. 48, one example of this phenomenon will be explained. As shown in this Figure, when a subject image 539 having a single white color is changed to a subject image 560 containing a black area 561, it sometimes happens that an R field ends at a writing position L1, while a G field ends at a writing position L2. In this case, in a color field sequential display, the above-mentioned black area 561 is displayed as a first area 561a in which three color components of R, G, B are completely dark, a second area 561b with a red color with only the respective color components of G, B being dark and a third area 561c with a yellow color with only B component being dark, with horizontal line positions L1D, L2D appearing as borders.

Moreover, upon displaying dot sequential data on a display device such as EVF514, when an interlace display is converted to a progressive display, or when a frame is outputted in response to a display speed of the display device, a so-called frame-rate conversion is carried out. However, when the frame rate conversion is carried out using a buffer memory having a capacity of one frame, as shown in FIG. 49, a problem arises in which a so-called "positional offset" phenomenon in which the upper portion 516a and the lower portion 516b of a display image 516 appear with an offset tends to occur.

In order to reduce such phenomena buffer memories having a capacity of 2 frames can be prepared. FIG. 50 is a schematic drawing that shows a data conversion circuit 513 having buffer memories 522A, 522B of 2 frames. In this data conversion circuit 513, a color space conversion circuit 520 converts color space of inputted point-sequential data to RGB space to be outputted. Dot sequential data outputted from this color space conversion circuit 520 are controlled by a writing control unit 521 so as to be written in either one of a first buffer memory 522A and a second buffer memory 522B. Moreover, a reading control unit 523 carries out controlling operations so that, during a period in which dot sequential data are written in either one of buffer memories 522A and 522B, color field sequential data are read from the other buffer memory 522A or 522B at a high frame rate, and outputted to EVF514.

However, in data conversion circuit 513 shown in FIG. 50, buffer memories of 2 frames need to be prepared. This causes an increase in power consumption of circuits, and subsequent difficulties in using a digital camera continuously for a long time. Moreover, this makes a circuit scale larger, resulting in an increase in costs.

SUMMARY OF THE INVENTION

According to a first aspect of the present invention, an image conversion device, which converts image data from dot sequential data to color field sequential data, comprises: an image storing unit which has a first buffer area for storing either one of odd and even fields and a second buffer area for storing the other field of the odd and even fields, the odd field consisting of odd-numbered lines of the dot sequential data, the even field consisting of even-numbered lines of the dot sequential data; and a data transfer control circuit which carries out such controlling operations that, during a period in which the dot sequential data are written in one of the first and second buffer areas, pixel data of the even field or the odd field stored in the other buffer area are read out in a color field sequential format.

According to a second aspect of the present invention, the image conversion device, which relates to the first aspect of the present invention, further comprises: a pixel interpolating circuit which generates and outputs pixel interpolation data formed by carrying out an interpolating process between respective lines of color field sequential data read from the buffer area.

According to a third aspect of the present invention, the image conversion device, which relates to the first or second aspect of the present invention, further comprises: a color-space conversion circuit for color-space converting the dot sequential data; and a sub-sampling circuit for sub-sampling dot sequential data outputted from the color-space conversion circuit to output the resulting data to the image storing unit.

According to a fourth aspect of the present invention, the image conversion device, which relates to any one of the first aspect to the third aspect, further comprises: an over-sampling circuit for over-sampling color field sequential data read from the image storing unit; and a second color space conversion circuit for carrying out color-space conversion on color field sequential data outputted from the over-sampling circuit.

According to a fifth aspect of the present invention, the image conversion device, which relates to any one of the first aspect to the fourth aspect, further comprises: an intra-frame determining circuit which makes a determination as to whether or not dot sequential data to be inputted to the image storing unit are coincident with dot sequential data stored in the image storing unit on a frame basis; and an operation mode control circuit which controls the data transfer control circuit based upon the results of determination of the intra-frame determination circuit, and in this arrangement, under control of the operation mode control circuit, when the intra-frame determining circuit has made a determination as non-coincidence, the data transfer control circuit proceeds to a motion image display mode to carry out such a controlling operation that, during a period in which the odd field or the even field is written in one of the first and second buffer areas, the even field or the odd field stored in the other buffer area is read out in a color field sequential format, and when the intra-frame determining circuit has made a determination as coincidence, the data transfer control circuit proceeds to a still image display mode to carry out such a controlling operation that the even field and the odd field stored in the first and second buffer areas are read out in a color field sequential format on a frame basis.

According to a sixth aspect of the present invention, an image conversion method, which converts image data from dot sequential data to color field sequential data, comprises the steps of: (a) alternately storing an odd field consisting of odd numbered lines of the dot sequential data and an even field consisting of even numbered lines of the dot sequential data respectively in first and second buffer areas; and (b) during a period in which the odd field or the even field is written in one of the buffer areas in the process (a), reading pixel data of the even field or the odd field stored in the other buffer area in a color field sequential format.

According to a seventh aspect of the present invention, the image conversion method, which relates to the sixth aspect, further comprises the step of: (c) generating and outputting pixel interpolating data formed by carrying out an interpolating process on color field sequential data read from the buffer area in the step (b).

According to an eighth aspect of the present invention, in the image conversion method which relates to the sixth or seventh aspect, the step (a) comprises the step of: (a-1) color-space converting the dot sequential data to sub-sample and store the resulting data in the buffer areas.

According to a ninth aspect of the present invention, in the image conversion method which relates to any one of the sixth to eighth aspect, the step (c) comprises the step of: (c-1) over-sampling the image data read from the buffer area to color-space convert the resulting data.

According to a tenth aspect of the present invention, in the image conversion method which relates to any one of the sixth to ninth aspects, the step (a) further comprises the steps of: (a-2) making a determination as to whether or not the dot sequential data to be inputted are coincident with dot sequential data stored in the buffer area on a frame basis; (a-3) upon determination as non-coincidence at the step (a-2), proceeding to a motion image display mode for executing the step (b); and (a-4) upon determination as coincidence at the step (a-2), proceeding to a still image display mode in which the even field and the odd field stored in the first and second buffer areas are read out in color field sequential format on a frame basis.

According to an eleventh aspect of the present invention, a data conversion circuit, which converts a color component array of image data to a color field sequential format, comprises: first buffer memory and second buffer memory that alternately store on a frame basis or on a field basis pixel data having a single color component in each pixel; control means which carries out such controlling operations that, during a period in which the pixel data are stored in one of the first buffer memory and the second buffer memory, the pixel data stored in the other are selectively read and outputted; and an interpolating unit which, using pixel data in a specific area outputted from the first buffer memory and the second buffer memory by the control means, executes a pixel interpolating process to generate interpolated data having a plurality of color components in each pixel, and outputs the interpolated data to a color field sequential display in a field sequential color-component array.

According to a twelfth aspect of the present invention, the data conversion circuit, which relates to the eleventh aspect, further comprises: a resolution conversion unit which resolution-converts the image data so as to fit to capacity of the first buffer memory and the second buffer memory, and then outputs the resulting data to the first buffer memory and the second buffer memory.

According to a thirteenth aspect of the present invention, the data conversion circuit, which relates to the eleventh or twelfth aspect, further comprises: a signal conversion circuit which receives dot sequential data having a plurality of color components in each pixel as input data, and converts the dot sequential data to pixel data having a single color component in each pixel.

According to fourteenth aspect of the present invention, the data conversion circuit, which relates to the thirteenth aspect, further comprises: a selector which selects either of pixel data having a single color component in each pixel and pixel data of the dot sequential data as converted and outputted by the signal conversion circuit, to output the resulting data to the first buffer memory and the second buffer memory.

According to a fifteenth aspect of the present invention, the data conversion circuit, which relates to the thirteenth or fourteenth aspect, further comprises: a second selector which selects either of the dot sequential data having a plurality of color components in each pixel and pixel data of the dot sequential data as converted and outputted by the signal conversion circuit to output the resulting data to the first buffer memory and the second buffer memory, each of the first buffer memory and the second buffer memory having a capacity corresponding to at least a half of one frame of the dot sequential data, and in this arrangement, when the second selector selects and outputs the dot sequential data, the control means carries out such controlling operations that, during a period in which either of an odd field consisting of odd numbered lines of the dot sequential data and an even field consisting of even numbered lines of the dot sequential data is stored in either of the first buffer memory and the second buffer memory, the other field stored in the other of the first buffer memory and the second buffer memory is read out, and also in this arrangement, the interpolating unit generates interpolated data formed by interpolating an insufficient field to the read-out odd field or even field, and outputs the resulting interpolated data to a color field sequential display in the field sequential color-component array.

According to a sixteenth aspect of the present invention, in the data conversion circuit which relates to any one of the eleventh to fifteenth aspects, the interpolating unit comprises a color space conversion circuit for executing a color space converting operation by using a variable conversion coefficient.

According to a seventeenth aspect of the present invention, in the data conversion circuit which relates to any one of the eleventh to sixteenth aspects, the interpolating unit comprises an on-screen display circuit for multiplexing the interpolated data, character information and graphic information.

According to an eighteenth aspect of the present invention, the data conversion circuit which relates to any one of the eleventh to seventeenth aspects further comprises a gamma correction circuit provided at a stage prior to the first buffer memory and the second buffer memory for carrying out a gamma conversion process on inputted image data.

According to a nineteenth aspect of the present invention, the data conversion circuit which relates to any one of the eleventh to eighteenth aspects further comprises an OB correction circuit provided at a stage prior to the first buffer memory and the second buffer memory for correcting a luminance level of the image data based upon a luminance level acquired from an OB (optical black) area of inputted image data.

According to a twentieth aspect of the present invention, the data conversion circuit which relates to any one of the eleventh to nineteenth aspects further comprises a gain correction circuit provided at a stage prior to the first buffer memory and the second buffer memory for adjusting gain of image data.

According to a twenty-first aspect of the present invention, the data conversion circuit which relates to any one of the eleventh to twelfth aspects further comprises a WB correction circuit provided at a stage prior to the first buffer memory and the second buffer memory for adjusting white balance of inputted image data.

According to a twenty-second aspect of the present invention, the data conversion circuit which relates to any one of the eleventh to twenty-first aspects further comprises an AF evaluation circuit provided at a stage prior to the first buffer memory and the second buffer memory for calculating an AF (auto-focus) evaluation value based upon inputted image data.

According to a twenty-third aspect of the present invention, a digital camera comprises: an image-pickup sensor having a color-filter array of a single-chip type; an A/D conversion circuit which generates and outputs raw image data having only a single color component in each pixel by A/D converting an image signal outputted from the image-pickup sensor; an image processing unit which generates and outputs dot sequential data having a plurality of color components in each pixel by image-processing the raw image data; a color field sequential display for displaying color field sequential data formed by arranging image data for each color component on a frame basis or on a field basis; and a data conversion circuit which converts the color component array of image data to a color field sequential format, and outputs the resulting data to color field sequential display, and in this arrangement, the data conversion circuit comprises: a first buffer memory and a second buffer memory that alternately store the raw image data on a frame basis or on a field basis; control means which carries out such control operations that, during a period in which the raw image data are stored in one of the first buffer memory and the second buffer memory, pixel data stored in the other are selectively read and outputted; and an interpolating unit which generates data having a plurality of color components in each pixel by carrying out a pixel interpolating process using pixel data in a specific area outputted from the first buffer memory and the second buffer memory by the control means, and outputs the interpolated data to the color field sequential display in a field sequential color component array.

According to a twenty-fourth aspect of the present invention, in the digital camera which relates to the twenty-third aspect, the color field sequential display forms a view finder.

According to a twenty-fifth aspect of the present invention, in the digital camera which relates to the twenty-third or twenty-fourth aspect, the data conversion circuit further comprises a resolution conversion unit which resolution-converts the raw image data so as to fit to capacity of the first buffer memory and the second buffer memory, and then outputs the resulting data to the first buffer memory and the second buffer memory.

According to a twenty-sixth aspect of the present invention, in the digital camera which relates to any one of the twenty-third to twenty-fifth aspects, the data conversion circuit comprises a signal conversion circuit which receives dot sequential data having a plurality of color components in each pixel as input data, and converts the dot sequential data to data in a raw image format having a single color component in each pixel so as to output the resulting data; and the control means carries out such controlling operations that the data in the raw image format are alternately stored in the first buffer memory and the second buffer memory on a frame basis or on a field basis, and so that, during a period in which the data in the raw image format are stored in one of the first buffer memory and the second buffer memory, pixel data stored in the other are selectively read and outputted.

According to a twenty-seventh aspect of the present invention, in the digital camera which relates to the twenty-sixth aspect, the data conversion circuit comprises a selector which selects either of the raw image data and the data in the raw image format outputted from the signal conversion circuit to output the resulting data to the first buffer memory and the second buffer memory.

According to a twenty-eighth aspect of the present invention, in the digital camera which relates to the twenty-sixth or twenty-seventh aspect, the data conversion circuit comprises a second selector which selects either of the dot sequential data having a plurality of color components in each pixel and the data in the raw image format outputted from the signal conversion circuit, and outputs the resulting data to the first buffer memory and the second buffer memory, each of the first buffer memory and the second buffer memory having a capacity corresponding to at least a half of one frame of the dot sequential data, and in this arrangement, when the second selector selects and outputs the dot sequential data, the control means carries out such controlling operations that, during a period in which either of an odd field consisting of odd numbered lines of the dot sequential data and an even field consisting of even numbered lines of the dot sequential data is stored in either of the first buffer memory and the second buffer memory, the other field stored in the other of the first buffer memory and the second buffer memory is read out, and wherein the interpolating unit generates interpolated data formed by interpolating an insufficient field to the read-out odd field or the even field, and outputs the interpolated data to a color field sequential display in the field sequential color-component array.

According to a twenty-ninth aspect of the present invention, in the digital camera which relates to any one of the twenty-third to twenty-eighth aspects, the interpolating unit comprises a color space conversion circuit for executing a color space converting operation by using a variable conversion coefficient.

According to a thirtieth aspect of the present invention, in the digital camera which relates to any one of the twenty-third to twenty-ninth aspects, the interpolating unit comprises an on-screen display circuit for multiplexing the interpolated data, character information and graphic information.

According to a thirty-first aspect of the present invention, in the digital camera which relates to any one of the twenty-third to thirtieth aspects, the data conversion circuit comprises a gamma correction circuit provided at a stage prior to the first buffer memory and the second buffer memory for carrying out a gamma conversion process on inputted image data.

According to a thirty-second aspect of the present invention, in the digital camera which relates to any one of the twenty-third to thirty-first aspects, the data conversion circuit comprises an OB correction circuit provided at a stage prior to the first buffer memory and the second buffer memory for correcting a luminance level of the image data based upon a luminance level acquired from an OB (optical black) area of inputted image data.

According to a thirty-third aspect of the present invention, in the digital camera which relates to any one of the twenty-third to thirty-second aspects, the data conversion circuit comprises a gain correction circuit provided at a stage prior to the first buffer memory and the second buffer memory for adjusting gain of image data.

According to a thirty-fourth aspect of the present invention, in the digital camera which relates to any one of the twenty-third to thirty-third aspects, the data conversion circuit comprises a WB correction circuit provided at a stage prior to the first buffer memory and the second buffer memory for adjusting white balance of inputted image data.

According to a thirty-fifth aspect of the present invention, in the digital camera which relates to any one of the twenty-third to thirty-fourth aspects, the data conversion circuit comprises an AF evaluation circuit provided at a stage prior to the first buffer memory and the second buffer memory for calculating an AF evaluation value based upon inputted image data.

According to a thirty-sixth aspect of the present invention, a data conversion circuit comprises: a sampling unit for sampling input image data having a plurality of components per pixel to output image data having a single component in each pixel; a key signal calculation unit for calculating a key signal having a value corresponding to a correlation state between a specific pixel of the input image data and surrounding pixels thereof; writing control means which carries out such controlling operations that image data outputted from the sampling unit and the key signal are stored in a buffer memory on a frame basis or on a field basis; reading control means which carries out controlling operations so that the image data and the key signal stored in the buffer memory are read out on a frame basis or on a field basis; and an interpolating unit which carries out a pixel interpolating process for interpolating a plurality of components in each pixel to the image data read out by the reading control means in accordance with a value of the key signal to output interpolated data obtained by the pixel interpolating process to a display device.

According to a thirty-seventh aspect of the present invention, in the data conversion circuit which relates to the thirty-sixth aspect, the writing control means makes the buffer memory store combined data formed by combining the image data outputted from the sampling unit with the key signal, and the interpolating unit carries out the pixel interpolating process on the image data obtained by separating the combined data read from the buffer memory by the reading control means.

According to a thirty-eighth aspect of the present invention, in the data conversion circuit which relates to the thirty-sixth aspect, the writing control means makes the buffer memory store data formed by including the key signal in low bit position of the image data outputted from the sampling unit in the buffer memory, and the interpolating unit extracts the image data and the key signal from data read from the buffer memory by the reading control means, and executes the pixel interpolating process.

According to a thirty-ninth aspect of the present invention, in the data conversion circuit which relates to any one of the thirty-sixth to thirty-eighth aspects, the buffer memory comprises a first buffer memory and a second buffer memory, the writing control means carries out such controlling operations that the image data and the key signal are stored in the first buffer memory and the second buffer memory, alternately, on a frame basis or on a field basis, the reading control means carries out such controlling operations that, during a period in which data are written in either one of the first buffer memory and the second buffer memory, data stored in the other memory are read out on a frame basis or on a field basis, and the interpolating unit generates the interpolated data in a color field sequential format that are formed by arranging the respective components on a frame basis or on a field basis from the image data in a dot sequential format in which the respective components are arranged on a pixel basis.

According to a fortieth aspect of the present invention, in the data conversion circuit which relates to the thirty-ninth aspect, the interpolating unit generates the interpolated data in a color field sequential format at a frame rate different from a frame rate of the input image data.

According to a forty-first aspect of the present invention, in the data conversion circuit which relates to the thirty-sixth to thirty-eighth aspects, the buffer memory comprises a first buffer memory and a second buffer memory, the writing control means carries out such controlling operations that the image data and the key signal are stored in the first buffer memory and the second buffer memory, alternately, on a frame basis or on a field basis, the reading control means carries out such controlling operations that, during a period in which data are written in either one of the first buffer memory and the second buffer memory, data stored in the other memory are read out on a frame basis or on a field basis, and the interpolating unit carries out the pixel interpolating process at a frame rate different from a frame rate of the input image data to output the interpolated data.

As described above, in accordance with the image conversion device of the first aspect and the image conversion method of the sixth aspect of the present invention, the dot sequential data can be converted to the color field sequential data by using the image storing unit having a buffer area corresponding to one frame; therefore, in comparison with related art that has used buffer areas corresponding to 2 frames, it becomes possible to make the circuit scale smaller, to reduce the power consumption and also to cut the production costs.

In accordance with the second aspect and the seventh aspect, the color field sequential data obtained by carrying out the interpolating process on odd fields and the color field sequential data obtained by carrying out the interpolating process on even fields are alternately outputted; therefore, it becomes possible to output motion image data with high precision that are free from color breaking at the time of reproducing motion images.

Moreover, in accordance with the third aspect and the eighth aspect, the capacity of dot sequential data to be stored in the image storing unit can be reduced. For example, when the dot sequential data are converted from the RGB color space to the YCbCr color space and the ratio of YCbCr is converted to 4:2:2 through sub-sampling, the buffer area can be reduced to approximately ⅔.

In accordance with the fourth aspect and the ninth aspect, the image data that have been subjected to the color space conversion and the sub-sampling can be returned to the original color space, and outputted.

In accordance with the fifth aspect and the tenth aspect, during the motion image display mode, the color field sequential data are alternately read from the first buffer and second buffer areas to output the frames that have been subjected to the insertion-interpolating process, thereby making it possible to output motion image data with high precision that are free from color breaking. During the still image display mode, still image data that have not been subjected to the interpolating process can be outputted. Moreover, since the motion image display mode and the still image display mode can be automatically switched without using a CPU, etc., it is possible to reduce the processing load of the CPU.

In accordance with the data conversion circuit of the eleventh aspect of the present invention, inputted pixel data are alternately stored in the first buffer memory and the second buffer memory on a frame basis or on a field basis, and during a period in which the pixel data are stored in one of the memories, pixel data are read from the other memory; therefore, it becomes possible to positively prevent color breaking at the time of displaying field sequential motion images on a color field sequential display. Moreover, since the pixel interpolating process is carried out based upon pixel data read out from the first and second buffer memories to output color field sequential data, it is possible to display color field sequential motion images with high precision on a color field sequential display. Furthermore, since pixel data having only single color component in each pixel are used, the capacity of the first and second buffer memories is reduced to, for example, only ⅓ of the capacity of the case in which the RGB signal having three primary color components per pixel is used; thus, it becomes possible to reduce the memory capacity and also to reduce costs of the circuits.

In accordance with the twelfth aspect, regardless of the image size of inputted image data, the image data can be stored in the first and second buffer memories.

In accordance with the thirteenth aspect, the dot sequential data, such as YCbCr data and RGB data, can be converted to color field sequential data, and displayed on a color field sequential display.

In accordance with the fourteenth aspect, data of any format, that is, for example, dot sequential data such as YCbCr data and RGB data and image data having only a single color component per pixel obtained from an image sensor having a color filter array of a single-chip type, can be converted to color field sequential data, and displayed on a color field sequential display.

In accordance with the fifteenth aspect of the present invention, when the second selector selects the dot sequential data to be outputted, it is possible to generate color field sequential data that are less susceptible to color breaking, and since the dot sequential data are stored in the first and second buffer memories without the necessity of subjecting the dot sequential data to a resolution converting process, it is possible to generate color field sequential data with high image quality in which the generation of any false color is suppressed.

In accordance with the sixteenth aspect, since, independent of the kinds of color filter arrays to be placed in the image-pickup sensor, the image data are converted to a desired color space, it is not necessary to change the specification of the data conversion circuit of the present invention so as to fit to the type of the color filter array, and the versatility of the data conversion circuit can be improved.

In accordance with the seventeenth aspect, it becomes possible to superimpose image-pickup information containing character information such as date and icon information on motion images, and to display these on a color field sequential display.

In accordance with the eighteenth to twenty-first aspects, it becomes possible to carry out fine image adjustments, and consequently to generate color field sequential data with high image quality.

In accordance with the twenty-second aspect, when the data conversion circuit of the present aspect is installed in a digital camera, it becomes possible to smoothly output the AF evaluation value by using only this data conversion circuit.

In accordance with the twenty-third aspect, the raw image data having a single color component in each pixel, outputted from the A/D conversion circuit, can be directly converted to color field sequential data, and outputted to a color field sequential display. Therefore, different from related art, it is possible to eliminate the necessity of converting dot sequential data having a plurality of color components in each pixel outputted from the image processing unit to color field sequential data; thus, it becomes possible to cut the memory capacity required for conversion, and consequently to make the circuit scale smaller and reduce the costs. Moreover, without the necessity of driving the image processing unit that consumes a great amount of power, images can be displayed on a color field sequential display; thus, it becomes possible to greatly cut the amount of power consumption in the entire digital camera, by stopping the power supply and supply of clock signals to the image processing unit on demand.

In accordance with the twenty-fourth aspect, motion images picked up by an image-pickup sensor can be directly confirmed through a viewfinder. Normally, in the digital camera, a dot-sequential display having a comparatively large screen allowing a picked-up image or a recorded image to be confirmed; however, picked-up motion images can be confirmed through a viewfinder without the necessity of driving such a dot sequential display having great power consumption.

In accordance with the twenty-fifth aspect, a picked-up image and a recorded image, obtained by a pickup sensor having a great total number of pixels, are culled so as to fit to the number of display pixels of a color field sequential display, and stored in the first and second buffer memories; thus, it becomes possible to cut the memory capacity required for conversion.

In accordance with the twenty-sixth aspect, dot sequential data such as a picked-up image and a recorded image processed in the image-processing unit are converted to data in the raw image format having only a single color component per pixel, and stored in the first buffer memory and the second buffer memory; therefore, it becomes possible to convert the dot sequential data to the color field sequential data without an increase in the memory capacity.

In accordance with the twenty-seventh aspect, any of the dot sequential data such as a picked-up image and a recorded image processed in the image processing unit can be freely selected in either of the states of dot sequential data and raw image data on demand, and displayed on a color field sequential display. Normally, in the digital camera, a dot-sequential display having a comparatively large screen allowing a picked-up image or a recorded image to be confirmed; however, in the digital camera in this aspect, the picked-up image, recorded image, etc., can be displayed on a color field sequential display constituting, for example, a viewfinder. Consequently, it is possible to reduce the power consumption, and even when such a dot sequential display has stopped due to a malfunction, etc., the substituting means can be used.

In accordance with the twenty-eighth aspect, when the second selector selects the dot sequential data to be outputted, it is possible to generate color field sequential data that are less susceptible to color breaking, and since the dot sequential data are stored in the first and second buffer memories without the necessity of subjecting the dot sequential data to a resolution converting process, it is possible to generate color field sequential data with high image quality in which the generation of any false color is suppressed.

In accordance with the twenty-ninth aspect, independent of the kinds of color filter arrays to be placed in the image-pickup sensor, the image data are converted to a desired color space.

In accordance with the thirtieth aspect, it becomes possible to superimpose image-pickup information containing character information such as date and icon information on motion images, and to display these on a color field sequential display.

In accordance with the thirty-first to thirty-fourth aspects, it becomes possible to carry out fine image adjustments, and consequently to improve the image quality of displayed images on a color field sequential display.

In accordance with the thirty-fifth aspect, without the application of AF evaluation calculating functions that the image processing unit, etc., have, the AF evaluation value can be calculated based upon image data picked up by an image sensor, and the value is fed back to the focusing control unit of the optical mechanism. Therefore, since the image processing unit, etc., need not be operated upon calculations of the AF evaluation value, the operation of the image processing unit, etc., can be suspended, if necessary, thereby making it possible to reduce the power consumption of a digital camera.

Next, in accordance with the data conversion circuit in accordance with the thirty-sixth aspect of the present invention, input image data having a plurality of components per pixel are sampled into image data having a single component per pixel, and stored in the buffer memory; therefore, it is possible to reduce the storing capacity of the buffer memory. Thus, it becomes possible to make the circuit scale smaller and also to reduce the costs. Moreover, the amount of information in the inputted image data is cut in the above-mentioned sampling unit; and a key signal is allowed to contain information related to the correlation state between the specific pixel of image data prior to the sampling and the surrounding pixels, and a pixel interpolating process is individually carried out in response to the value of this key signal; thus, it becomes possible to generate and output interpolated data that are less susceptible to degradation in the image quality due to sampling.

In accordance with the thirty-seventh aspect, since image data outputted from the sampling unit and the key signal are combined, and stored in the buffer memory, it is possible to cut the storing capacity. Therefore, it becomes possible to make the circuit scale smaller, and also to reduce the power consumption.

In accordance with the thirty-eighth aspect, since the storing capacity required for the buffer memory is reduced, it becomes possible to make the circuit scale smaller, and also to reduce the power consumption.

In accordance with the thirty-ninth aspect, the image data are stored in the first buffer memory and the second buffer memory alternately on a frame basis or on a field basis, and data are outputted from these buffer memories alternately; therefore, it is possible to display motion images that are free from color breaking phenomenon and positional offset phenomenon.

In accordance with the fortieth aspect, it is possible to reduce color breaking phenomenon, and to output color field sequential data with high quality so as to display motion images.

In accordance with the forty-first aspect, it is possible to greatly reduce the positional offset phenomenon, and consequently to output interpolated data with high quality so as to display motion images.

Thus, the present invention has been devised to solve the above-mentioned problems, and its objective is to provide a data conversion circuit which is inexpensive with low power consumption, and is less susceptible to color breaking phenomenon and positional offset phenomenon without causing an increase in the capacity of the buffer memory.

These and other objects, features, aspects and advantages of the present invention will become more apparent from the following detailed description of the present invention when taken in conjunction with the accompanying drawings.

BRIEF DESCRIPTION OF DRAWINGS

FIG. 9 is a drawing that shows a mutual positional relationship between FIG. 10 and FIG. 11.

FIG. 13 is a circuit diagram that shows a modified example of an interpolating unit of the data conversion circuit in accordance with fourth preferred embodiment.

FIG. 18 is a drawing that shows a mutual positional relationship between FIG. 19 and FIG. 20.

FIG. 28 is a drawing that shows a mutual positional relationship between FIG. 26 and FIG. 27.

FIG. 29 is an explanatory drawing that shows a component array of data outputted from a sampling circuit of a data conversion circuit in accordance with eleventh embodiment.

FIG. 30 is an explanatory drawing that shows a 3×3 pixel area in image data to be inputted to a key signal calculation circuit.

FIG. 31 is a schematic drawing that shows a space filter used for carrying out a space filtering process.

FIG. 32 is a drawing that shows an example of space filter having a coefficient value used for detecting vertical lines.

FIG. 33 is a drawing that shows an example of space filter having a coefficient value used for detecting lateral lines.

FIG. 37 is a drawing that shows an example of space filter having a coefficient value used for detecting lateral edges.

FIG. 38 is a drawing that shows an example of space filter having a coefficient value used for detecting diagonal edges slanting to the right.

FIG. 39 is a drawing that shows an example of space filter having a coefficient value used for detecting diagonal edges slanting to the left.

FIG. 49 is a schematic drawing that explains a positional offset phenomenon.

FIG. 50 is a schematic drawing that shows a data conversion circuit having buffer memories corresponding to 2 frames.

DESCRIPTION OF THE PREFERRED EMBODIMENTS

Referring to Figures, the following description will discuss various preferred embodiments of the present invention

First Preferred Embodiment

Figure 1:
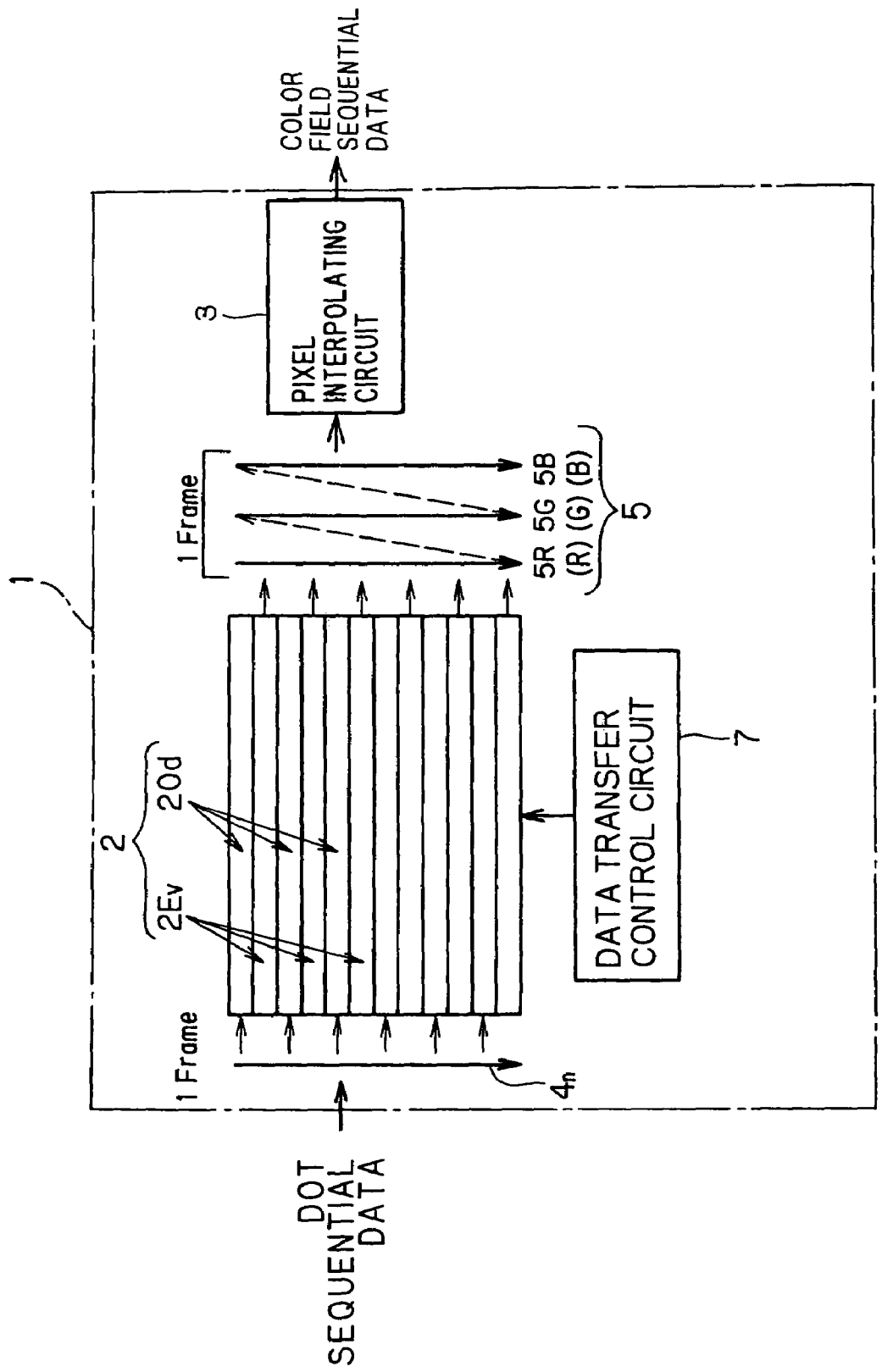
FIG. 1 is a block diagram that shows a schematic construction of an image conversion device in accordance with first preferred embodiment of the present invention.
Figure 2:
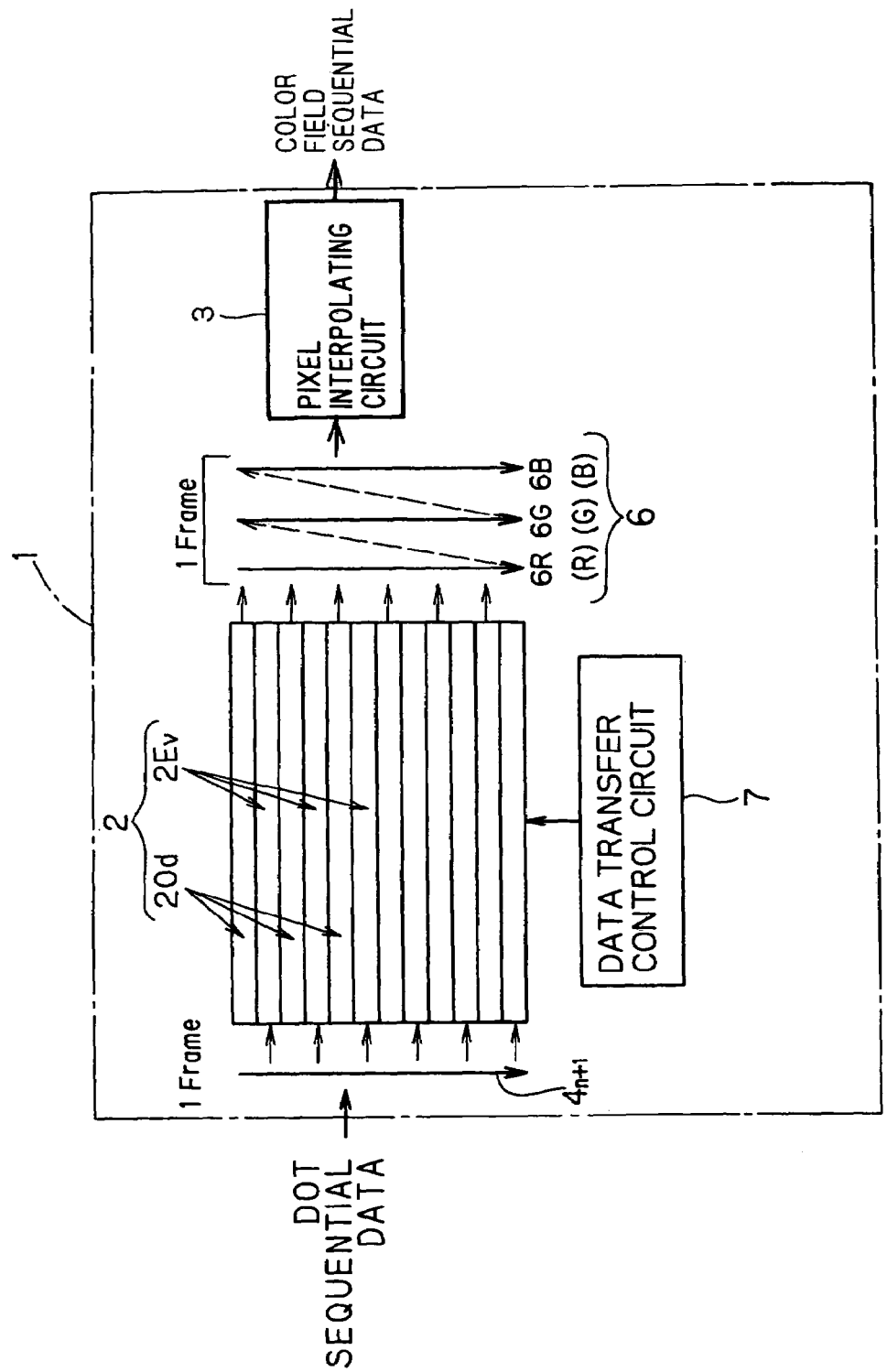
FIG. 2 is a block diagram that shows the outline of the image conversion device in accordance with first preferred embodiment.

FIGS. 1 and 2 are block diagrams that show a schematic construction of an image conversion device 1 in accordance with first preferred embodiment of the present invention. This image conversion device 1 is provided with an image storing unit 2 for storing dot sequential data consisting of color components of R, G, B, a data transfer control circuit 7 which carries out controlling operations to transfer dot sequential data to image storing unit 2 to store them therein and to read out the dot sequential data stored in image storing unit 2 in a color field sequential format so as to be transferred, and a pixel interpolating circuit 3 which carries out a pixel interpolating process on color field sequential data 5 or 6 that has been transferred from image storing unit 2. Here, such an image conversion device 1 is provided as an integrated circuit.

Figure 45:
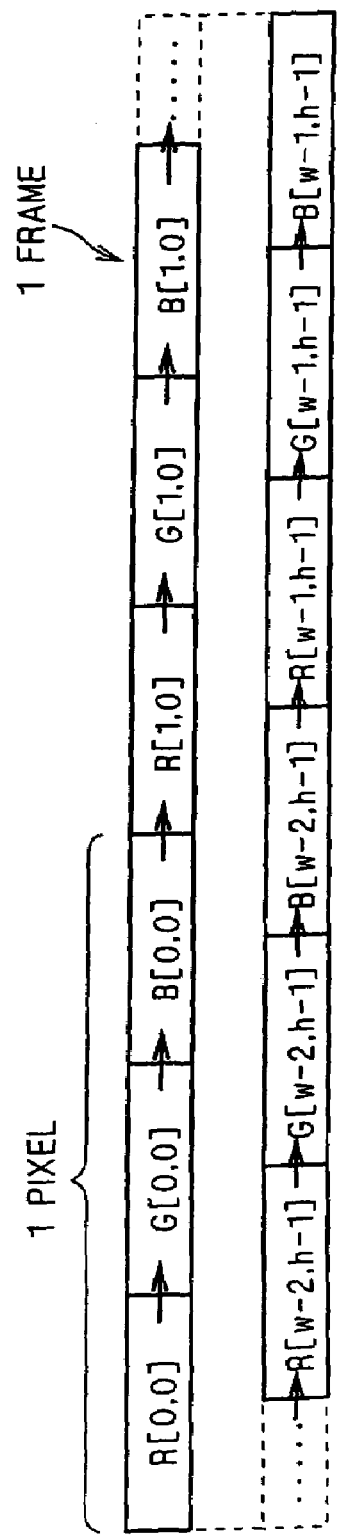
FIG. 45 is an explanatory drawing that shows image data in a dot sequential format of R, G, B.

Image storing unit 2, which has a buffer area corresponding to approximately one frame, is provided with a first buffer area 2Od for storing a first field that is either one of an even field that consists of even-numbered lines and an odd field that consists of odd-numbered lines, which constitute one frame, and a second buffer area 2Ev for storing the other second field. The dot-sequential data is obtained by A/D converting image data that have been picked up by an image-pickup sensor such as a CCD and a CMOS, and then carrying out a predetermined digital image processing or the like thereon, and these data are sequentially inputted to image conversion device 1 in a format as shown in FIG. 45.

The above-mentioned transfer control circuit 7 is provided with an address controller (not shown), which controls destination addresses in such a manner that the first field of the inputted dot sequential data is stored in the first buffer area 2Od while the second field thereof is stored in the second buffer area 2Ev. Moreover, data transfer control circuit 7 controls destination addresses in such a manner that, during a period in which the first field of the inputted dot sequential data is written in the first buffer area 2Od, the second field stored in the second buffer area 2Ev is read out, while, during a period in which the second field is written in the second buffer area 2Ev, the first field stored in the first buffer area 2Od is read out.

Moreover, the above-mentioned pixel interpolating circuit 3 stores the color field sequential data that are transferred from image storing unit 2 and correspond to a plurality of lines in a line memory (not shown), and, when it pixel-interpolates an odd field, carries out an insertion-interpolating process on a lacking odd-numbered line using pixel data on the even-numbered lines of the even field, while, when it pixel-interpolates an even field, carries out an insertion-interpolating process on an even-numbered line using pixel data on the odd-numbered lines of the odd field, by using a linear-interpolating method, etc. In this manner, pixel interpolating circuit 3 resolution-converts the color field sequential data transferred from image storing unit 2 to progressive data, and outputs the resulting data.

Figure 3:
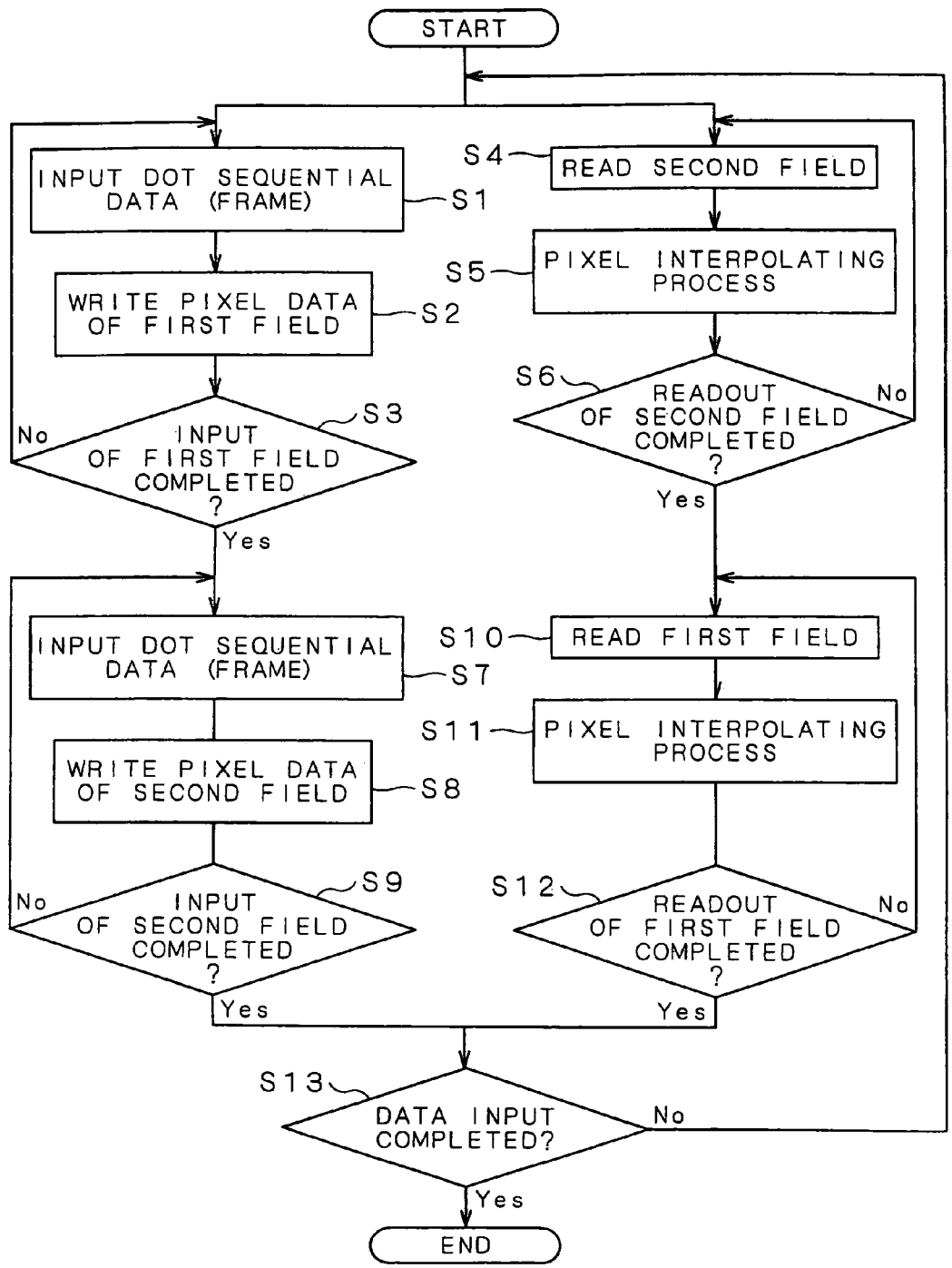
FIG. 3 is a flow chart that shows a processing example of an image conversion method in accordance with first preferred embodiment.

Referring to a flow chart shown in FIG. 3, a detailed explanation will be given of an example of an image converting process by image conversion device 1 having the above-mentioned construction.

First, as shown in FIG. 1, dot sequential data $4_n$, which constitute n-numbered frame (n: integer not less than 1), are inputted to image conversion device 1 (step S1). Next, the pixel data of the first field of the inputted dot sequential data $4_n$ are written in the above-mentioned first buffer area 2Od under control of the above-mentioned data transfer control circuit 7 (step S2). In the next step S3, a determination is made as to whether or not the input of pixel data to the first field has been completed, and until the input of the pixel data has not been completed, the sequence returns to the above-mentioned step S1 so that the above-mentioned steps S1, S2 are repeatedly executed. In contrast, it is determined at step S3 that the input of the pixel data has been completed, the sequence proceeds to the next step S7.

Figure 46:
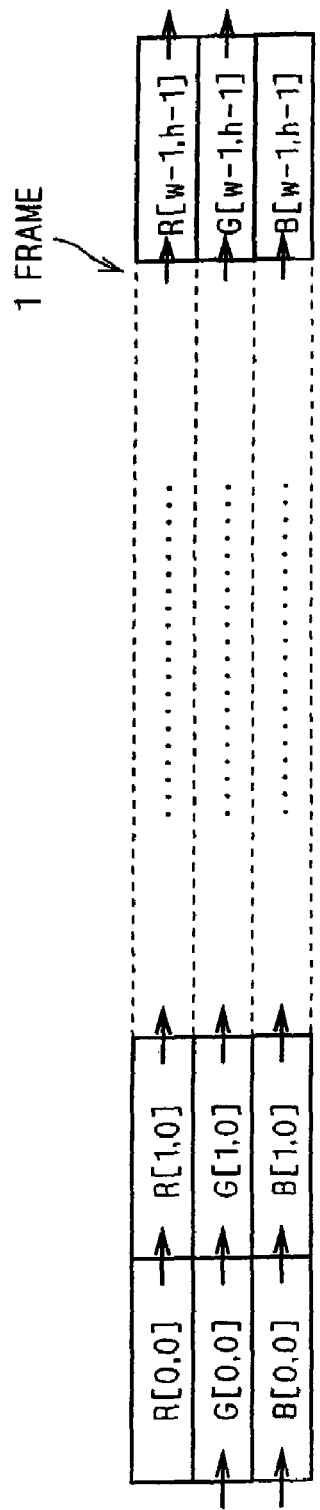
FIG. 46 is an explanatory drawing that shows image data in a color field sequential format of R, G, B.
Figure 47:
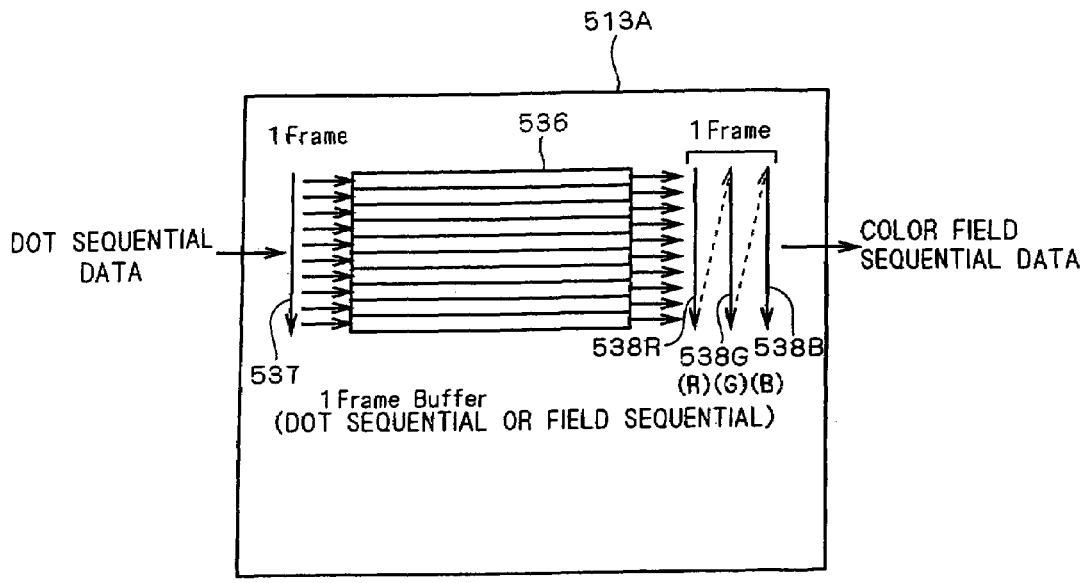
FIG. 47 is a schematic drawing that shows one example of a conversion device for converting a color component array of image data from a dot sequential format to a color field sequential format.
Figure 48:
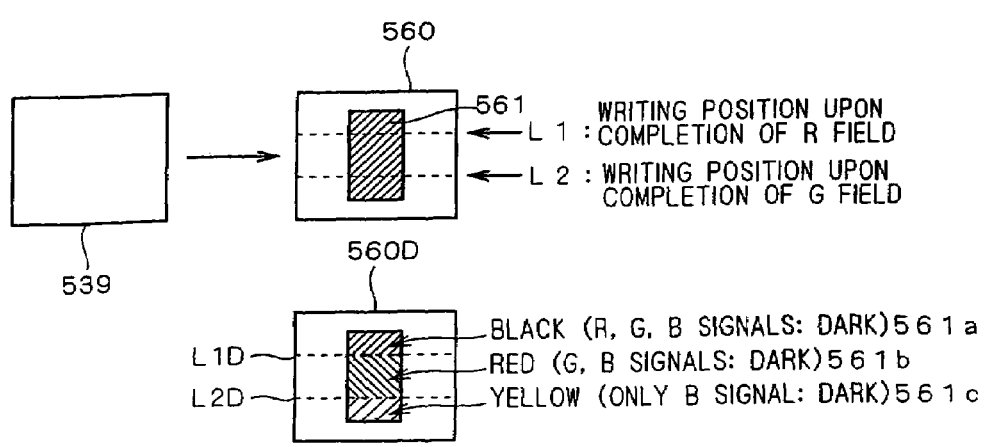
FIG. 48 is a drawing that explains color breaking that is generated when color field sequential data are displayed as motion images.

Here, processes of steps S4 to S6 are carried out in synchronism with the processes of the above-mentioned steps S1 to S3. At step S4, as shown in FIG. 1, the second field constituting n–1 numbered frame that has stored in the second buffer area 2Ev is read out as color field sequential data 5 under control of the above-mentioned data transfer control circuit 7, and outputted to image interpolating circuit 3. These color field sequential data 5 are read out in the order of R field 5R consisting of R component, G field 5G consisting of G component and B field 5B consisting of B component, as shown in FIG. 46. Moreover, at step S5, pixel interpolating circuit 3 generates progressive data (color field sequential data) which are formed by inserting interpolated lines between the respective lines of the respective inputted color field sequential data 5R, 5G, 5B, and outputs these data. Then, at step S6, a determination is made as to whether or not the reading operation of all the pixel data in the second field has been completed, and until the reading operation has not been completed, the sequence returns to step S4, and the processes of the above-mentioned steps S4 to S6 are repeatedly executed. In contrast, it is determined at step S6 that the reading operation has been completed, the sequence proceeds to the next step S10.

As shown in FIG. 2, in the next step S7 after the above-mentioned steps S1 to S6, dot sequential data $4_{n+1}$, which constitute the next n+1 numbered frame, are inputted. Next, the pixel data of the second field of the dot sequential data $4_{n+1}$ are written in the second buffer area 2Ev under control of the above-mentioned data transfer control circuit 7 (step S8). Then, at step S9, a determination is made as to whether or not the input of the pixel data of the second field has been completed, and until the input of the pixel data has not been completed, the processes of the above-mentioned steps S7, S8 are repeatedly executed. In contrast, it is determined at step S9 that the input of the pixel data has been completed, the sequence proceeds to the next step S13.

Here, processes of steps S0 to S12 are carried out in synchronism with the processes of the above-mentioned steps S7 to S9. At step S10, the pixel data of the first field, stored in the first buffer area 2Od at the above-mentioned step S2, is read out in a color field sequential format, and outputted to pixel interpolating circuit 3 in the order of R field 6R consisting of R component, G field 6G consisting of G component and B field 6B consisting of B component, as shown in FIG. 4B. Moreover, at step S11, pixel interpolating circuit 3 generates progressive data (color field sequential data) which are formed by inserting interpolating lines between the respective lines of inputted color field sequential data 6, and outputs these data. Then, at step S12, a determination is made as to whether or not the reading operation of all the pixel data in the first field has been completed, and until the reading operation has not been completed, the sequence returns to step S10, and the processes of the above-mentioned steps S10 to S12 are repeatedly executed. In contrast, it is determined at step S12 that the reading operation has been completed, the sequence proceeds to the next step S13.

At step S13, a determination is made as to whether or not the data input to image conversion device 1 has been completed, and until the data input has not been completed, the sequence returns to the above-mentioned step S1 so that the processes of the above-mentioned steps S1 to S13 are repeatedly executed. In contrast, it is determined at step S13 that the data input has been completed, the above-mentioned image converting process is completed.

In this manner, the above-mentioned image conversion device 1, which is provided with only the buffer area corresponding to 1 frame, sufficiently functions so as to convert inputted dot sequential data into color field sequential data; therefore, in comparison with related art that prepares a buffer area corresponding to 2 frames, it becomes possible to make the circuit scale smaller, and consequently to reduce the power consumption as well as reducing the production costs. Moreover, as shown in FIG. 1, while the dot sequential data (the first field) are being written in the first buffer area 2Od, the second field that has been stored in the second buffer area 2Ev is read out in a color field sequential format (S1 to S6), and as shown in FIG. 2, while the dot sequential data (the second field) are being written in the second buffer area 2Ev, the first field that has been stored in the first buffer area 2Od is read out in a color field sequential format (S7 to S12). In this manner, since the state shown in FIG. 1 and the state shown in FIG. 2 are alternately switched, it is possible to positively prevent the above-mentioned color breaking in the color field sequential type display. Moreover, the color field sequential data, read out from image storing unit 2, are subjected to a pixel interpolating process, and outputted as progressive-data; thus, it becomes possible to positively prevent color breaking while suppressing degradation in the image quality.

Here, in the present first preferred embodiment, image conversion device 1 is provided as an integrated circuit as a preferable mode; however, in the present invention, instead of providing an integrated circuit, the second buffer area 2Ev and the first buffer area 2Od of image storing unit 2 may be placed in the main memory, and instead of the above-mentioned data transfer control circuit 7, a DMA (Direct-Memory-Access) controller may be adopted. In other words, in the case when the dot sequential data, stored in image storing section 2, are read out in a color field sequential format, the DMA controller reads out the pixel data of the second field stored in the second buffer area 2Ev in a color field sequential format while the first field is being written in the first buffer area 2Od, with initial values, such as destination addresses and data transfer length, being specified by a system processor (not shown) such as a CPU, and it reads out the pixel data of the first field stored in the first buffer area 2Od and DMA-transfers the data to pixel interpolating circuit 3, while the second field is being written in the above-mentioned second buffer area 2Ev.

Second Preferred Embodiment

Figure 4:
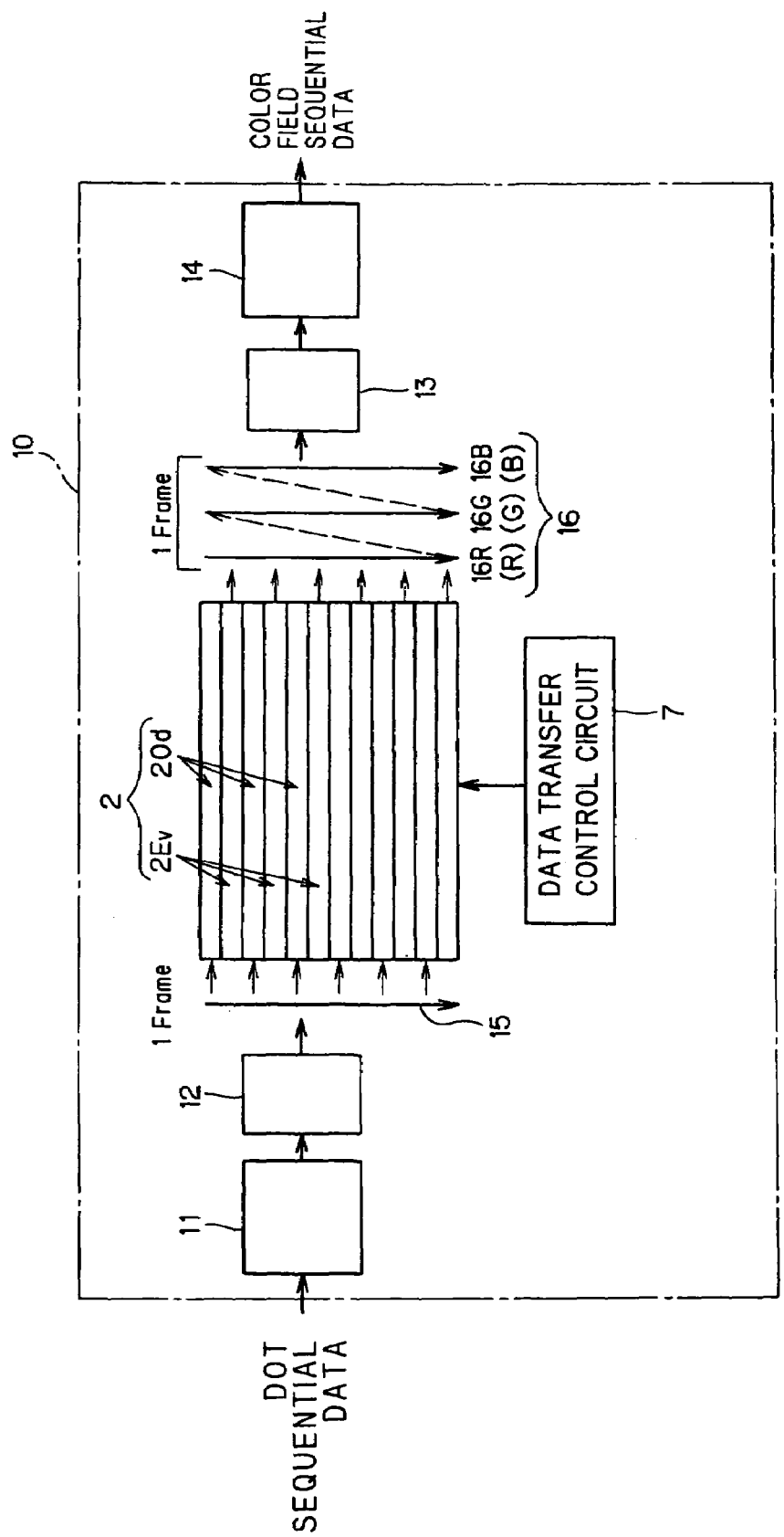
FIG. 4 is a block diagram that shows a schematic construction of an image conversion device in accordance with second preferred embodiment of the present invention.

Next, an explanation will be given of second preferred embodiment of the present invention. FIG. 4 is a block diagram that shows a schematic construction of an image conversion device 10 in accordance with second preferred embodiment of the present invention.

In addition to a construction of image conversion device 1 according to the above-mentioned first preferred embodiment, this image conversion device 10 is further provided with a first color space conversion circuit 11 for color-space-converting inputted dot sequential data, and a sub-sampling circuit 12 which carries out a sub-sampling process on the dot sequential data that have been color-space-converted in the first color space conversion circuit 11, an over sampling circuit 13 which carries out a reverse conversion to the sub-sampling (hereinafter, referred to an over-sampling) to the color field sequential data 16 read out from image storing unit 2, and a second color space conversion circuit 14 which returns the color space converted in the first color space conversion circuit 11 to the original state.

The above-mentioned color space conversion circuit 11 converts the inputted dot sequential data from RGB color space to Lab color space constituted by, for example, a luminance signal L, color-difference signals a, b. The present preferred embodiment adopts YCbCr color space as the Lab color space. Moreover, by utilizing the fact that the human eye is sensitive to luminance but not so sensitive to color difference, sub-sampling circuit 12 carries out a process for reducing the above-mentioned color-difference signals a, b. For example, the average value of the adjacent two color-difference data is obtained so as to reduce the amount of the color-difference data to ½. In this manner, sub-sampling circuit 12 converts the ratio of the luminance signal L and the color-difference signals a, b to L:a:b=4:2:2 or 4:1:1, etc.

Figure 5:
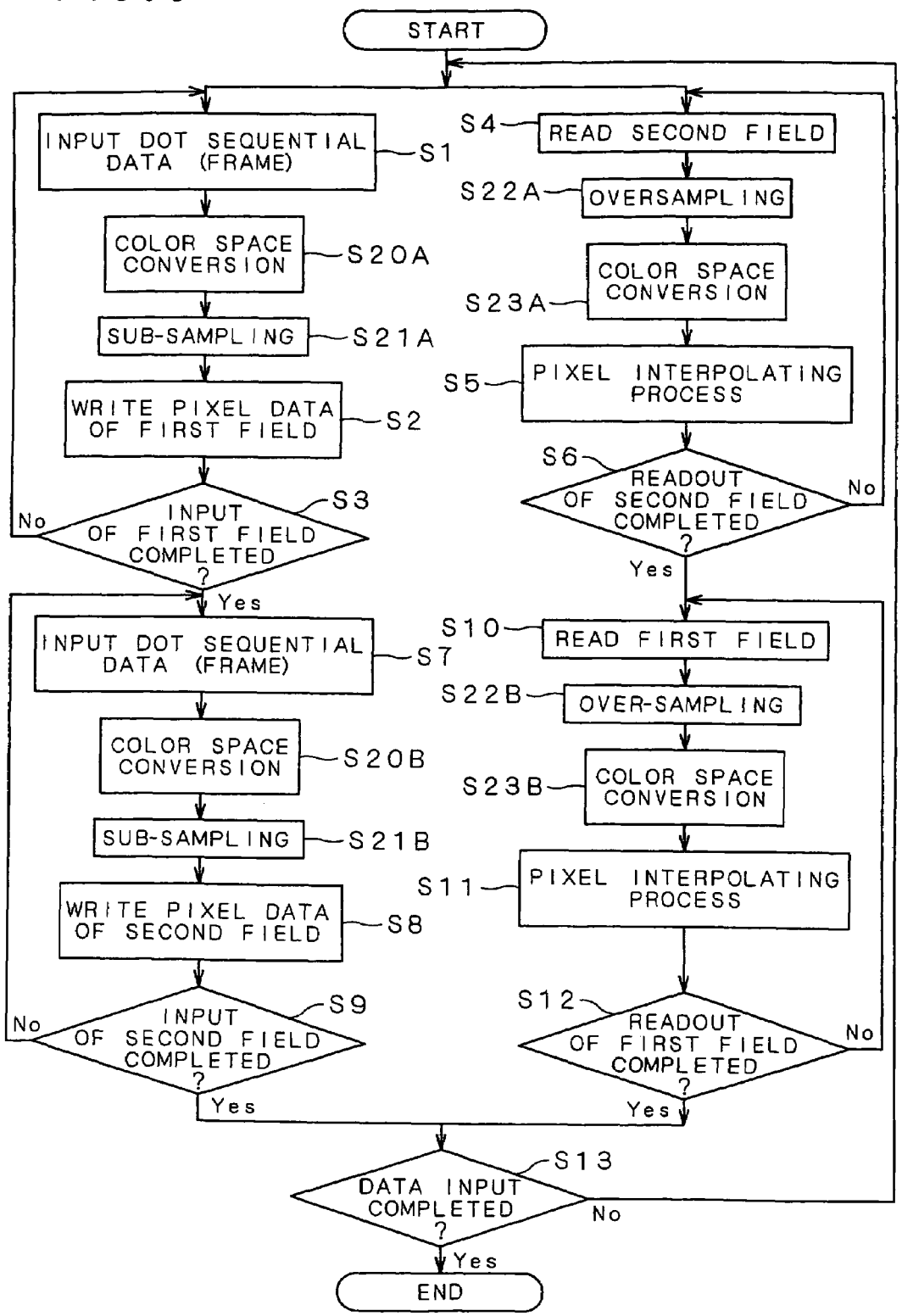
FIG. 5 is a flow chart that shows an image conversion method in accordance with second preferred embodiment.

FIG. 5 is a flow chart that shows an example of the image conversion process carried out by image conversion device 10 having the above-mentioned arrangement. In FIG. 5, on the assumption that those steps having the same numbers as the step numbers shown in FIG. 3 carry out substantially the same processes, the detailed description thereof is omitted.

As shown in FIG. 5, in steps S1 to S6, a process (step S20A) for converting the dot sequential data from RGB color space to YCbCr space in the first color space conversion circuit 11 and a process (step S21A) for reducing the ratio of YCbCr in sub-sampling circuit 12 from 4:4:4 to, for example, 4:2:2 are interpolated between steps S1 and S2, and a process (step S22A) for over-sampling the color field sequential data 16 in YCbCr color space so as to return the ratio of YCbCr to 4:4:4 and a process (step S23A) for returning the color field sequential data from YCbCr color space to RGB color space are interpolated between steps S4 and S5. Moreover, in steps S7 to S12, a step (step S20B) that carries out the same color space conversion as the above-mentioned step S20A and a process (step S21B) that carries out the same color space conversion as the above-mentioned step S21A are interpolated between steps S7 and S8, and a process (step S22B) that carries out the same over-sampling process as the above-mentioned step S22A and a process (step S23B) that carries out the same color-space conversion as the above-mentioned step S23A are interpolated between steps S10 and S11.

In this manner, the inputted dot sequential data are converted from RGB color space to YCbCr color space, and, after having been reduced in its data amount by the sub-sampling, stored in the first buffer area 2Od and the second buffer area 2Ev so that it is possible to reduce the buffer area of image storing unit 2 in accordance with the ratio of YCbCr. Therefore, it becomes possible to make the circuit scale smaller, and consequently to reduce the power consumption as well as reducing the production costs.

Third Preferred Embodiment

Figure 6:
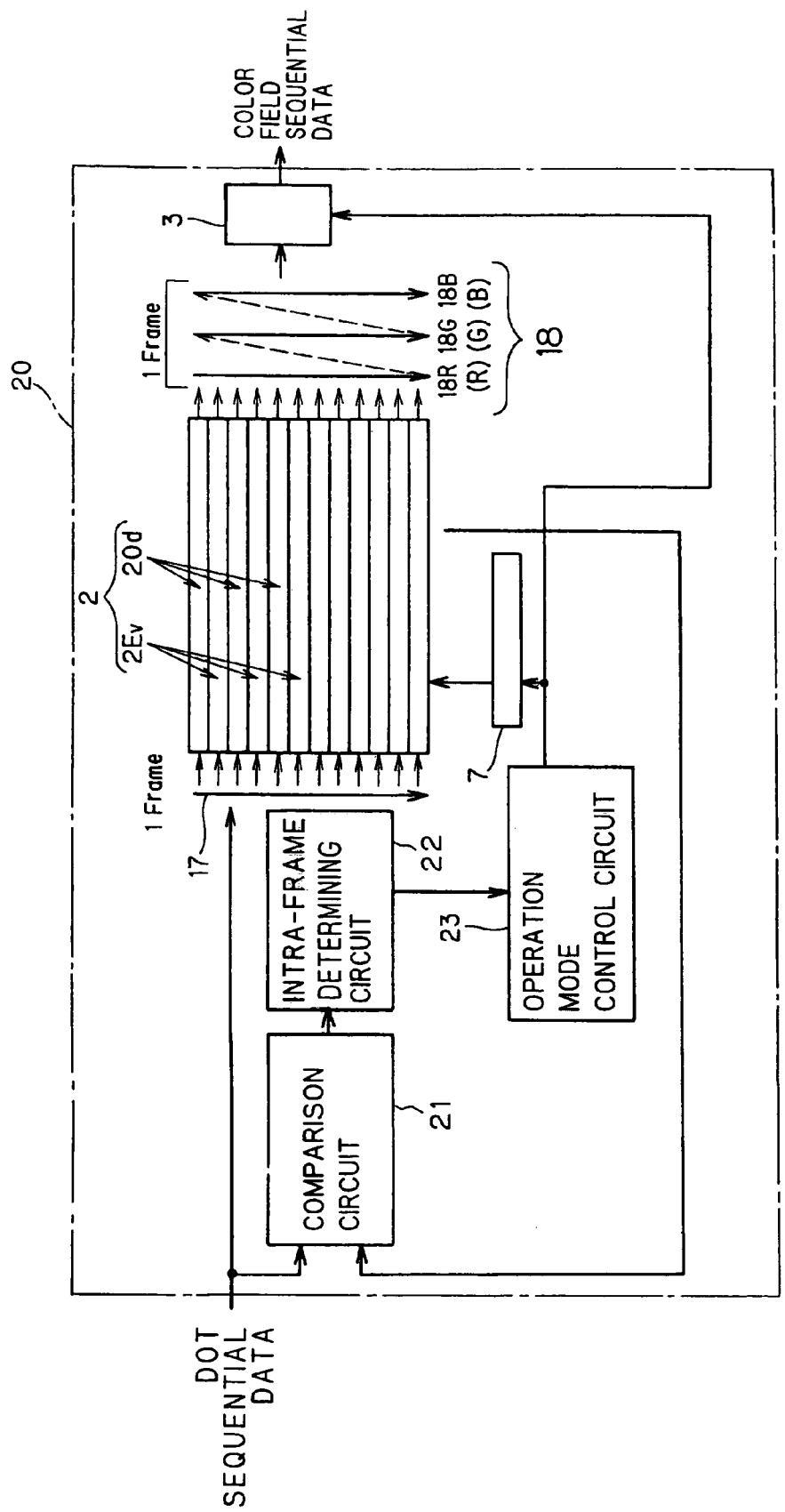
FIG. 6 is a block diagram that shows a schematic construction of an image conversion device in accordance with third preferred embodiment of the present invention.

Next, an explanation will be given of third preferred embodiment of the present invention. FIG. 6 is a block diagram that shows a schematic construction of an image conversion device 20 in accordance with third preferred embodiment of the present invention.

In addition to the construction of image conversion device 1 in accordance with the above-mentioned first preferred embodiment, this image conversion device 20 is provided with a comparison circuit 21 which compares inputted dot sequential data 17 with the dot sequential data stored in image storing unit 2, an intra-frame determining circuit 22 which makes a determination as to whether or not the inputted dot sequential data are coincident with the dot sequential data stored in image storing unit 2 on the frame basis based upon a comparison signal outputted by the comparison circuit 21 and an operation mode control circuit 23 which outputs a switching control signal for switching modes to either one of a motion picture display mode and a still image display mode, which will be described later, based upon a determination signal outputted by this intra-frame determining circuit 22. Data transfer controlling circuit 7 is switched by the switching control signal from one mode to the other between the motion image display mode to the still image display mode.

The above-mentioned comparison circuit 21 compares the inputted dot sequential data in n-numbered frame with the dot sequential data in n−1 numbered frame read out from image storing unit 2 on a pixel basis, and when these are coincident with each other, outputs a comparison signal with "H" level, while outputting a comparison signal with "L" level when they are not coincident with each other.

In the case when the level of the comparison signal is "L", supposing that motion image data are to be inputted, image conversion device 20 is operated in accordance with the image conversion method related to the above-mentioned first preferred embodiment. This operation state is referred to as a motion image display mode. Moreover, in the case when, with the level of the comparison signal having been changed from "L" to "H", intra-frame determination circuit 22 outputs a determination signal indicating that all the pixel data inside 1 frame are coincident with each other, operation mode control circuit 23 outputs a switching control signal indicating this fact to data transfer control circuit 7 and pixel interpolating circuit 3 so that image conversion device 20 is allowed to shift from the motion image display mode to the still image display mode.

Figure 7:
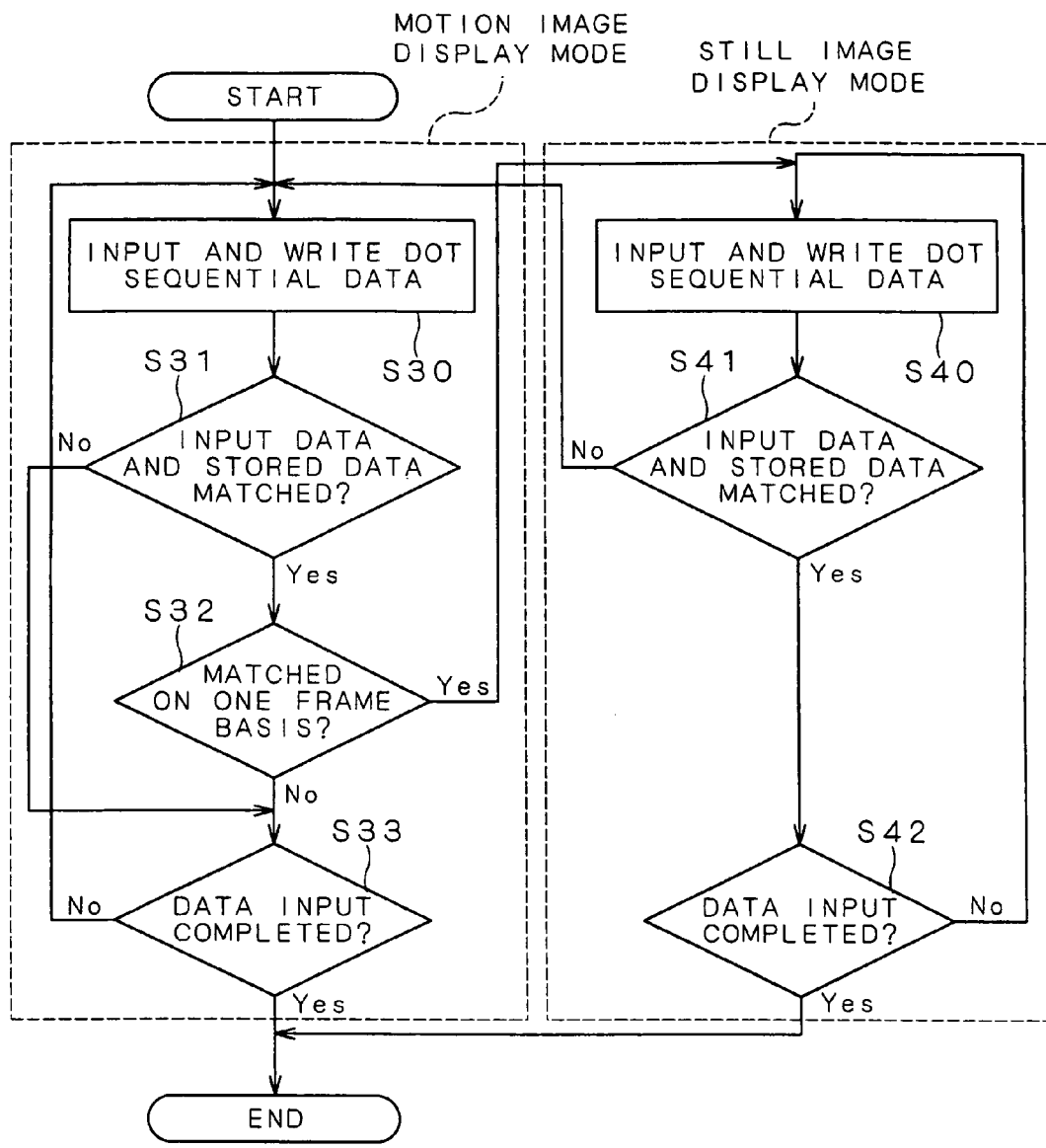
FIG. 7 is a flow chart that shows a processing example of an image conversion method in accordance with third preferred embodiment.

FIG. 7 is a flow chart that shows an example of a switching process between the still image display mode and the motion image display mode. In the motion image display mode, when dot sequential data 17 are inputted to image conversion device 20, the processes (steps S1 to S13), shown in first preferred embodiment, are executed so that the dot sequential data are written in the first and second buffer areas 2Od, 2Ev (step S30). Moreover, at step S31 dot sequential data 17 are branched so as to be inputted to comparison circuit 21. Comparison circuit 21 compares the inputted pixel data (dot sequential data) with pixel data stored in image storing unit 2, and outputs the comparison signal. When the level of the comparison signal is "L", intra-frame determining circuit 22 outputs a determination signal indicating that the both of the pieces of pixel data are not coincident with each other to operation mode control circuit 23 while operation mode control circuit 23 is maintained in the motion image display mode. In the case when the determining process at the next step S33 shows that the input of the dot sequential data has been completed, the above-mentioned operations are completed, and when the input of the dot sequential data is continued, the processes of the steps S30 to S33 are repeatedly carried out.

In contrast, when at the above-mentioned step S31, the level of the above-mentioned comparison signal is "H", intra-frame determining circuit 22 outputs a determination signal indicating that both of the pieces of pixel data are coincident with each other to operation mode control circuit 23. At the next step S32, operation mode control circuit 23 makes a determination as to whether or not pixel data corresponding to one frame are coincident with each other, and when pixel data corresponding to one frame are coincident with each other, the sequence proceeds to step S40 in the still display mode. In contrast, the image data corresponding to one frame are not coincident with each other, the sequence proceeds to step S33.

During the still image display mode, dot sequential data 17 to be inputted to image conversion device 20 are written in image storing unit 2 on the frame basis (step S40). At this time, data transfer control circuit 7 controls image storing unit 2 in such a manner that the inputted dot sequential data are stored in the first buffer area 2Od and the second buffer area 2Ev on the frame basis while the dot sequential data stored in both of the buffer areas 2Od and 2Ev are read on the frame basis in a color field sequential format. Moreover, pixel interpolating circuit 3 also outputs the color field sequential data 18 inputted thereto in the order of R field 18R, G field 18G and B field 18B without carrying out an insertion-interpolating process thereon. The color field sequential data (progressive-data), outputted in this manner, are outputted onto a color field sequential type display, and after having been subjected to a decoding process, etc., displayed as a still image. Moreover, at step S41, based upon the comparison signal outputted from comparison circuit 21, intra-frame determining circuit 22 makes a determination as to whether or not the inputted pixel data (dot sequential data) and the pixel data stored in image storing unit 2 are coincident with each other. During the "H" level of the above-mentioned comparison signal, intra-frame determining circuit 22 continues to output a determination signal for maintaining the still image operation mode to operation mode control circuit 23, and until it has been determined at the next step S42 that the input of the dot sequential data was completed, the above-mentioned steps S40 to S42 are repeatedly executed. In contrast, upon receipt of the comparison signal of "L" level at the above-mentioned step S41, intra-frame determining circuit 22 outputs a determination signal for allowing operation mode control circuit 23 to switch to the motion image display mode so that operation mode control circuit 23 outputs a switching control signal for switching to the motion image display mode to data transfer control circuit 7 and pixel interpolating circuit 3. Thus, the sequence proceeds to step S30 in the motion image display mode. Here, until the phases of the dot sequential data stored in image storing unit 2 and the inputted dot sequential data have matched to each other, the switching from the still image display mode to the motion image display mode may be delayed.

Here, in the same manner as image conversion device 10 in accordance with the aforementioned second preferred embodiment, the inputted dot sequential data may be subjected to a color space conversion process and a sub-sampling process, and the color field sequential data read out from image storing unit 2 may be subjected to an over-sampling process and a color space conversion process.

In this manner, since image conversion device 20 has both of the motion image display mode and the still image display mode, the motion image data, which have been alternately read out from the first buffer area 2Od and the second buffer area 2Ev, and subjected to an insertion-interpolating process, are outputted at the time of the motion image display mode, so that motion images with high precision without color breaking are displayed on a color field sequential type display, and so that during the still image display mode, the still image data that have not been subjected to an insertion-interpolating process can be outputted.

Fourth Preferred Embodiment

Figure 8:
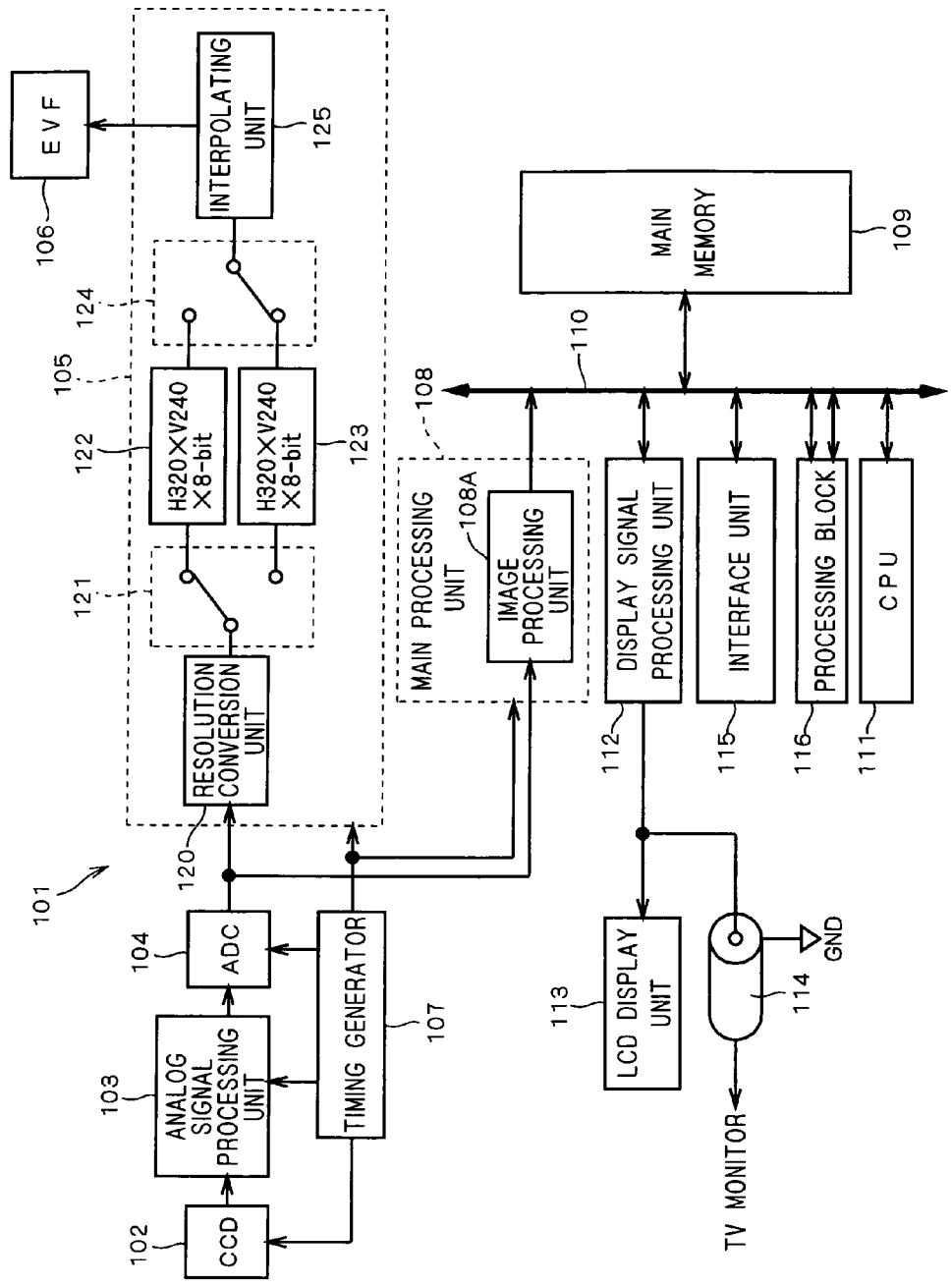
FIG. 8 is a functional block diagram that shows a schematic construction of a digital camera in accordance with fourth preferred embodiment of the present invention.

FIG. 8 is a functional block diagram that shows a schematic construction of a digital camera 101 in accordance with fourth preferred embodiment of the present invention. This digital camera 101 is provided with a CCD image-pickup sensor 102 which receives light (hereinafter, referred to as TTL light) that has passed through an optical system (not shown) having functions such as an AF (auto-focusing) function and an automatic exposure adjusting function, photo-electrically converts the light and outputs the resulting analog image signal, an analog signal processing unit 103 for carrying out the gain adjustment, etc. of the analog image signal, and an A/D conversion circuit 104 that A/D converts the analog image signal in a predetermined quantization level, and outputs a digital image signal (Raw Image Data). Here, a timing generator 107 generates a signal for adjusting the operation timing of CCD image-pickup sensor 102, analog signal processing unit 103, A/D conversion circuit 104 and a data conversion circuit 105, and supplies the signal.

The above-mentioned CCD image-pickup sensor 102 is a generally-used one that is provided with a charge accumulating unit for accumulating carriers (electrons or holes) generated through the photoelectric effect and a charge transfer unit for applying an electric field to the accumulated carriers, and transferring the resulting carriers. Here, instead of CCD image-pickup sensor 102, a CMOS image-pickup element having no charge transfer unit may be used. On a photosensitive unit of the CCD image-pickup sensor 102 of this type, a single-chip-type color filter array in which, for example, 3-primary color filters of R (red), G (green) and B (blue) or 4-color filters of complementary-color system of Y (yellow), M (magenta), C (cyan) and G (green), are arranged is placed. Therefore, since raw image data, outputted from A/D conversion circuit 104, only have a single color component for each pixel, these data are subjected to a pixel interpolating process for interpolating components of a plurality of colors for each pixel, as will be described later.

The raw image data, outputted from the above-mentioned A/D conversion circuit 104, are inputted to data conversion circuit 105 and an image processing unit 108A of a main processing unit 108. Image processing unit 108A has a signal processing circuit which carries out various kinds of image processing on picked-up image data at real-time and outputs image data with high image quality. The signal processing circuit is provided with various functions, such as a time averaging process function that averages raw image data with respect to a plurality of frames or a plurality of fields, a shading correcting function for gain-adjusting luminance values of the respective pixels so as to allow the entire image to have uniform luminance in an averaged manner, a pixel interpolating function for interpolating a plurality of color components on each pixel so as to provide color components that are insufficient in pixel data that have only a single color component for each pixel, a gamma correcting function for correcting the gamma characteristic of an image, a color suppressing function for carrying out a color suppressing process (chroma suppress: prevention of false color) in bright parts and dark parts of an image, a color space conversion function for converting color space of image data, a space filtering function for carrying out multiplying and adding operations in which a space filter (weighting mask) is applied to a local area of approximately 5×5 pixels of image data so as to carry out a weighting (multiplying) process on the pixel data using the corresponding coefficient value of each space filter and add the resulting values, a coring function for carrying out a general non-linear process (coring) on the image data, and a resolution converting function for resolution-converting the image size using a predetermined enlarging rate or a reduction rate.

The image data, outputted from image processing unit 108A, are converted, for example, from RGB signals to YCbCr signals by the above-mentioned color space conversion function, and transferred to a buffer area in main memory 109, and stored therein, through a memory-bus 110, under control of DMA controller (not shown) and CPU 111. Then, the image data are transferred to display signal processing unit 112, and converted to displaying image signals, and then outputted to a LCD display unit 113 and a TV monitor through a cable 114 to be displayed thereon, or further transferred to a processing block 116 from its buffer area in which they are compressed and encoded by the JPEG system or MPEG system, and then transferred to an interface unit 115. This interface unit 115 has an interface function corresponding to formats such as a memory card provided with a non-volatile memory for storing compressed still images and an external storing device using video tapes for recording compressed motion images.

Figure 44:
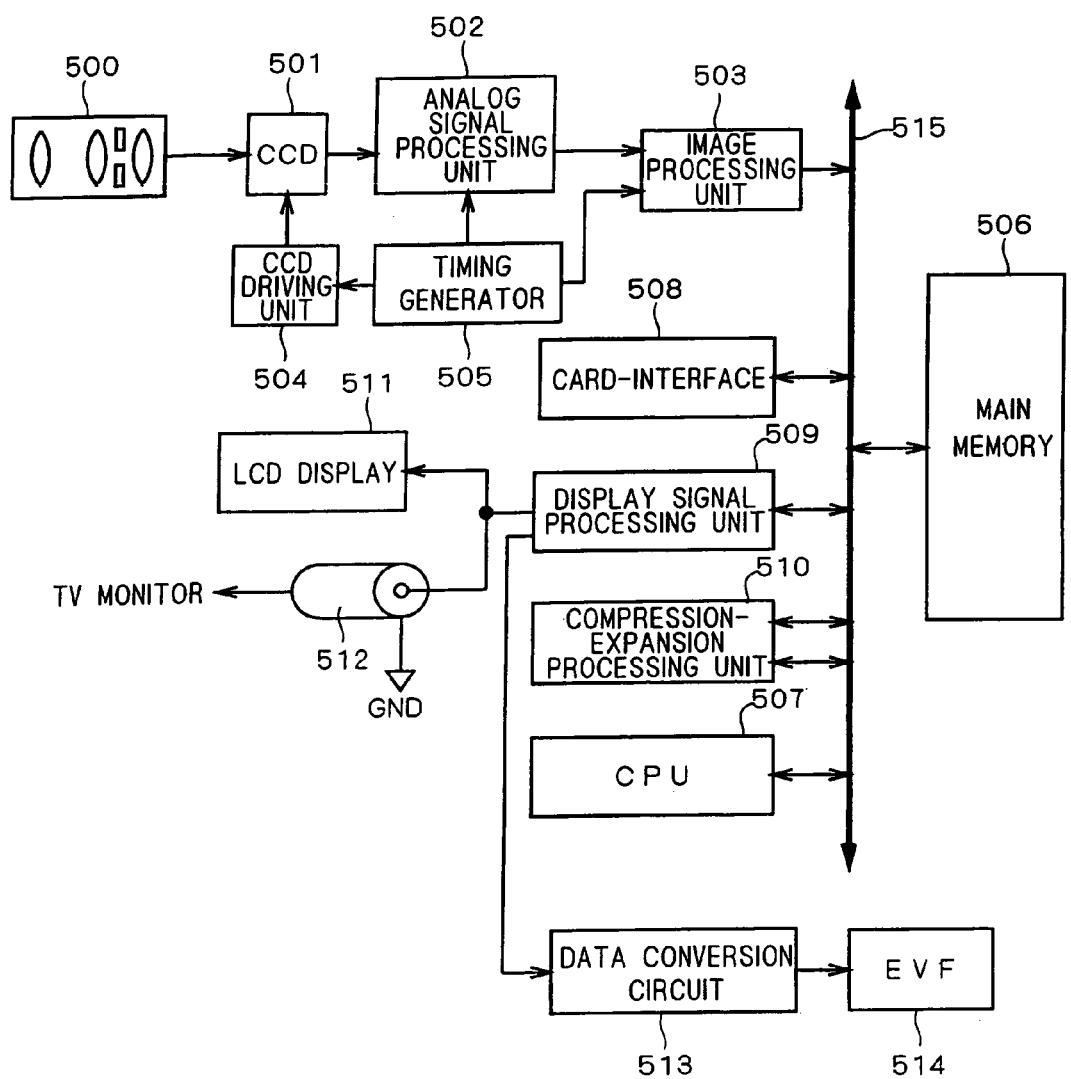
FIG. 44 is a block diagram that shows a schematic construction of a digital camera.

Moreover, in addition to LCD display unit 113 serving as a display device for displaying picked-up motion images, digital camera 101 in accordance with the present fourth preferred embodiment is provided with an EVF (color field sequential display) 106 that is placed at an eye-piece section of main body of the digital camera so that the motion image display is switched to either one of LCD display unit 113 and EVF 106. Data conversion circuit 105 has an interface function which resolution-converts row image data, inputted from A/D conversion circuit 104, in accordance with the number of display pixels of EVF106, and also converts them into color field sequential data and outputs the resulting data. In a digital camera, as illustrated in FIG. 44, dot sequential data, obtained through the signal processing in an image processing unit 503, are transferred to a data conversion circuit 513 through a display signal processing unit 509, and converted to color field sequential data in this data conversion circuit 513, and outputted to EVF514; however, in digital camera 101 in accordance with the present fourth preferred embodiment, since data conversion circuit 105 which is exclusively used for EVF is provided, it is possible to suspend power supply and supply of clock signals to image processing unit 128A, etc., which consumes a large amount of power, and to stop their operations; thus, it becomes possible to greatly reduce the power consumption.

This data conversion circuit 105 is provided with a resolution-conversion circuit 120 for resolution-converting inputted raw image data in accordance with the number of display pixels of EVF 106 based upon a linear interpolating method or the like, a first buffer memory 122 and a second buffer memory 123, and a writing control unit 121 which carries out a controlling operation to selectively store raw image data outputted from the above-mentioned resolution conversion circuit 120 in either of the first buffer memory 122 and the second buffer memory 123 on the frame basis or on the field basis. The raw image data to be stored in the first buffer memory 122 and the second buffer memory 123 have only a single color component per pixel. For this reason, in comparison with a case in which dot sequential data having N-color components (N=2 or N>2) per pixel are stored, the required capacity of the buffer memory is reduced to 1/N. As shown in FIG. 50, the related art has required buffer memories 522A, 522B for storing dot sequential data of two frames; however, in the present preferred embodiment, it is not necessary to provide a memory capacity for storing all the dot sequential data. Here, the total number of pixels of CCD image-pickup sensor 102 is set to several thousands×several thousands of pixels, that is, several millions of pixels; in contrast, the number of display pixels of EVF106 is set to several hundreds×several hundreds, that is, several tens thousand pixels. In the present fourth preferred embodiment, for convenience of explanation, the number of display pixels of EVF106 is set to 320×240 pixels (=the number of horizontal pixels×the number of vertical pixels), and each of the first buffer memory 122 and the second buffer memory 123 is set to have a storage area ((bit length of one pixel data)×320×240 bits) corresponding to the number of display pixels of EVF106.

Moreover, data conversion circuit 105 is provided with a reading control unit 124 which carries out a controlling operation so as to selectively read pixel data from either one of the first buffer memory 122 and the second buffer memory 123, and an interpolating unit 125 which generates interpolated data that have been pixel-interpolated so as to create a plurality of color components for each pixel by using pixel data inputted from the reading control unit 124, and outputs color field sequential data in which color components of these interpolated data are color field sequentially arranged to EVF 106.

Figure 10:
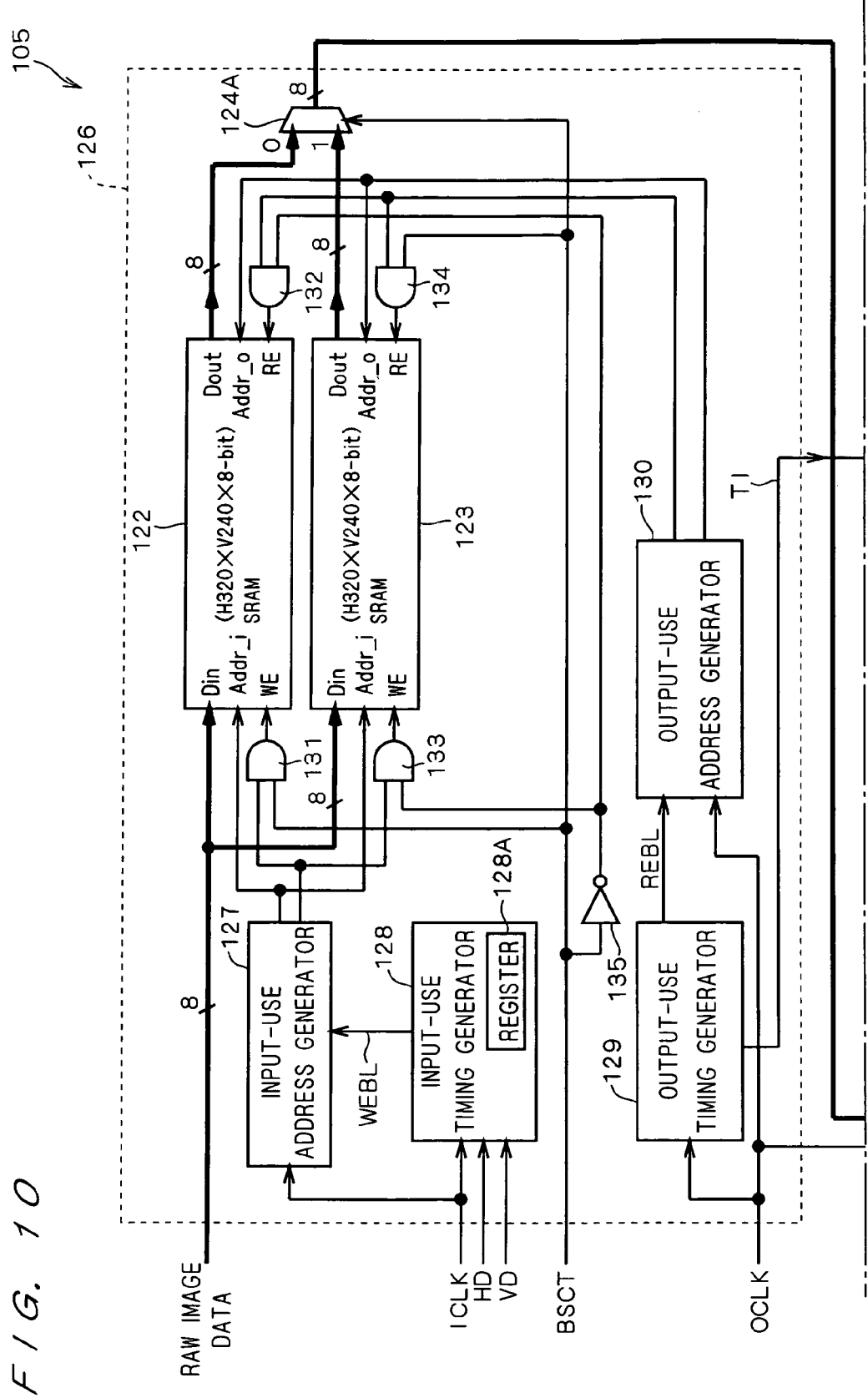
FIG. 10 is a circuit diagram that shows an image data storing unit of the data conversion circuit in accordance with fourth preferred embodiment.
Figure 11:
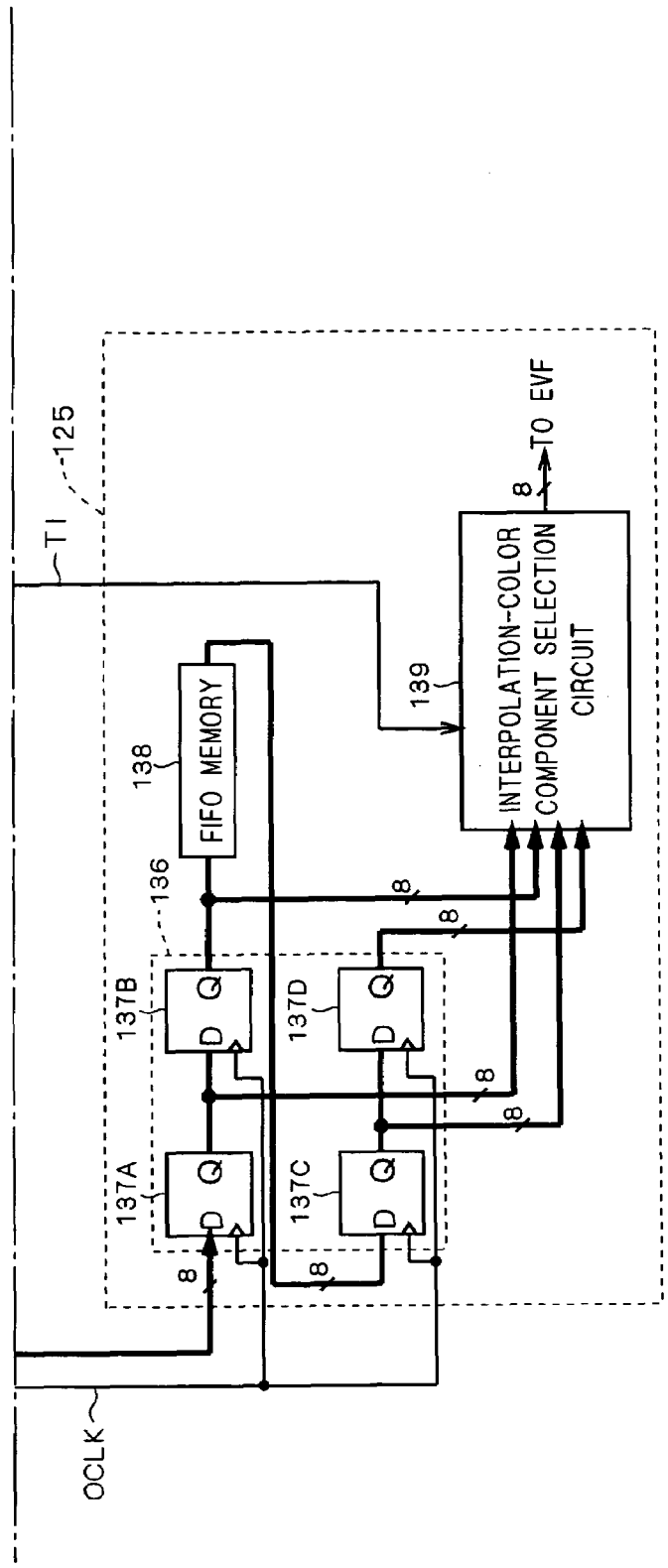
FIG. 11 is a circuit diagram that shows an interpolating unit of the data conversion circuit in accordance with fourth preferred embodiment.

FIGS. 9, 10 and 11 are circuit diagrams that show a specific example of data conversion circuit 105 of this type. FIG. 9 is a drawing that shows a positional relationship between FIG. 10 and FIG. 11, and FIG. 10 and FIG. 11 are continued to each other through an alternate long and short dash line. As shown in FIGS. 10 and 11, this data conversion circuit 105 is constituted by an image data storing unit 126 and an interpolating unit 125. Moreover, as shown in FIG. 10, this image data storing unit 126 is provided with first buffer memory (SRAM) 122 and a second buffer memory (SRAM) 123 constituting two banks, and is further provided with an input-use address generator 127 for generating data-writing-use address signals and an input-use timing generator 128 for indicating data-writing timing to input-use address generator 127, an output-use address generator 130 for generating a data-reading-use address signal, and an output-use timing generator 129 for indicating data reading timing to this output-use address generator 130.

Each of the above-mentioned first and second buffer memories 122, 123 is provided with a write-enable terminal WE and a read-enable terminal RE, and the respective enable terminals WE, RE receive signal inputs from AND elements 131, 132, 133, 134. The raw image data of 8-bit length are inputted to the respective data input terminals Din of the first buffer memory 122 and the second buffer memory 123, and alternately stored therein on the frame basis or on the field basis. When a data-writing operation is carried out on the first buffer memory 122 while a data-reading operation is carried out from the second buffer memory 123, the signal level of a bank selection signal BSCT is switched to "H (High)" and maintained in this level. In this case, the H level signal is inputted to AND element 131 connected to the enable terminal WE of the first buffer memory 122 and AND element 134 connected to the enable terminal RE of the second buffer memory 123. Moreover, an L-level signal derived from bank selection signal BSCT level-inverted in inverter 135 is inputted to AND element 133 connected to the enable terminal WE of the second buffer memory 123 and AND element 132 connected to the enable terminal RE of the first buffer memory 122. In contrast, when a data-writing operation is carried out on the second buffer memory 123 while a data-reading operation is carried out from the first buffer memory 122, the signal level of bank selection signal BSCT is switched to the "L (Low)" level, and maintained in this level.

Moreover, both of the above-mentioned input-use timing generator 128 and input-use address generator 127 are operated in synchronism with an input pixel clock ICLK to be supplied thereto. Input-use timing generator 128 generates a write enable pulse WEBL indicating the timing of data-writing by using an input pixel clock ICLK, a horizontal synchronous signal HD and a vertical synchronous signal VD based upon conversion coefficients (culling rate) $\alpha$, $\beta$ that are stored in a register 128A. Here, the horizontal synchronous signal HD and the vertical synchronous signal VD are supplied from timing generator 107 shown in FIG. 8. Moreover, $\alpha$ ($\alpha$: not less than 1) is a coefficient used for culling horizontal pixels on horizontal lines, while $\beta$ is a coefficient used for culling the horizontal lines, and the size of the inputted raw image data is converted to $1/\beta$ time resolution in the vertical direction, and to $1/\alpha$ time resolution in the horizontal direction. Furthermore, input-use address generator 127 has a built-in address counter that increments addresses for data-writing, and the address counter carries out an address incrementing operation each time the write enable pulse WEBL is inputted thereto from the above-mentioned input-use timing generator 128 so as to generate an address signal. Upon writing data, input-use address generator 127 outputs the generated address signal to the respective address input terminals Addr_i of the first buffer memory 122 and the second buffer memory 123, and outputs a write enable signal of the H level to respective AND elements 131, 133. At this time, AND element 131 outputs a signal obtained by carrying out a logical product on the write-enable signal and bank selection signal BSCT to enable terminal WE. In contrast, AND element 133 outputs a signal obtained by carrying out a logical product on level inversion signals of the above-mentioned write-enable signal and bank selection signal BSCT to enable terminal WE. Therefore, during a period in which a data-writing operation is carried out on either of the first buffer memory 122 and the second buffer memory 123, no data writing operation is carried out on the other memory.

Moreover, both of output-use timing generator 129 and output-use address generator 130 are operated in synchronism with an output pixel clock OCLK. In an attempt to reduce color breaking in motion image display on EVF (color field sequential display) 106, it is preferable to set the frequency of output pixel clock OCLK higher than that of input pixel clock ICLK in order to increase the frame rate.

Output-use timing generator 129 generates read enable pulse REBL indicating the timing of data reading by using output pixel clock OCLK, and outputs this. Moreover, output-use address generator 130 has an address counter that increments addresses of data reading, and the address counter carries out an address incrementing operation each time the read enable pulse REBL is inputted thereto. Upon reading data, output-use address generator 130 outputs the generated address signal to the respective address input terminals Addr_o of the first buffer memory 122 and the second buffer memory 123, and outputs a read enable signal of the H level to respective AND elements 132, 134. At this time, AND element 132 outputs a signal obtained by carrying out a logical product on level inversion signals of the above-mentioned read-enable signal and bank selection signal BSCT to enable terminal RE. Moreover, AND element 134 outputs a signal obtained by carrying out a logical product on the read-enable signal and bank selection signal BSCT to enable terminal RE. Therefore, during a period in which a data-reading operation of pixel data is carried out from either of the first buffer memory 122 and the second buffer memory 123, no data reading operation is carried out from the other memory.

In this manner, the pixel data, outputted from data output terminal Dout of the first buffer memory 122, are inputted to "0" side terminal of a selector 124A, and the pixel data, outputted from data output terminal Dout of the second buffer memory 123, are inputted to "1" side terminal of selector 124A. Selector 124A selects "0" side terminal or "1" side terminal in response to "L" or "H" of the level of bank selection signal BSCT to output pixel data of 8-bit length read out from the first buffer memory 122 or the second buffer memory 123 to a pixel register group 136 of interpolating unit 125.

Next, as shown in FIG. 11, interpolating unit 125 is provided with pixel register group 136 which holds a specific area component of 2×2 pixels of inputted pixel data of 8-bit length, an FIFO memory 138, and an interpolation-color component selection circuit 139. Pixel register group 136 have registers 137A, 137B, 137C and 137D constituted by D-flip-flops that are operated in synchronism with the above-mentioned output pixel clock OCLK. Data output terminal (Q) of register 137A and data input terminal (D) of register 137B are connected to each other, data output terminal (Q) of register 137C and data input terminal (D) of register 137D are connected to each other, and data output terminal (Q) of register 137B and data input terminal (D) of register 137C are connected to each other through FIFO memory 138. Such a pixel register group 136 can store pixel data of a desired 2×2 pixel area within 1 frame or 1 field.

Figure 12:
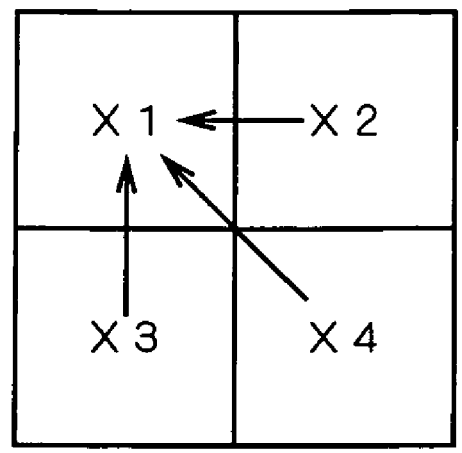
FIG. 12 is an explanatory drawing that shows one example of an image interpolating process.

Interpolation-color component selection circuit 139 is operated in synchronism with a timing signal TI outputted from the above-mentioned output-use timing generator 129, selectively acquires respective pixel data of 8-bit length that are stored in respective registers 137A to 137 D and outputted therefrom, generates interpolated data formed by pixel-interpolating the specific pixel data, and outputs color field sequential data of 8-bit length obtained by arranging color components of these interpolated data in a color field sequential format to EVF 106. FIG. 12 is an explanatory drawing that shows one example of the pixel interpolating process. X1, X2, X3 and X4 in this Figure represent color components corresponding to the respective pixels of 2×2 pixel area, and these are respectively stored in registers 137A, 137B, 137C and 137D. For example, in the case when the raw image data stored in the registers are arranged based upon Bayer array, X1 represent R component, X2 and X3 represent G component, and X4 represents B component. In the example shown in FIG. 12, with respect to a specific pixel corresponding to color component X1, by allocating X2, X3 and X4 to the specific pixel, a plurality of color components are interpolated with respect to the specific pixel. In the case of the above-mentioned Bayer array, the average value of G components of X2 and X3 are allocated to the specific pixel and B component of X4 may be allocated thereto. Here, it is not necessary to limit to 2×2 pixel area, and from the viewpoint of the improvements in color field sequential data, it is preferable to store pixel data of a specific area of K×K (K: integer of not less than 3), such as 3×3 pixels and 5×5 pixels, and to use these to carry out the pixel interpolating process. FIG. 13 is a circuit diagram that exemplifies an interpolating unit 125A that can store pixel data of 3×3 pixel area. Pixel register group 136 is constituted by registers 137A, 137B, 137C, 137D, 137E, 137F, 137G, 137H and 137I that are series-connected through FIFO memories 138A and 138B. The respective registers 137A to 137I are operated in synchronism with output pixel clock OCLK.

Interpolation-color component selection circuit 139 executes the above-mentioned pixel interpolating process N-times in order to generate and output color field sequential data consisting of N (N: integer of not less than 1) color components. For this reason, output-use timing generator 129 and output-use address generator 130 of the above-mentioned image data storing unit 126 carry out the same process repeatedly N-times on the same frame or the same field. Thus, image data storing unit 126 is allowed to output the raw image data of the same frame or the same field repeatedly N-times. For example, in the case when the raw image data are arranged based upon the Bayer array, interpolation-color component selection circuit 139 successively generates R field containing only R component, G field containing only G component and B field only containing B field through the pixel interpolation process, and output these.

In accordance with data conversion circuit 105 of fourth preferred embodiment, the pixel interpolating process is carried out on the raw image data that are alternately outputted from the first buffer memory 122 and the second buffer memory 123 on the frame basis or on the field basis so that the color field sequential data are generated and outputted on the color field sequential display (EVF106); therefore, it is possible to display color field sequential motion images that reduce color breaking, with high precision.

Moreover, the raw image data that have been outputted from A/D conversion circuit 104 and have not been pixel-interpolated with respect to insufficient color components are stored in the first and the second buffer memories 122, 123; therefore, it is possible to greatly reduce the capacities of the first and second buffer memories 122, 123, and consequently to make the circuit scale smaller and reduce the circuit costs.

Moreover, data conversion circuit 105 is particularly modified for use in EVF (color field sequential display), and during a period in which no motion images picked up by CCD image-pickup sensor 102 are displayed on LCD display unit 113 and the TV monitor, it is possible to suspend power supply and supply of clock signals to image processing unit 108A, etc., which consumes a large amount of power, and to stop their operations; thus, it becomes possible to greatly reduce the power consumption in digital camera 101.

Fifth Preferred Embodiment

Figure 14:
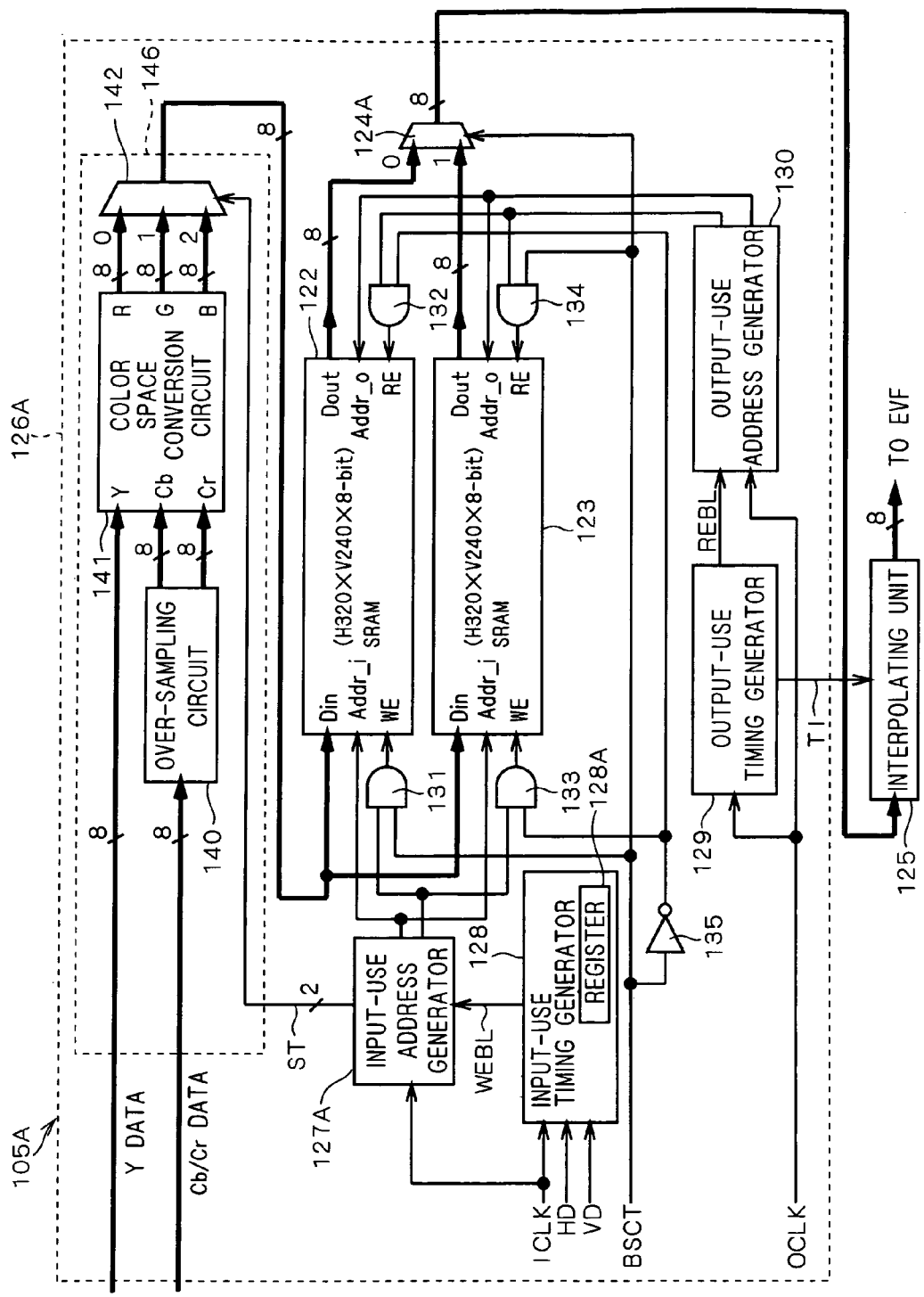
FIG. 14 is a drawing that shows a data conversion circuit in accordance with fifth preferred embodiment of the present invention.

Next, an explanation will be given of fifth preferred embodiment of the present invention. FIG. 14 is a drawing that shows a data conversion circuit 105A in accordance with fifth preferred embodiment of the present invention. On the assumption that circuits and signals indicated by the same reference numerals as those shown in FIGS. 10 and 11 have the same constructions and functions, the explanation thereof is omitted.

Data conversion circuit 105 in accordance with the above-mentioned fourth preferred embodiment converts the raw image data that are inputted from A/D conversion circuit 104 to color field sequential data; in contrast, a data conversion circuit 105A in accordance with the present fifth preferred embodiment converts dot sequential data that have been subjected to pixel interpolation and color space conversion in image processing unit 108A shown in FIG. 8 are converted to color field sequential data. For convenience of explanation, in the following description, it is supposed that dot sequential data to be inputted to data conversion circuit 105A are YCbCr data (Y: luminance signal, Cb, Cr: color difference signal), and that the color components of YCbCr are sub-sampled at a ratio of 4:2:2.

This data conversion circuit 105A is constituted by an image data storing unit 126A and an interpolation unit 125. Image data storing unit 126A is provided with a signal conversion circuit 146 which converts Y data having 8-bit length and Cb/Cr data having 8-bit length, externally inputted, to data of a raw image format having a single color component with respect to each pixel, and further provided with a first buffer memory 122, a second buffer memory 123, an input-use address-generator 127A, an input-use timing-generator 128, an output-use timing-generator 129 and an output-use address generator 130.

Moreover, signal conversion circuit 146 is provided with an over-sampling circuit 140 for converting the ratio of color components of YCbCr from 4:2:2 to 4:4:4, a color space conversion circuit 141 for converting YCbCr color space of the input data to RGB color space, and a selector 142 which selects any of the three data, that is, R data, G data and B data, simultaneously inputted from color space conversion circuit 141, and outputs the resulting data as data in raw image format. Over-sampling circuit 140 converts Cb/Cr data having 8-bit length externally inputted to Cb data having 8-bit length and Cr data having 8-bit length, and outputs these data to color space conversion circuit 141. Color space conversion circuit 141 converts Y data externally inputted directly, Cb data and Cr data inputted from over-sampling circuit 140 to RGB data (dot sequential data), and outputs the resulting data to selector 142. In accordance with the value of sampling signal ST of 2-bit length transmitted from input-use address-generator 127A, selector 142 is controlled so as to select any one of "0" side terminal to which R component is inputted, "1" side terminal to which G component is inputted and "2" side terminal to which B component is inputted. Input-use address-generator 127A generates the above-mentioned sampling signal ST in accordance with, for example, the aforementioned Bayer array.

The circuit construction of the image data storing unit 126A except for the above-mentioned signal conversion circuit 146 is the same as that of image data storing unit 126 shown in fourth preferred embodiment. And, in addition to functions in which, upon receipt of write-enable pulse WEBL from input-use timing-generator 128, it generates a data-writing address signal and a write-enable signal to the first buffer-memory 122 and the second buffer-memory 123, input-use address-generator 127A of the present fifth preferred embodiment also has a function for generating a sampling signal ST.

Data in the raw image format, outputted from image data storing unit 126A to interpolating unit 125, are subjected to a pixel interpolating process, and then outputted to EVF106 in a field sequential color component array.

Data conversion circuit 105A in accordance with the above-mentioned fifth preferred embodiment converts the dot sequential data processed in pixel processing unit 108A shown in FIG. 8 to data of a raw image format having a single color component with respect to each pixel, and stores the resulting data in the first and second buffer memories 123; therefore, it is possible to reduce the memory capacity, and consequently to make the circuit scale smaller as well as reducing the production costs.

Here, in the present fifth preferred embodiment, color space conversion circuit 141 in signal conversion circuit 146 converts inputted YCbCr data in the 4:4:4 format to RGB data, and selector 142 then converts these to data in the raw image format, and outputs the resulting data. The data in the raw image format are subjected to a resolution conversion (culling), and then stored in buffer-memories 122, 123, with the result that there is a loss of image information. Consequently, when interpolating data having a plurality of color components in each pixel are generated in interpolating unit 125, any false color might be generated in the interpolating data, particularly in edge portions, such as slanting line portions and color border portions. In an attempt to suppress the generation of any false color of this type, color space conversion circuit 141 is removed from signal conversion circuit 146 so that selector 142 converts YCbCr data in the 4:4:4 format to data in the raw image format, and then outputted, and a circuit corresponding to the above-mentioned color space conversion circuit 141 is assembled in interpolating unit 125; thus, the resulting circuit preferably carries out color-space conversion on YCbCr data (interpolation data) that have been read out from buffer-memories 122, 123 and subjected to pixel interpolation to RGB data.

Sixth Preferred Embodiment

Figure 15:
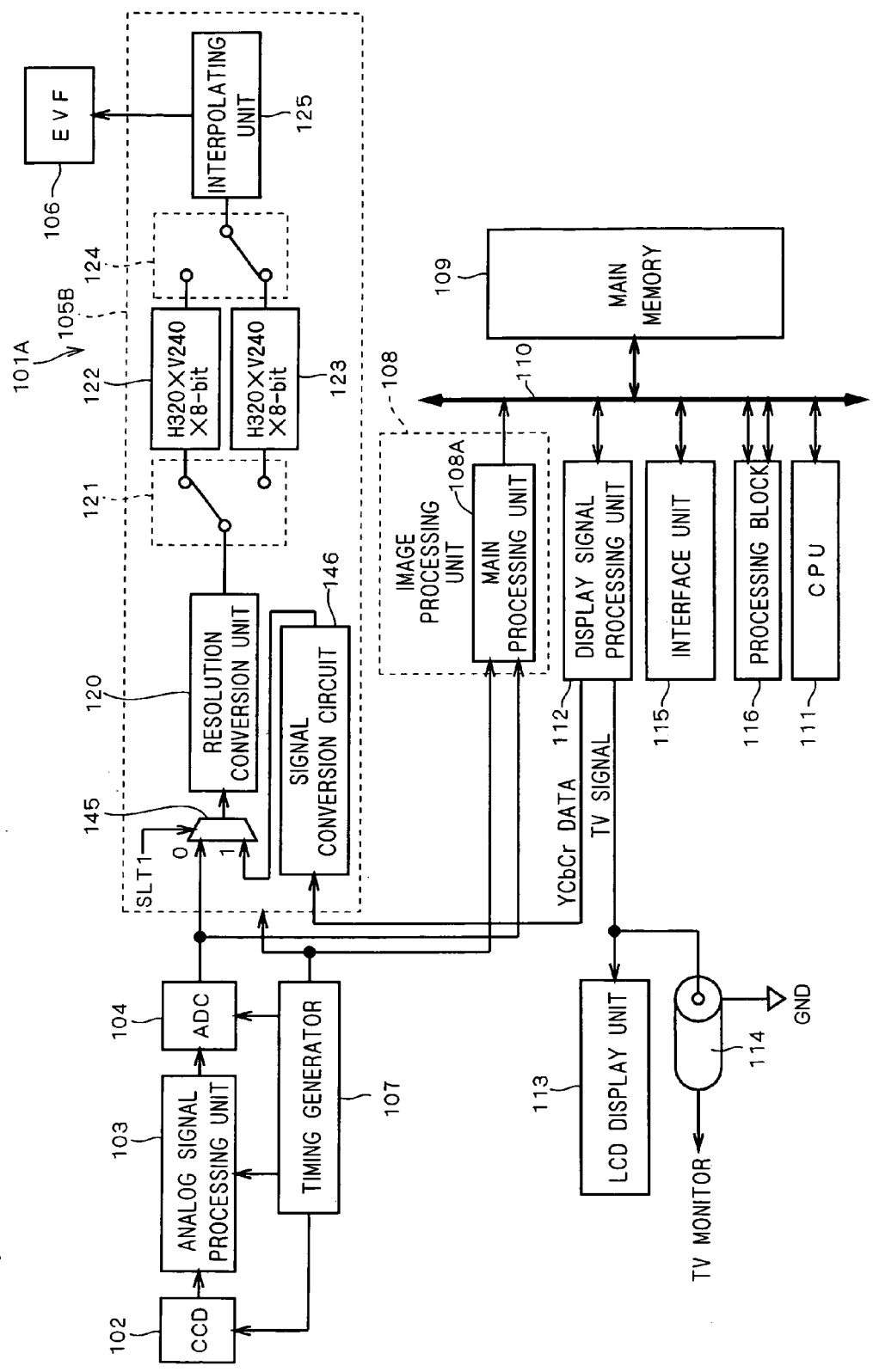
FIG. 15 is a functional block diagram that shows a schematic construction of a digital camera in accordance with sixth preferred embodiment of the present invention.

Next, FIG. 15 is a functional block diagram that schematically shows a construction of a digital camera 101A in accordance with sixth preferred embodiment of the present invention. In FIG. 15, on the assumption that those blocks indicated by the same reference numerals as those shown in FIG. 8 have substantially the same functions, the detailed explanation thereof is omitted.

This digital camera 101A features that it has both of the functions of data conversion circuit 105 of fourth preferred embodiment and data conversion circuit 105A of fifth preferred embodiment in a manner so as to be freely switched. In other words, a data conversion circuit 105B of the present sixth preferred embodiment is provided with a signal conversion circuit 146 which converts YCbCr data in the 4:2:2 format inputted from display signal processing unit 112 to data in the raw image format, and a selector 145 which is allowed to select any one of "0" side terminal to which the raw image data outputted from A/D conversion circuit 104 are inputted and "1" side terminal to which data in the raw image format outputted from signal conversion circuit 146 are inputted. Moreover, data conversion circuit 105B is constituted by a resolution conversion circuit 120, a writing control unit 121, a first buffer memory 122, a second buffer memory 123, a reading control unit 124 and an interpolating unit 125, which have the same constructions as those shown in FIG. 8.

In accordance with a mode switching signal SLT1 transmitted from CPU 111, selector 145 selects "0" side terminal at the time of its signal level of "L" to output raw image data inputted from A/D conversion circuit 104 to resolution conversion circuit 120. In contrast, at the time of the signal level "H" of mode switching signal SLT1, selector 145 selects "1" side terminal to output data in the raw image format inputted from signal conversion circuit 146 to resolution conversion circuit 120. The user is allowed to operate switches (not shown) placed on digital camera 101A so that CPU111 detects the results of the switching operation to generate mode switching signal SLT1. Thus, by utilizing EVF106 in place of LCD display unit 113 having a greater power consumption, the motion images processed in image processing unit 108A can be confirmed so that it becomes possible to reduce the power consumption. Moreover, recorded images, read out from a memory card, a recording tape or the like through interface unit 115 can be displayed on EVF106 with low power consumption. Moreover, another advantage is that, even when LCD display unit 113 has stopped due to a malfunction, etc., the substituting means can be used.

Figure 16:
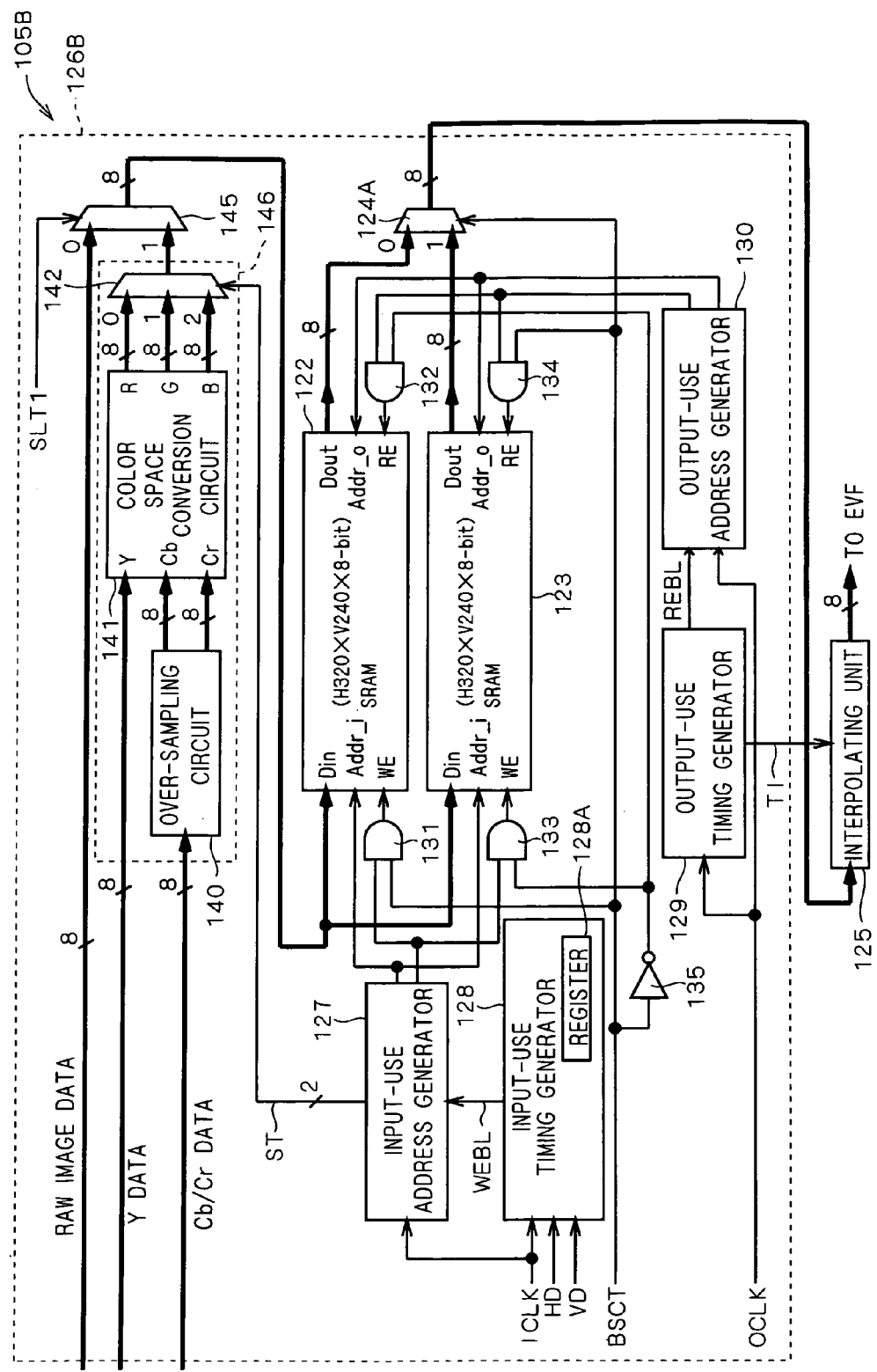
FIG. 16 is a drawing that shows a specific example of a data conversion circuit in accordance with sixth preferred embodiment.

FIG. 16 is a circuit diagram that shows a specific example of the above-mentioned data conversion circuit 105B. This data conversion circuit 105B is constituted by an image data storing unit 126B and an interpolating unit 125. Image data storing unit 126B has substantially the same construction as that of image data storing unit 126A of the above-mentioned fifth preferred embodiment, except that selector 145, which has "1" side terminal to which data in the raw image format outputted from selector 142 are inputted and "0" side terminal to which the raw image data are inputted, is installed therein. Therefore, in the case of a mode for displaying the raw image data (hereinafter, referred to as "raw image display mode"), image data storing unit 126B of the present sixth preferred embodiment is allowed to operate in the same manner as image data storing unit 126 of the above-mentioned fourth preferred embodiment, while in the case of a mode for displaying dot sequential data (hereinafter, referred to as "raw image format display mode"), it is allowed to operate in the same manner as image data storing unit 126A of the above-mentioned fifth preferred embodiment.

Seventh Preferred Embodiment

Figure 17:
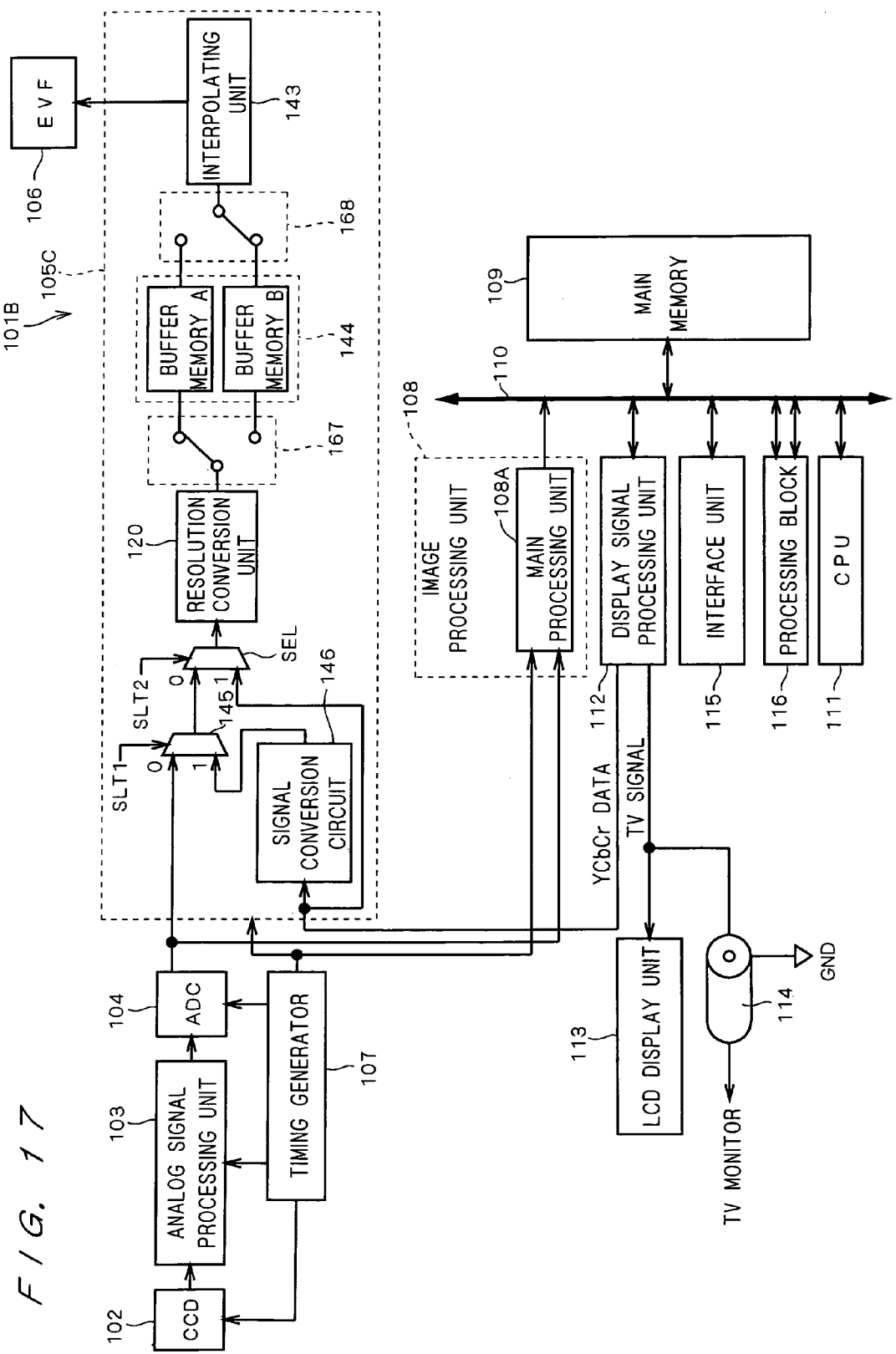
FIG. 17 is a functional block diagram that shows a schematic construction of a digital camera in accordance with seventh preferred embodiment of the present invention.

Next, FIG. 17 is a functional block diagram that schematically shows a construction of a digital camera 101B in accordance with seventh preferred embodiment of the present invention. This digital camera 101B of the present seventh preferred embodiment has substantially the same construction as that of digital camera 101A of the above-mentioned sixth preferred embodiment, except for the construction and the controlling method of a data conversion circuit 105C, shown in this Figure. On the assumption that those blocks in FIG. 17 indicated by the same reference numerals as those shown in FIG. 8 and FIG. 15 have substantially the same functions, the detailed explanation thereof is omitted.

This data conversion circuit 105C in accordance with the present seventh preferred embodiment is provided with a signal conversion circuit 146 and a selector 145 in the same manner as the aforementioned sixth preferred embodiment, and selector 145 selects any one of the raw image data inputted from A/D conversion circuit 104 and data in the raw image format inputted from signal conversion circuit 146, and outputs the resulting data, depending on "L" and "H" of signal levels of mode switching signal SLT1. Moreover, data conversion circuit 105C is also provided with a selector SEL which selects any of data inputted from selector 145 and dot sequential data inputted from display signal processing unit 112, and outputs the resulting data to resolution conversion circuit 120. When the signal level of mode switching signal SLT2 transmitted from CPU 111 is "L", this selector SEL sets the signal level of mode switching signal SLT1 to "H" or "L" level so that data conversion circuit 105C is switched to the above-mentioned "raw image format display mode" or "raw image display mode". In other words, selector SEL selects the raw image data inputted to "0" side terminal from selector 145 or data in the raw image format, and outputs the resulting data to resolution conversion circuit 120. Resolution conversion circuit 120 resolution-converts the inputted data in the raw image format in accordance with the number of display pixels of EVF106, and outputs the resulting data to writing control unit 167, and writing control unit 167 alternately stores pixel data inputted from resolution conversion circuit 120 to buffer memory A and buffer memory B on a frame basis or a field basis. During a period in which the pixel data are being written in one of buffer memory A and buffer memory B, a reading operation of pixel data from the other is carried out in parallel with each other under control of reading control unit 168. Interpolating unit 143 generates interpolated data formed by pixel-interpolating using pixel data inputted from reading control unit 168, and outputs color field sequential data formed by arranging color components of the interpolated data in a color field sequential format to EVF106.

In the above-mentioned "raw image display mode" and "raw image format display mode", the image data whose size has been reduced through a culling process (resolution converting process) are stored in buffer memory A and buffer memory B; therefore, there might be a loss in a part of image information. Consequently, when the pixel interpolating process is carried out in interpolating unit 143, any false color might be generated in the image, particularly in edge portions, such as slanting line portions and color border portions, occasionally causing slight degradation in the image quality. Data conversion circuit 105C has an operation mode (dot sequential image display mode) used for preventing degradation in the image quality of this type.

When data conversion circuit 105C is in the "dot sequential image display mode", the signal level of mode switching signal SLT2 is switched to "H". At this time, selector SEL outputs dot sequential data to be inputted to "1" side terminal from display signal processing unit 112 to writing control unit 167. Writing control unit 167 carries out a controlling operation so that an even field consisting of even-numbered lines of the inputted dot sequential data and an odd field consisting of odd-numbered lines thereof are stored in buffer memory A and buffer memory B alternately. Moreover, during a period in which one of the odd field and the even field is being written in one of buffer memory A and buffer memory B, reading control unit 168 carries out a controlling operation so that the other field is being read from the other buffer memory, and outputs the resulting field to interpolating unit 143. In the case when the inputted pixel data belong to the even field, interpolating unit 143 insertion-interpolates pixel data of insufficient odd fields for each of color components by using a linear interpolating method, etc., and outputs the resulting data to EVF106 in a color field sequential format. In contrast, in the case when the inputted pixel data belong to the odd field, interpolating unit 143 generates interpolated data formed by insertion-interpolating insufficient even fields for each of color components, and arranges the color components of the interpolated data in a color field sequential format to generate color field sequential data so that these color field sequential data are outputted to EVF 106.

Therefore, it is only necessary for buffer memories A, B to have a memory area corresponding to a total of one frame so as to generate color field sequential data, and it is not necessary to cull the dot sequential data inputted from display signal processing unit 112; therefore, it is possible to suppress the generation of any false color, and consequently to improve the image quality. However, one of the even field and odd field is inevitably insertion-interpolated with the result that there is greater degradation in the vertical resolution in comparison with the above-mentioned "original image format display mode". Therefore, by taking into consideration the optical characteristic of a display image, either one of the "raw image format display mode" and "dot sequential image display mode" may be selected to display the image.

Figure 19:
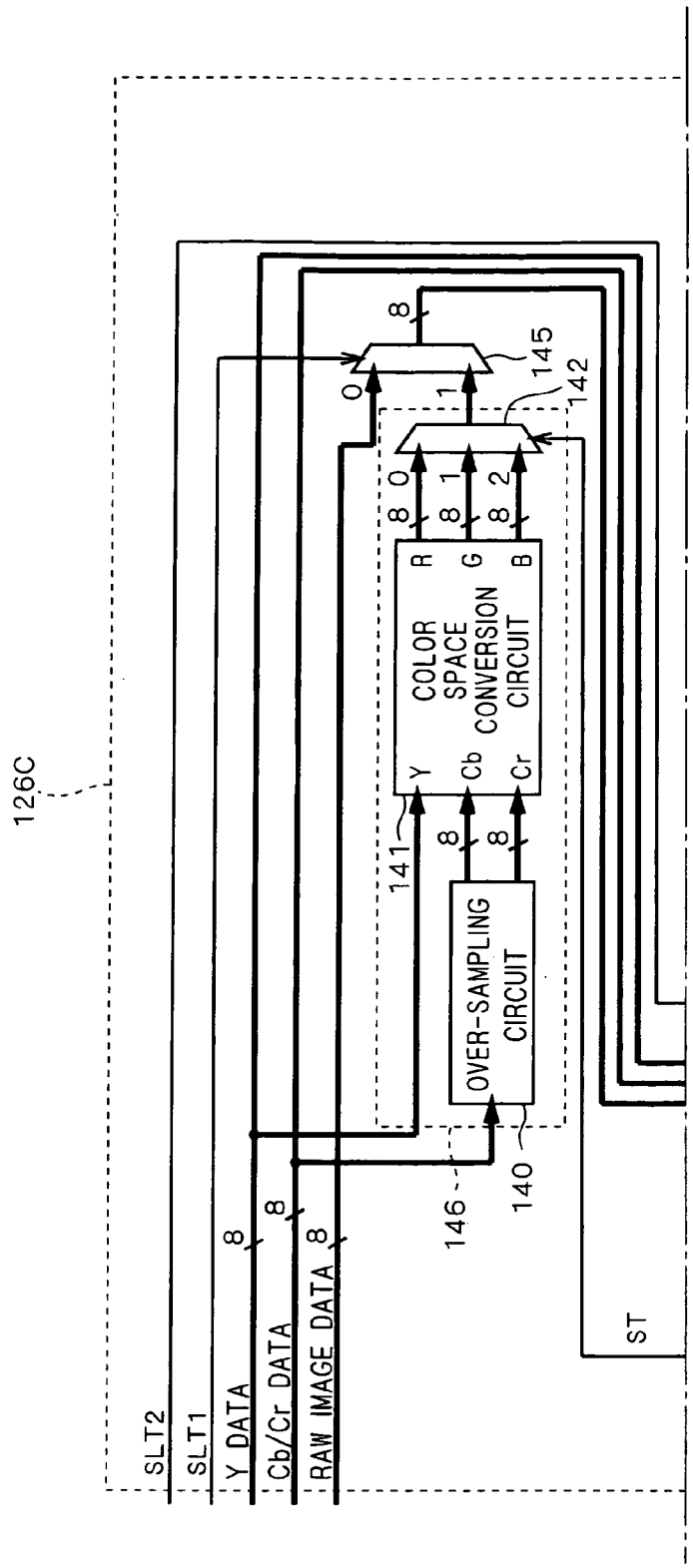
FIG. 19 is a circuit diagram that shows a part of an image data storing unit that constitutes a data conversion circuit in accordance with seventh preferred embodiment.
Figure 20:
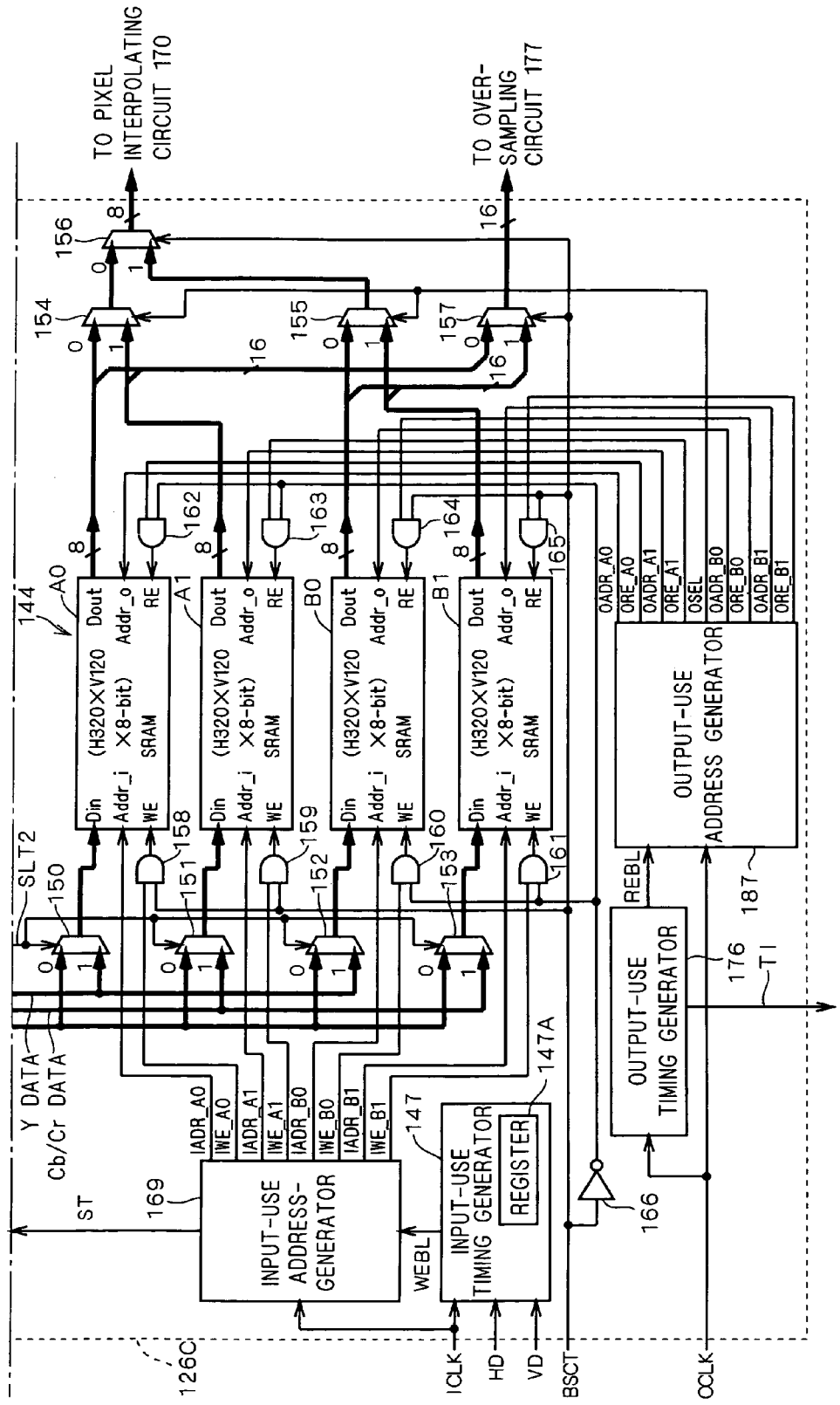
FIG. 20 is a circuit diagram that shows a part of the image data storing unit that constitutes the data conversion circuit in accordance with seventh preferred embodiment.

Next, FIG. 18, FIG. 19, FIG. 20 and FIG. 21 are circuit diagrams that show a specific example of a data conversion circuit 105C in accordance with the present seventh preferred embodiment. FIG. 18 is a drawing that shows a positional relationship between FIG. 19 and FIG. 20, and FIG. 19 and FIG. 20 are continued to each other through an alternate long and short dash line. This data conversion circuit 105C is constituted by an image data storing unit 126 shown in FIG. 19 and FIG. 20 and an interpolating unit 143 shown in FIG. 21.

This image data storing unit 126 is provided with buffer memories A0, A1, B0, B1. A first buffer memory group A0, A1 forms one bank, and a second buffer memory group B0, B1 forms one bank so that a storing area of a total of 2 banks is provided. The buffer memory group has a storing area ((bit length of one pixel data)×320×240 bits) corresponding to the number of display pixels of EVF 106 per bank. In the case of the present preferred embodiment, one pixel data has an 8-bit length. Therefore, the capacity of each buffer memory is half the memory capacity of one bank, that is, 8×320×120 bits. Each buffer memory is provided with write enable terminal WE and read enable terminal RE, and enable terminals WE, RE of each buffer memory receive signal inputs from AND elements 158, 159, 160, 161, 162, 163, 164 and 165. Bank selection signal BSCT is inputted to AND elements 158, 159 connected to enable terminal WE of the first buffer memory group A0, A1 and AND elements 164, 165 connected to enable terminal RE of the second buffer memory group B0, B1. Moreover, an inversion signal, obtained by level-inverting bank selection signal BSCT by using an inverter 166, is inputted to AND elements 160, 161 connected to enable terminal WE of the second buffer memory group B0, B1 and AND elements 162, 163 connected to enable terminal RE of the first buffer memory group A0, A1. Therefore, in the case when data are written in the first buffer memory group A0, A1 while data are read from the second buffer memory group B0, B1, the signal level of bank selection signal BSCT is switched to "H", and in the case when data are written in the first buffer memory group B0, B1 while data are read from the second buffer memory group A0, A1, the signal level of bank selection signal BSCT is switched to "L".

Moreover, both of input-use timing generator 147 and input-use address generator 169 are operated in synchronism with supplied input pixel clock ICLK. In the same manner as input-use timing generator 128 of the aforementioned fourth preferred embodiment, input-use timing generator 147 generates write-enable pulse WEBL that indicates data-writing timing by using input pixel clock ICLK, horizontal synchronous signal HD and vertical synchronous signal VD based upon conversion coefficients α, β (culling rate) held in register 47A.

In the same manner as input-use address generator 127 of the aforementioned fourth preferred embodiment, input-use address generator 169 carries out an operation for allowing a built-in address counter to successively increment addresses, each time the above-mentioned write enable pulse WEBL is received, to generate address signals (IADR_A0, IADR_A1, IADR_B0, IADR_B1), and outputs these to the respective address input terminals Addr_i of the respective buffer memories A0, A1, B0, B1. Moreover, at the time of writing data, input-use address generator 169 generates write enable signals (IWE_A0, IWE_A1, IWE_B0, IWE_B1) to the respective buffer memories A0, A1, B0, B1, and outputs these to the respective AND elements 158, 159, 160, 161. AND elements 158, 159 subject bank selection signal BSCT and write enable signals (IWE_A0, IWE_A1) to a logical product operation, and outputs an H-level signal for permitting a writing operation only when both of the signal levels are "H" to enable terminal WE. In contrast, AND elements 160, 161 subject an inversion signal of bank selection signal BSCT and write enable signals (IWE_B0, IWE_B1) to a logical product operation, and outputs an H-level signal for permitting a writing operation only when both of the signal levels are "H" to enable terminal WE.

Moreover, both of output-use timing generator 176 and output-use address generator 187 are operated in synchronism with supplied output pixel clock OCLK. In the same manner as output-use timing generator 129 of the aforementioned fourth preferred embodiment, output-use timing generator 176 generates read enable pulse REBL indicating data reading timing by using output pixel clock OCLK, and outputs the resulting pulse. Output-use address generator 187 carries out an operation for allowing a built-in address counter to successively increment addresses, each time the above-mentioned read enable pulse REBL is received, to generate address signals (OADR_A0, OADR_A1, OADR_B0, OADR_B1), and outputs these to the respective address input terminals Addr_o of the respective buffer memories A0, A1, B0, B1. Moreover, at the time of reading data, output-use address generator 187 generates read enable signals (ORE_A0, ORE_A1, ORE_B0, ORE_B1) to the respective buffer memories A0, A1, B0, B1, and outputs these to the respective AND elements 162, 163, 164, 165. AND elements 162, 163 subject an inversion signal of bank selection signal BSCT and read enable signals (ORE_A0, ORE_A1) to a logical product operation, and outputs an H-level signal for permitting a data reading operation only when both of the signal levels are "H" to enable terminal RE. Moreover, AND elements 164, 165 subject bank selection signal BSCT and read enable signals (ORE_B0, ORE_B1) to a logical product operation, and outputs an H-level signal for permitting a data reading operation only when both of the signal levels are "H" to enable terminal RE.

Moreover, selector 145 selects "0" side terminal or "1" side terminal under control of the above-mentioned mode switching signal SLT1, in response to the aforementioned "raw image display mode" or "raw image format display mode".

The operation of data conversion circuit 105C when it is in the "raw image display mode" is described below. In this case, selector 145 selects the raw image data inputted from A/D conversion circuit 104, and outputs the resulting data to the "0" side terminals of selectors 150, 151, 152, 153. The respective selectors 150 to 153 have selected "0" side terminals under control of mode switching signal SLT2 so that the raw image data successively inputted from the "0" side terminals are outputted to data input terminals Din of buffer memories A0, A1, B0, B1. The raw image data are stored in the first buffer memory group A0, A1 and the second buffer memory group B0, B1 alternately on a frame basis or on a field basis. In other words, during a period in which the signal level of bank selection signal BSCT is "H", pixel data that have been culled are stored in the first buffer memory group A0, A1, and during a period in which the signal level of bank selection signal BSCT is "L", pixel data that have been culled are stored in the second buffer memory group B0, B1. The culling process (resolution conversion process) is carried out by address signals (IADR_A0, IADR_A1, IADR_B0, IADR_B1) and write enable signals (IWE_A0, IWE_A1, IWE_B0, IWE_B1) generated by input-use address generator 169 in response to write enable pulse WEBL generated in input-use timing generator 147.

Here, during a period in which the pixel data are being written in one of the first buffer memory group A0, A1 and the second buffer memory group B0, B1, the stored pixel data are read out from the other. In other words, during the period of "H" of the signal level of bank selection signal BSCT, the pixel data are successively read out from the second buffer memory group B0, B1, and outputted to selector 155, and during the period of "L" of the signal level of bank selection signal BSCT, the pixel data are successively read from the first buffer memory group A0, A1, and outputted to selector 154. Selectors 154, 155 are controlled so as to select "0" side terminal or "1" side terminal in accordance with the signal level of "L" or "H" of selection control signal OSEL generated and outputted from output-use address generator 187. Output-use address generator 187 generates data reading address signals (OADR_A0, OADR_A1, OADR_B0, OADR_B1) and read enable signals (ORE_A0, ORE_A1, ORE_B0, ORE_B1) in response to read enable pulse REBL generated by output-use timing generator 176.

During a period of "L" of the signal level of bank selection signal BSCT, in the case when the pixel data corresponding to generated addresses are stored in buffer memory A0, output-use address generator 187 switches the signal level of selection control signal OSEL to "L", and in the case when the pixel data corresponding to the address are stored in buffer memory A1, it switches the signal level of selection control signal OSEL to "H". At this time, selector 156 selects "0" side terminal under control of bank selection signal BSCT of L level, and outputs the pixel data of 8-bit length outputted from selector 154 to pixel interpolating circuit 170. In contrast, during a period of "H" of the signal level of bank selection signal BSCT, in the case when the pixel data corresponding to the generated address are stored in buffer memory B0, output-use address generator 187 switches the signal level of selection control signal OSEL to "L", and in the case when the pixel data corresponding to the generated address are stored in buffer memory B1, it switches the signal level of selection control signal OSEL to "H". In this case, selector 156 selects "1" side terminal under control of bank selection signal BSCT of the H level so that the pixel data of 8-bit length outputted from selector 155 are outputted to pixel interpolating circuit 170.

Figure 21:
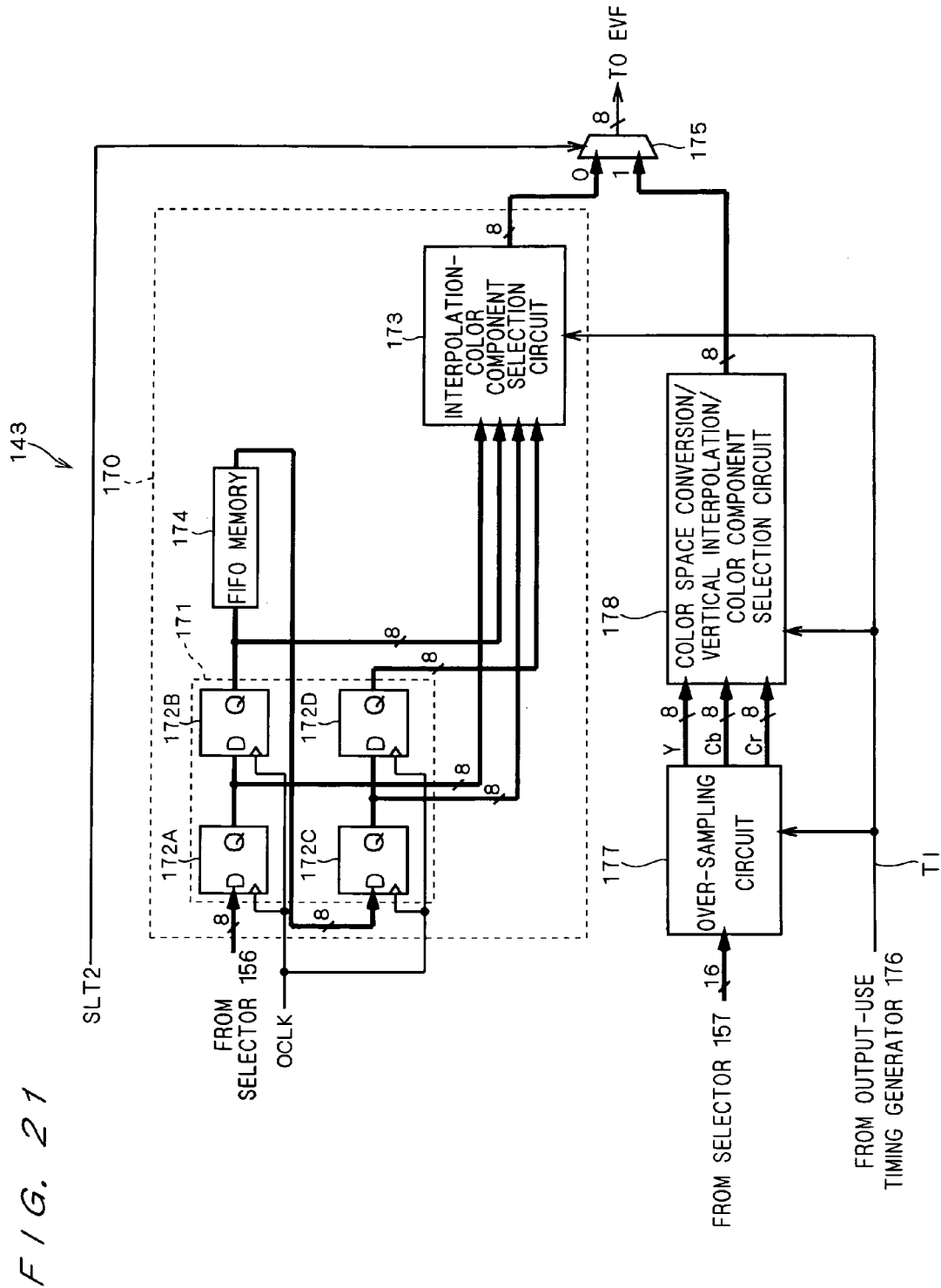
FIG. 21 is a circuit diagram that shows an interpolating unit that constitutes the data conversion circuit in accordance with seventh preferred embodiment.

As shown in FIG. 21, pixel interpolating circuit 170 constituting interpolating unit 143 is provided with a pixel register group 171 holding a pixel area of 2×2 of raw image data inputted from selector 156. Pixel register group 171 is provided with registers 172A, 172B and registers 172C, 172D that are series-connected through FIFO memory 174, and the respective registers 172A to 172D are operated in synchronism with output pixel clock OCLK. Interpolation-color component selection circuit 173 is operated in synchronism with a timing signal TI transmitted from output-use timing generator 176, and in the same manner as interpolation-color component selection circuit 139 of the aforementioned fourth preferred embodiment, it selectively acquires the pixel data of 8-bit length outputted from the respective registers 172A to 172D, carries out a pixel interpolating process on these, and outputs the resulting color field sequential data to selector 175. Selector 175 outputs the color field sequential data that are inputted to "0" side terminal under control of mode switching signal SLT2 of L level to EVF 106.

Next, the operation of data conversion circuit 105C when it is in the "raw image format display mode" is described below. In this case, selector 145 selects the raw image format data (RGB data) inputted from signal inversion circuit 146, and outputs the resulting data to the "0" side terminals of selectors 150, 151, 152, 153. In signal conversion circuit 146, over-sampling circuit 140 over-samples YCbCr data having a format of 4:2:2 outputted from display signal processing unit 112 to YCbCr data having a format of 4:4:4. Color space conversion circuit 141 color-space-converts YCbCr data to R data, G data and B data, each having an 8-bit length, and outputs these to "0" side terminal, "1" side terminal and "2" side terminal of selector 142. Selector 142 selects the terminals in accordance with the value of sampling signal ST transmitted from input-use address generator 169, and outputs data in the raw image format such as a Bayer array to selector 145. The other operations are the same as those at the time of the "raw image display mode".

Next, the operation of data conversion circuit 105C when it is in the "dot sequential image display mode" is described below. At this time, selectors 150, 151, 152 and 153 are allowed to select "1" side terminals under control of mode switching signal SLT2 of H level. Selectors 150, 152 output Y data of an 8-bit length inputted from display signal processing unit 112 to data input terminals Din of buffer memories A0, B0. Further, selectors 151, 153 output Cb/Cr data of an 8-bit length inputted from display signal processing unit 112 to data input terminals Din of buffer memories A1, B1.

During a period of "H" of the signal level of bank selection signal BSCT, even fields of Y data and Cb/Cr data are stored in the first buffer memory group A0, A1 by address signals (IADR_A0, IADR_A1, IADR_B0, IADR_B1) and write enable signals (IWE_A0, IWE_A1, IWE_B0, IWE_B1) that input-use address generator 169 has generated in accordance with write enable pulse WEBL generated by input-use timing generator 147. Moreover, during this period, odd fields of Y data and Cb/Cr data are read from the second buffer memory group B0, B1 by address signals (IRE_A0, IRE_A1, IRE_B0, IRE_B1) and read enable signals (ORE_A0, ORE_A1, ORE_B0, ORE_B1) that output-use address generator 187 has generated in accordance with read enable pulse REBL generated by output-use timing generator 176. Here, during a period of "L" of the signal level of bank selection signal BSCT, odd fields of Y data and Cb/Cr are stored in the second buffer memory group B0, B1. Moreover, during this period, even fields are read out from the first buffer memory groups A0, A1. In this manner, YCbCr data (even field) of a 16-bit length, read from the first buffer memory group A0, A1, are inputted to "0" side terminal of selector 157, and YCbCr data (odd field) of a 16-bit length, read from the second buffer memory group B0, B1, are inputted to "1" side terminal of selector 157. Therefore, during a period of "H" of the signal level of bank selection signal BSCT, selector 157 outputs YCbCr data of odd fields to be inputted to "1" side terminal of selector 157, and during a period of "L" of the signal level of the signal, selector 157 outputs YCbCr data of even fields to be inputted to "0" side terminal.

Over-sampling circuit 177 of interpolating unit 143, shown in FIG. 21, is operated in synchronism with timing signal TI transmitted from output-use timing generator 176 so that YCbCr data of a 16-bit length inputted from selector 157 are over-sampled and converted to YCbCr data of 4:4:4 format, and Y data, Cb data and Cr data, each having an 8-bit length, are outputted to color-space conversion/vertical interpolation/color component selection circuit 178. This color-space conversion/vertical interpolation/color component selection circuit 178 is operated in synchronism with the above-mentioned timing signal TI so that inputted YCbCr data are color-space converted to RGB data, and an insertion-interpolating (vertical interpolating) process is carried out on the RGB data for each of the color components on a field basis. In the case when the RGB data are made of odd fields, this insertion-interpolating process is carried out by interpolating even fields by using pixel data on the odd fields by using a linear-interpolating method, etc., and in the case when the RGB data are made of even fields, it is carried out by interpolating odd fields by using pixel data on the even fields. The above-mentioned output-use timing generator 176 and output-use address generator 187 are controlled so as to read out pixel data of the same field N times (N: the number of color); therefore, color-space conversion/vertical interpolation/color component selection circuit 178 successively carries out a vertical interpolating process on a field basis of each of R field, G field and B field, and outputs the resulting color field sequential data to selector 175. Selector 175 selects "1" side terminal under control of mode switching signal SLT2 of H level so that the color field sequential data are outputted to EVF106.

Eighth Preferred Embodiment

Figure 22:
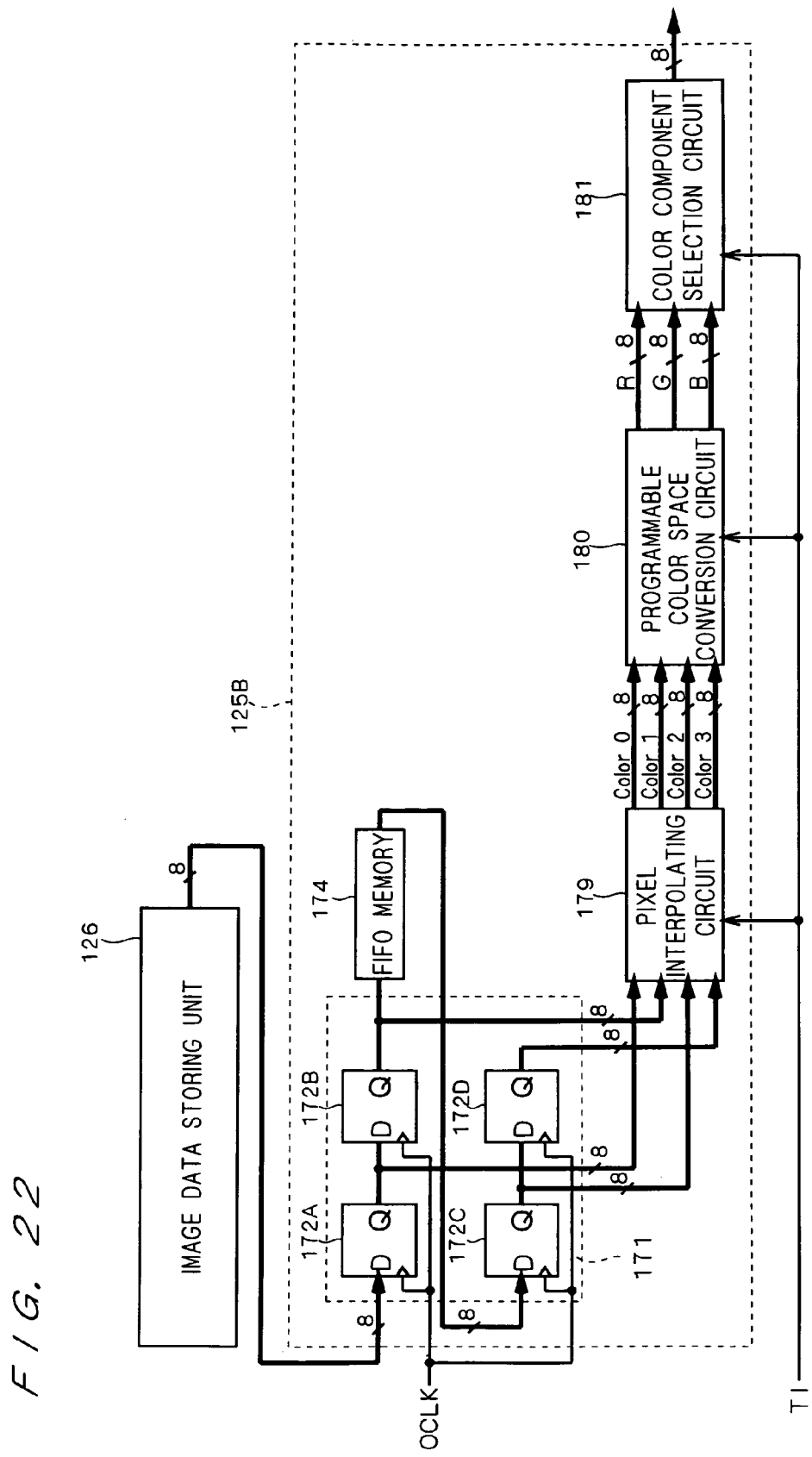
FIG. 22 is a circuit diagram that shows an interpolating unit that constitutes a data conversion circuit in accordance with eighth preferred embodiment of the present invention.

Next, FIG. 22 shows a circuit diagram that schematically shows an interpolating unit 125B that forms a data conversion circuit in accordance with eighth preferred embodiment of the present invention. This interpolating unit 125B is constituted by a pixel register group 171 for storing pixel data of 2×2 pixel area among pixel data inputted from image data storing unit 126, a pixel interpolating circuit 179, a programmable color space conversion circuit 180 and a color component selection circuit 181. Pixel interpolating circuit 179, programmable color space conversion circuit 180 and color component selection circuit 181 are operated in synchronism with timing signal TI transmitted from image data storing unit 126. Moreover, pixel register group 171 is constituted by registers 172A, 172B and registers 172C, 172D that are series-connected through FIFO memory 174. Here, instead of image data storing unit 126 shown in the Figure, any of image data storing units 126A, 126B, 126C of the above-mentioned fifth, sixth and seventh preferred embodiments may be used.

The above-mentioned pixel interpolating circuit 179 selectively acquires pixel data from the respective registers 172A to 172D constituting pixel register group 171, generates 4 color components (Color 0, Color 1, Color 2, Color 3) for each pixel by using a linear interpolating process, and outputs the resulting data to programmable color space conversion circuit 180. Moreover, programmable color space conversion circuit 180 has a function for color-space converting inputted 4-color components to RGB signals and also has a function for variably setting a conversion coefficient $\alpha(i, j)$ (i=0 to 2, j=0 to 3) that converts the color space. Moreover, programmable color space conversion circuit 180 can hold a conversion coefficient $\alpha(i, j)$ transmitted from CPU 111 or the like. Here, supposing that an input value of four color components is I(m) (m=0, 1, 2, 3) and that an output value of three color components is O (n) (n=0, 1, 2), the output value of the n-numbered color component is calculated based upon the following equation: $O(n)=\alpha(n, 0)\times I(0)+\alpha(n, 1)\times I(1)+\alpha(n, 2)\times I(2)+\alpha(n, 3)\times I(3)$. Since conversion coefficient $\alpha(i, j)$ is variably set in this manner, it becomes possible to select a desired color space without limiting the color space of the output value to the RGB space. Moreover, the data conversion circuit in accordance with the present preferred embodiment makes it possible to set conversion coefficient $\alpha(i, j)$ in accordance with the kind of a color filter array placed in the image-pickup sensor; therefore, independent of the type of color filter array, it is possible to deal with any filter array such as those of three-primary color type and complementary color type.

Moreover, color component selection circuit 181 selects R data, G data and B data outputted from programmable color space conversion circuit 180 in a manner so as to be outputted in a color field sequential format, and outputs color field sequential data of an 8-bit length. The pixel data of the same field is read out from image data storing unit 126 N-times (N: number of color of output value) repeatedly and inputted to interpolating unit 125B so that color component selection circuit 181 selects the same color component every time so as to sequentially output R field, G field and B field.

Ninth Preferred Embodiment

Figure 23:
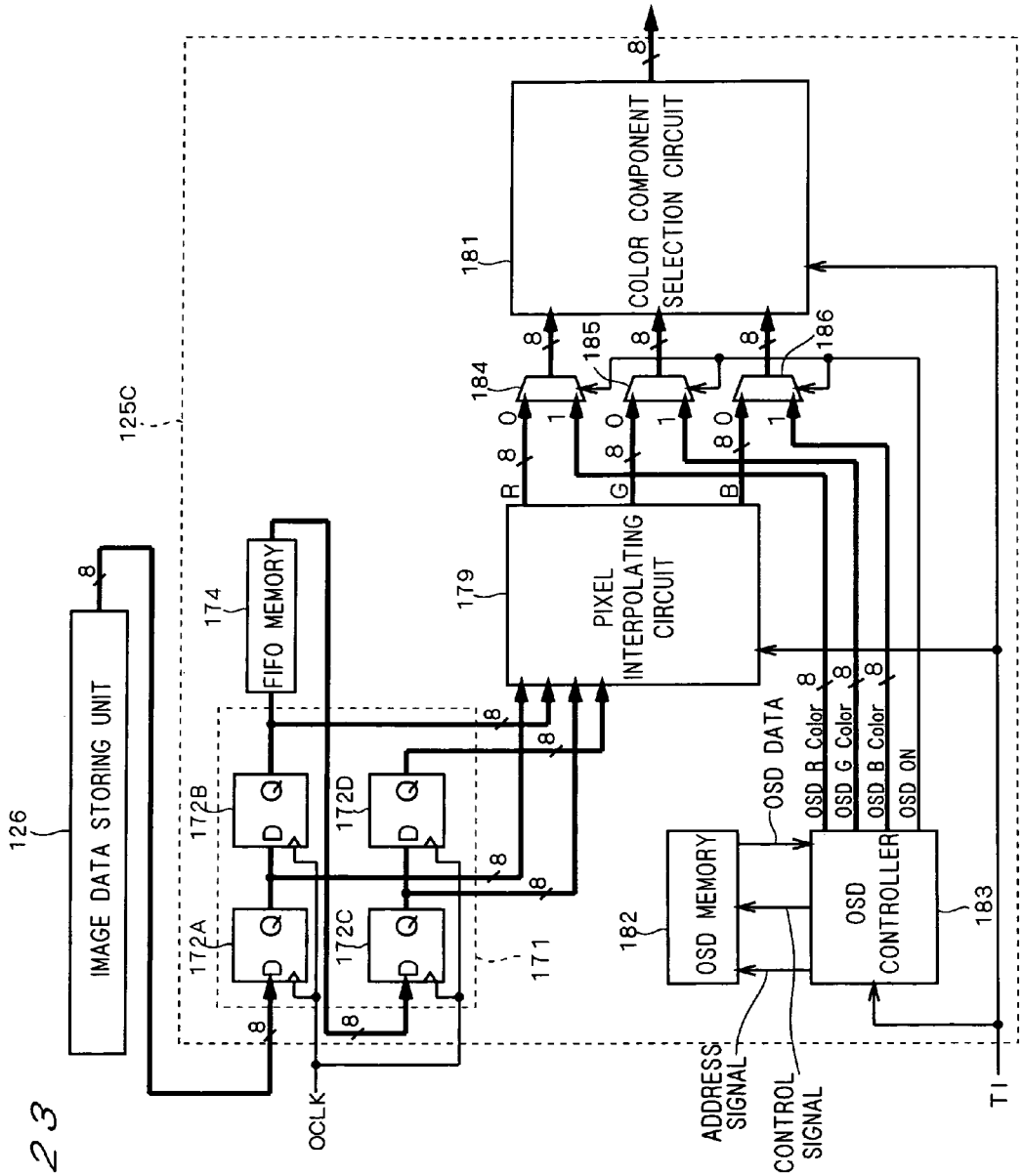
FIG. 23 is a circuit diagram that shows an interpolating unit that constitutes the data conversion circuit in accordance with ninth preferred embodiment.

Next, FIG. 23 is a circuit diagram that shows an interpolating unit 125C that forms a data conversion circuit in accordance with ninth preferred embodiment of the present invention. In the same manner as the data conversion circuit relating to the aforementioned eighth preferred embodiment, this interpolating unit 125C is provided with a pixel register group 171 for storing pixel data of 2×2 pixel area among image data inputted from image data storing unit 126, a pixel interpolating circuit 179 and a color component selection circuit 181, and an OSD (on-screen-display) memory 182, an OSD controller 183 and selectors 184, 185, 186. Pixel interpolating circuit 179, color component selection circuit 181 and OSD controller 183 are operated in synchronism with timing signal TI transmitted from image data storing unit 126. Here, instead of image data storing unit 126 shown in the Figure, any of image data storing units 126A, 126B and 126C of the aforementioned fifth, sixth and seventh preferred embodiments may be used.

OSD data including codes such as characters and symbols and bit map data like icon images are stored in this OSD memory 182, and under control of CPU 111, controller 183 outputs address signals and control signals to OSD memory 182, and acquires OSD data from OSD memory 182. OSD controller 183 generates pixel data (OSD R Color, OSD G Color, OSD B Color) of respective color components so as to display the acquired OSD data, and outputs these to "1" side terminals of selectors 184, 185, 186. Moreover, pixel interpolating data of RGB are inputted to "0" side terminals of selectors 184, 185, 186 from pixel interpolating circuit 179. In accordance with switching control signal (OSD ON) transmitted from OSD controller 183, selectors 184, 185, 186 select "1" side terminals when the signal level of this switching control signal is "H", and select "0" side terminals when the signal level of this signal level is "L" so that OSD data can be superimposed (multiplexed) on RGB data to be outputted from pixel interpolating circuit 179. Here, the pixel data of the same field is read out from image data storing unit 126 N-times (N: number of color of output value) repeatedly and inputted to interpolating unit 125C so that color component selection circuit 181 selects the same color component every time so as to sequentially output R field, G field and B field. Therefore, in EVF106, it is possible to multiplex-display various pieces of picked-up information (image-pickup time, tape remaining amount, etc.) on EVF106. In particular, the resulting advantage is that raw image data, directly inputted to image data storing unit 126 from A/D conversion circuit 104, and OSD data can be multiplex-displayed.

Tenth Preferred Embodiment

Figure 24:
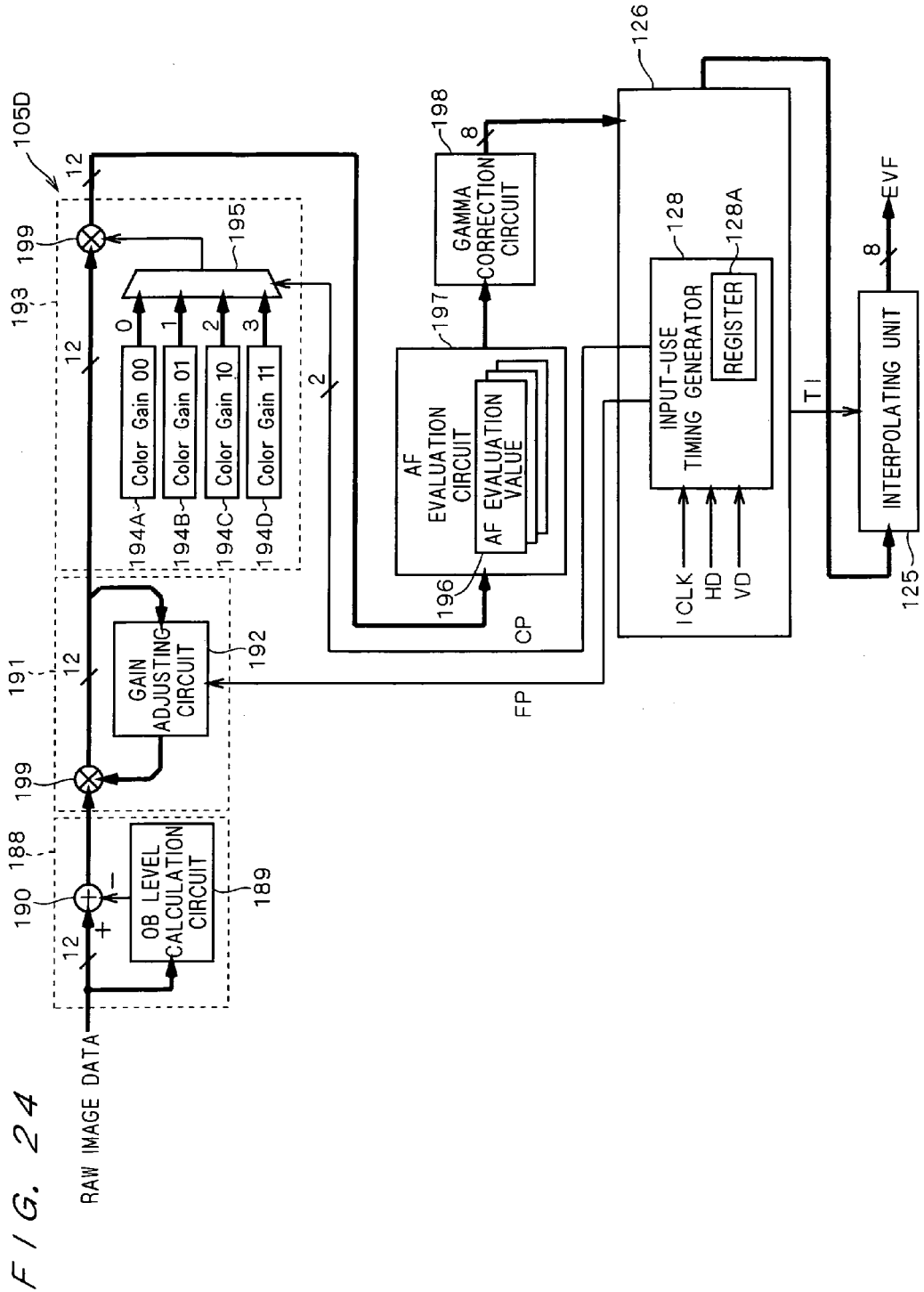
FIG. 24 is a schematic drawing that shows a data conversion circuit in accordance with tenth preferred embodiment of the present invention.

Next, FIG. 24 schematically shows a data conversion circuit 105D in accordance with tenth preferred embodiment of the present invention. This data conversion unit 105D is provided with the aforementioned image data storing unit 126 and interpolating unit 125, and also provided with an OB (optical-black) correction circuit 188, a gain correction circuit 191, a WB (white-balance) correction circuit 193, an AF evaluation value calculating circuit 197 and a gamma correction circuit 198. Here, although the order of arrangements of the respective circuits 188, 191, 193, 197 and 198 are not particularly limited, gamma correction circuit 198 is preferably placed after AF evaluation value calculating circuit 197 from the viewpoint of AF evaluation with high precision. Moreover, if the aforementioned analog signal processing unit 103 has the same function as any one of these circuits 188, 191, 193, 197, 198, the corresponding circuit having the same function may be omitted.

This OB correction circuit 188 clamps luminance values at a plurality of points in an OB area of raw image data having a 12-bit length that are inputted from A/D conversion circuit 104, determines a subtraction value used so as to have the average value of the luminance values matched to a reference value of black level, and outputs this to subtractor 190. Subtractor 190 subtracts the corresponding subtraction value from the inputted raw image data. Normally, the OB area is placed at the leading portion of each horizontal line of raw image data.

Moreover, gain correction circuit 191 acquires an adjusted luminance signal outputted from a multiplier 199 on a basis of the entire area of one frame or on a basis of its central priority point area, and when the average value of luminance signals, thus acquired, exceeds a predetermined target value, it determines a gain coefficient so as to lower the gain of the luminance signal to be inputted to multiplier 199; in contrast, when the average value of luminance signals, thus acquired, is less than the predetermined target value, it determines the gain coefficient so as to raise the gain of the luminance signal to be inputted to multiplier 199. Multiplier 199 multiplies the luminance value of the next frame or field to be inputted by the gain coefficient that is outputted from the gain adjusting circuit 192, and outputs the resulting value. Here, with respect to the timing in which the luminance signal is acquired, control pulse FP, etc. transmitted from input-use timing generator 128, give instructions to gain adjusting circuit 192.

Moreover, the above-mentioned WB correction circuit 193 is provided with registers 194A to 194D for holding coefficient values of respective color components transferred from CPU 111, etc., a selector 195 for selectively acquiring coefficient values from these registers 194A to 194D and for outputting the resulting values to a multiplier 199. Selector 195 acquires a coefficient value held in any one of registers 194A to 194D based upon the value of selection control signal CP having a 2-bit length transmitted from input-use timing generator 128, and outputs the value to multiplier 199. Multiplier 199 multiplies the inputted pixel data by the corresponding coefficient value to output pixel data that have been subjected to white-balance adjustment.

Here, the above-mentioned AF evaluation value calculation circuit 197 has such a function that it extracts a high frequency component Yh of the luminance component of the inputted image data, and calculates AF evaluation value 196 for use in AF (auto focus) based upon the high frequency component Yh. Evaluation value 196 is a value calculated based upon the absolute difference value between the corresponding pixel having the extracted high frequency component Yh and the adjacent pixels. The corresponding evaluation value is fed back to an optical mechanism of a digital camera, and utilized when the lens system of the optical mechanism is driven to be focused. The lens is positioned so that the AF evaluation value, which is obtained by using TTL light in this manner, is maximized. This is referred to as a TTL mountain-climbing system. Here, gamma correction circuit 198 is a circuit for carrying out a gamma conversion so as to have the inputted image data matched to the human visual characteristics.

The above-mentioned fourth to tenth preferred embodiments have exemplified cases in which the data conversion circuits related to the respective preferred embodiments are assembled into digital cameras; however, the present invention is not limited to this structure, and in the case when those data conversion circuits serve as an interface to a color field sequential display in the above-mentioned "raw image format display mode" and the "dot sequential image display mode", those data conversion circuits can be assembled into image-processing apparatuses other than digital cameras.

Figure 25:
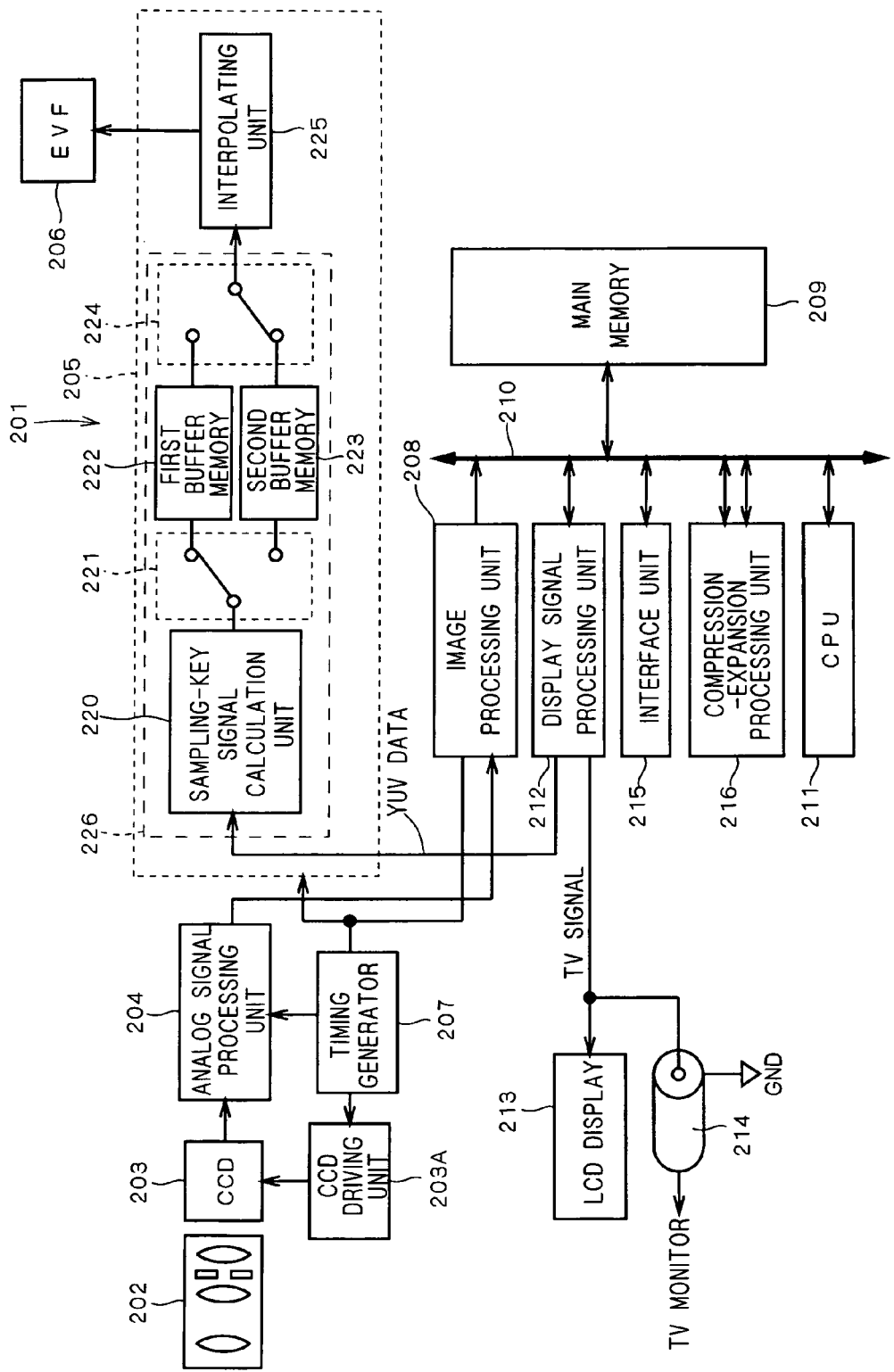
FIG. 25 is a functional block diagram that shows the entire construction of a digital camera in which a data conversion circuit relating to eleventh and twelfth embodiments of the present invention is assembled.

Construction of a Digital Camera Used in Eleventh and Twelfth Preferred Embodiments The following description will discuss eleventh and twelfth preferred embodiments of the present invention. First, a structural example of a digital camera in which each of data conversion circuits related to eleventh and twelfth preferred embodiments is assembled is shown, and data conversion circuits related to the respective preferred embodiments are then explained in detail. FIG. 25 is a functional block diagram that shows the entire construction of a digital camera 201 in which data conversion circuit 205 is assembled. This digital camera 201 is provided with an optical mechanism 202 having an AF (auto-focus) control function and an auto-exposure control function, a CCD image pickup element 203 for receiving light transmitted through this optical mechanism 202, an analog signal processing unit 204 which processes an analog image signal outputted from this CCD image-pickup element 203 to output digital image data (Raw Image Data) and an image processing unit 208 for carrying out digital image processing on the raw image data. Here, timing generator 207 generates clock signals for adjusting operation timing of each of a CCD driving unit 203A, an analog signal processing unit 204, an image processing unit 208 and a data conversion circuit 205.

The above-mentioned CCD image-pickup element 203 is provided with a charge accumulation unit that is operated by receiving a driving signal supplied from CCD driving circuit 203A, and accumulates carriers (electrons or holes) generated through the photoelectric effect, and a charge transferring unit for transferring the accumulated carriers by applying an electric field thereto. On a photosensitive section on this CCD image-pickup element 203, a color filter array of a single-chip type that colors incident light on a pixel basis. For this reason, light rays colored with three primary colors, that is, R (red), G (green) and B (blue) or four colors such as Y (yellow), M (magenta), C (cyan) and G (green), are made incident on the photosensitive section of CCD image-pickup element 203, and subjected to a photoelectric conversion.

Here, instead of CCD image-pickup element 203, a CMOS image-pickup element having no charge transferring unit may be used.

Analog signal processing unit 204 is provided with a CDS (Correlated Double Sampling) circuit, an AGC (Automatic Gain Control) circuit and an A/D conversion circuit. This CCD image-pickup element 203 alternately outputs a reference signal that normally has a reference level of black level and an image signal containing the reference signal in a time-divided manner. In order to eliminate noise components contained in an image signal, CDS circuit samples the reference signal and the image signal, extracts a difference signal between the two signals, and outputs the resulting signal. Moreover, the AGC circuit outputs a signal formed by properly adjusting the signal level of the difference signal inputted from the CDS circuit, and the A/D conversion circuit samples the input signal from the AGC circuit, and outputs raw image data that have been quantized based upon a predetermined quantization bit number.

Image processing unit 208 is an integrated circuit that is operated in synchronism with a clock signal supplied from timing generator 207. This image processing unit 208 has functions for executing various digital image processes on the raw image data inputted from analog signal processing unit 204 in real-time, which include a shading correction process, a pixel interpolating process, a gamma correction process, a color space conversion process, an edge enhancement process and a resolution conversion process. For example, in the pixel interpolating process, with respect to an image signal having only a single component per pixel, a plurality of components are interpolated thereto per pixel by the above-mentioned color filter array of a single chip type. Thus, an image signal, which has the three primary color components of R, G, B, or the four complementary color components, such as Y, M, C, G, per pixel, is generated.

The image signal, outputted by image-processing unit 208 is transferred to CPU (Central Processing Unit) 211 or a main memory 209 through a bus 210, and subjected to various processes therein. CPU 211 utilizes main memory 209 as a working area to execute various software processes on the image signal. Moreover, CPU 211 activates a compression-expansion unit 216 so that, after having compressed and encoded the image signal by using JPEG (Joint Photographic Expert Group) system or motion JPEG system, the compressed data are transferred to interface unit 215, and can be stored in a storing medium such as a memory card, or outputted to an external apparatus such as a personal computer.

CPU 211 also carries out a controlling operation so that still images (frames) continuously outputted from image-processing unit 208 are displayed as motion images on LCD device 213 or EVF 206. Here, LCD device 213 is a display device with a comparatively large screen to be placed on a back face portion of digital camera 201, and EVF 206 is a color field sequential display that is attached to an eye-piece portion of digital camera 201. In the case when continuous frames, picked up by CCD image-pickup element 203, are displayed on LCD device 213, CPU 211 carries out controlling operations such that respective frames, each subjected to a resolution conversion in accordance with the resolution of LCD device 213 and outputted from image-processing unit 208, are successively transferred to display signal processing unit 212 through bus 210. Display signal processing unit 212 converts transferred frames to composite video signals, and outputs these signals to LCD device 213. Here, the composite video signals may be outputted to an external television monitor through a cable 214.

Moreover, in the case when continuous frames, picked up by CCD image-pickup element 203, are displayed on EVF 206, display signal processing unit 212 may convert digital RGB signals transferred from image processing unit 208 to signals in the YUV444 format in conformity with Recommendation BT. 601 of ITU-R (International Telecommunication Union-Radiocommunication Sector), and output as YUV data having a 24-bit length that consists of a luminance signal (Y data) and color difference signals (U data, V data). After having been converted from dot sequential data to color field sequential data in data conversion circuit 205 of the present invention, the YUV data are outputted to EVF 206, and displayed as motion images.

The data conversion circuit 205 is constituted by a data writing and reading unit 226 and an interpolating unit 225. In data writing and reading unit 226, a sampling key signal calculation unit 220 samples inputted YUV data and converts these to image data having a single component (Y component, U component or V component) per pixel, and outputs the resulting data, and as will be described later in detail, it also has a function which calculates a key signal having a value corresponding to a correlated state between a specific pixel and surrounding pixels of inputted YUV data. YUV data to be inputted to this sampling key signal calculation unit 220 have three components (Y component, U component and V component) per pixel, and are sampled so as to have a single component per pixel in a predetermined array. For this reason, in comparison with a case in which image data having N-components (N=3 or N>3) per pixel are stored, the memory capacity required for the first buffer memory 222 and the second buffer memory 223 can be reduced to 1/N, that is, a greatly reduced value; thus, it becomes possible to make the circuit scale smaller, and to reduce the production costs.

Moreover, writing control unit 221 carries out a controlling operation so that input data from sampling-key signal calculation unit 220 are alternately stored in the first buffer memory 222 and the second buffer memory 223 on a frame basis or on a field basis. Here, the field refers to an even field only consisting of even-numbered horizontal lines or an odd field only consisting of odd-numbered horizontal lines. Moreover, with respect to a period in which data are written in one of the memories of the first buffer memory 222 and the second buffer memory 223, reading control unit 224 controls in such a manner that data that have been stored in the other memory are read out on a frame basis or on a field basis, and outputted to interpolating unit 225.

Interpolating unit 225 carries out a pixel interpolating process for interpolating plurality of components per pixel on data read from reading control unit 224 based upon the above-mentioned key signal, as will be described later in detail, and outputs color field sequential data to EVF 206.

The following description will discuss preferred embodiments of data conversion circuit 205 installed in a digital camera 201 having the above-mentioned arrangement.

Eleventh Preferred Embodiment

Figure 26:
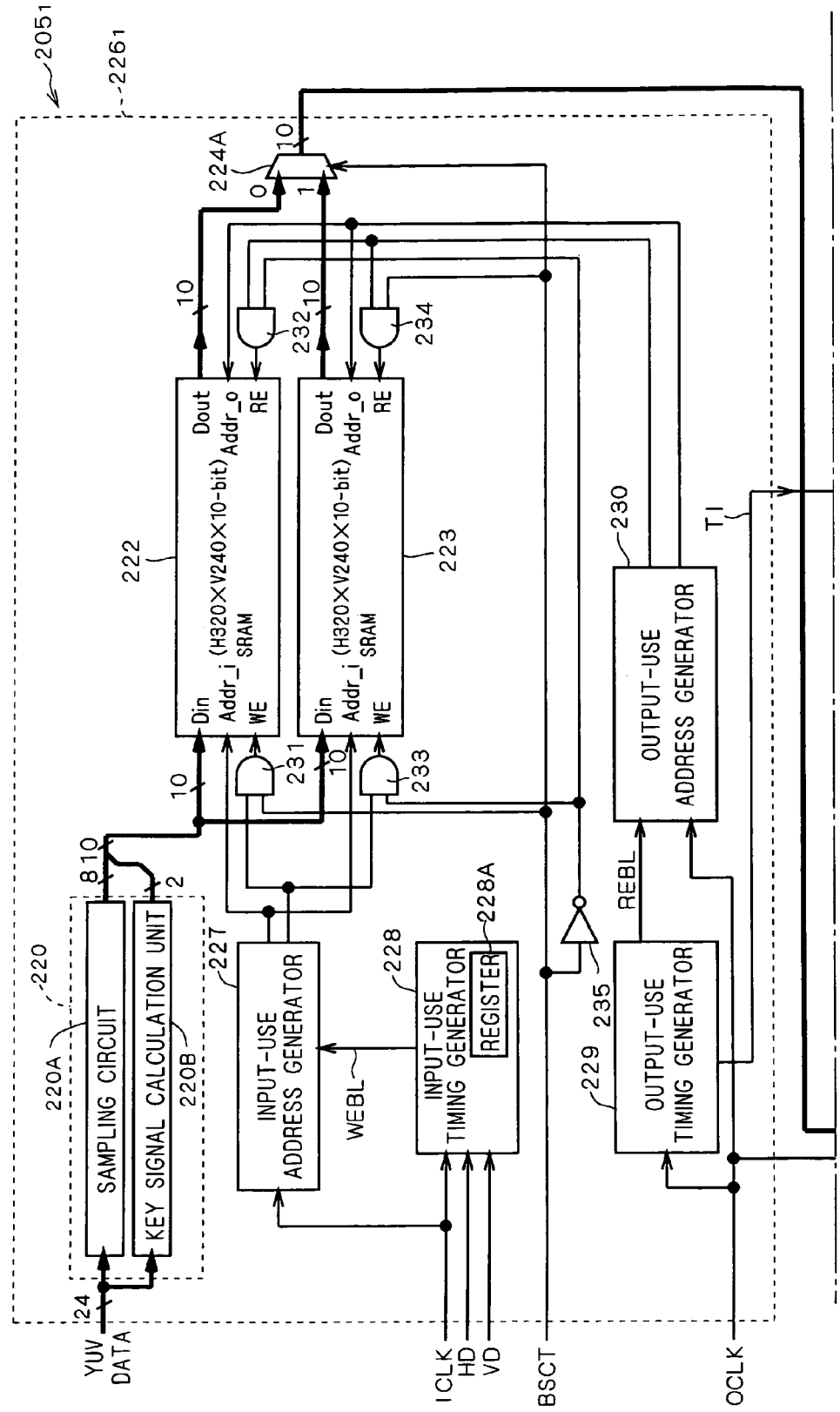
FIG. 26 is a drawing that shows a data writing and reading unit of a data conversion circuit in accordance with eleventh embodiment of the present invention.
Figure 27:
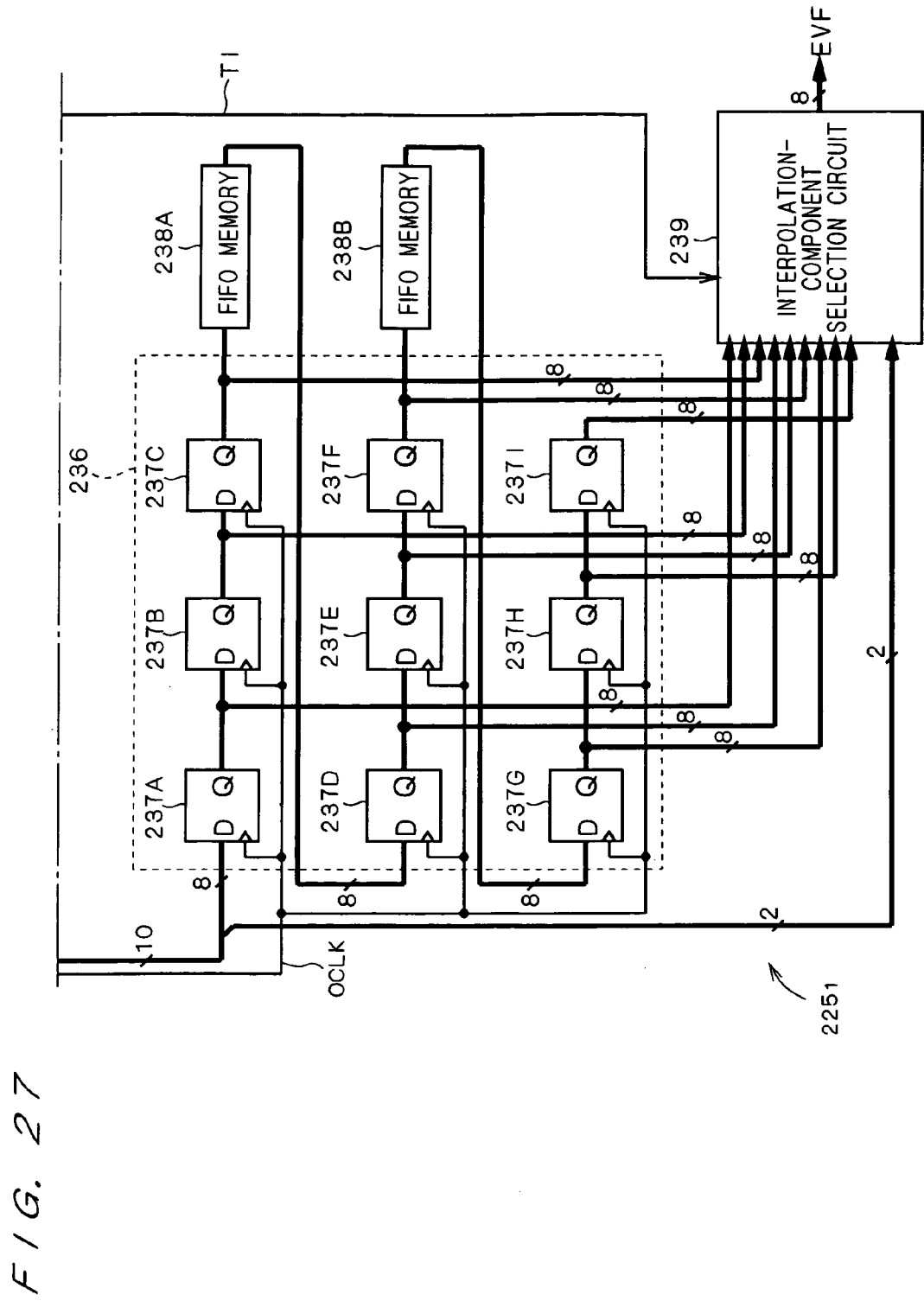
FIG. 27 is a drawing that shows an interpolating unit of a data conversion circuit in accordance with eleventh embodiment of the present invention.

FIGS. 26 and 27 show a data conversion circuit $205_1$ relating to eleventh preferred embodiment of the present invention. FIGS. 26 and 27 are continued to each other through an alternate long and short dash line in accordance with a positional relationship shown in FIG. 28. The data conversion circuit $205_1$ relating to eleventh preferred embodiment is constituted by a data writing and reading unit $226_1$ shown in FIG. 26 and an interpolating unit $225_1$ shown in FIG. 27.

A sampling-key signal calculation unit 220 of data writing and reading unit $226_1$, shown in FIG. 26, is provided with a sampling circuit 220A which converts YUV data having a 24-bit length outputted from display signal processing unit 212 into data having a single component per pixel and a key signal calculation circuit 220B which calculates a key signal having 2-bit length which will be described later on a pixel basis based upon the YUV data. FIG. 29 is an explanatory drawing that shows an arrangement 240 of data components outputted by sampling circuit 220A. Respective pixels having Y component, U component and V component are represented by appended characters "Y", "U" and "V".

Sampling circuit 220A samples the respective components in accordance with a component array 240 shown in FIG. 29. In other words, the Y component (luminance component) is sampled from every other horizontal pixel on the respective horizontal lines in a staggered arrangement, and the U component and the V component (color difference components) are sampled from every other horizontal line as well as from every other horizontal pixel, and outputted as pixel data having an 8-bit length. Pixel data having an 8-bit length outputted from sampling circuit 220A and key signals having a 2-bit length outputted from key signal calculation circuit 220B are coupled to each other to be formed as coupled data having a 10-bit length, and outputted to the first buffer memory (SRAM) 222 and the second buffer memory (SRAM) 223.

This data writing and reading unit $226_1$ is provided with a first buffer memory 222 and a second buffer memory 223 constituting two banks, and further provided with an input-use address generator 227 for generating a data-writing address signal, an input-use timing generator 228 for indicating data-writing timing to input-use address generator 227, an output-use address generator 230 for generating a data-reading address signal, and an output-use timing generator 229 for indicating data-reading timing to this output-use address generator 230.

Each of the first buffer memory 222 and the second buffer memory 223 has at least a storing capacity of 320×240 pixels (=number of horizontal pixels×number of vertical pixels)×10 bits. A portion of 320×240 pixels in this storing capacity corresponds to the number of display pixels of EVF 206. Each of these first buffer memory 222 and second buffer memory 223 is provided with write enable terminal WE and read enable terminal RE, and control signals from any of AND gates 231, 232, 233, 234 are supplied to respective enable terminals WE, RE.

Coupled data having a 10-bit length, outputted from sampling key signal calculation unit 220, are inputted to respective data input terminals Din of the first buffer memory 222 and the second buffer memory 223, and alternately stored in the respective buffer memories 222, 223 on a frame basis or on a field basis. During a period in which data are written in the first buffer memory 222 while data are read from the second buffer memory 223, the signal level of bank selection signal BSCT is switched to "H (High)" and maintained in this level. During this period, H-level signals are transmitted to an AND gate 231 for supplying a control signal to write enable terminal WE of the first buffer memory 222 and an AND gate 234 for supplying a control signal to read enable terminal RE of the second buffer memory 223. Moreover, bank selection signal BSCT of H level is level-inverted to a L (Low) level signal in an inverter 235. This L-level signal is supplied to AND gate 232 for supplying a control signal to read enable terminal RE of the first buffer memory 222 and AND gate 233 for supplying a control signal to write enable terminal WE of the second buffer memory 223. In contrast, during a period in which data are written in the second buffer memory 223 while data are read from the first buffer memory 222, the signal level of bank selection signal BSCT is switched to "L" level, and maintained at this level.

Both of input-use timing generator 228 and input-use address generator 227 are operated in synchronism with input pixel clock ICLK supplied thereto. Based upon resolution conversion coefficients α, β (α, β: values of not less than 1) stored in register 228A, input-use timing generator 228 generates a write enable pulse WEBL by using an input pixel clock ICLK, a horizontal synchronous signal HD and a vertical synchronous signal VD, and outputs this to input-use address generator 227. Here, horizontal synchronous signal HD and vertical synchronous signal VD are supplied from timing generator 207 shown in FIG. 25. Moreover, a is a coefficient used for resolution converting the image size of the corresponding YUV data to 1/α time resolution in the horizontal direction, and β is a coefficient used for resolution-converting the image size to 1/β time resolution in the vertical direction. The values of coefficients α, β are adjusted so as to have the resolution of YUA data matched to the resolution of EVF.

Moreover, input-use address generator 227 has a built-in address counter (not shown) that increments a writing address, and this address counter carries out an incrementing operation of the writing address every time the above-mentioned write enable pulse WEBL is inputted, thereby generating an address signal. Here, at the time of data writing, input-use address generator 227 supplies the generated address signal to the respective address input terminals Addr_i of the first buffer memory 222 and the second buffer memory 223, as well as supplying a write enable signal of H-level to AND gates 231, 233. AND gate 231 supplies a signal formed by carrying out a logical product on the write enable signal and bank selection signal BSCT to terminal WE of the first buffer memory 222. Moreover, AND gate 233 outputs a signal formed by carrying out a logical product on the write enable signal and an inversion signal supplied from inverter 235 to terminal WE of the second buffer memory 223.

Here, writing control unit 221 shown in FIG. 25 is constituted by the above-mentioned input-use address generator 227, input-use timing generator 228 and AND gates 231, 233.

Next, both of the output-use timing generator 229 and output-use address generator 230 are operated in synchronism with output pixel clock OCLK supplied thereto. Output-use timing generator 229 generates a read enable pulse REBL indicating the timing of data reading by using output pixel clock OCLK, and supplies the resulting pulse to output-use address generator 230.

Moreover, output-use address generator 230 has a build-in address counter (not shown) that increments a reading address, and this address counter carries out an incrementing operation of the writing address every time the read enable pulse REBL is inputted, thereby generating an address signal. Here, at the time of data reading, output-use address generator 230 supplies the generated address signal to the respective address input terminals Addr_o of the first buffer memory 222 and the second buffer memory 223, as well as supplying a read enable signal of H-level to AND gates 232, 234. One of AND gates 234 outputs a signal formed by carrying out a logical product on the read enable signal and bank selection signal BSCT to terminal RE of the second buffer memory 223, and the other AND gate 232 outputs a signal formed by carrying out a logical product on the read enable signal and an inversion signal supplied from inverter 235 to terminal RE of the first buffer memory 222.

Here, in order to increase the frame rate at the time of data reading, the frequency of output pixel clock OCLK is set higher than that of input pixel clock ICLK.

As described above, the coupled data having a 10-bit length read out from data output terminal Dout of the first buffer memory 222 are inputted to "0" side terminal of selector 224A, while the coupled data having a 10-bit length read out from data output terminal Dout of the second buffer memory 223 are inputted to "1" side terminal of selector 224A. Selector 224A selects "0" side terminal or "1" side terminal in response to "L" or "H" of the signal level of bank selection signal BSCT, the coupled data inputted through the selected terminal are outputted to interpolating unit $225_1$ shown in FIG. 27.

Here, reading control unit 224 shown in FIG. 25 is constituted by the above-mentioned output-use timing generator 229, output-use address generator 230, AND gates 232, 234 and selector 224A.

Next, an explanation will be given of interpolating unit $225_1$ shown in FIG. 27. The coupled data having a 10-bit length inputted to interpolating unit $225_1$ is separated to pixel data having an 8-bit length and a key signal of a 2-bit length. Interpolating unit $225_1$ is constituted by a register group 236 that holds pixel data of an 8-bit length in a 3×3 pixel area, an FIFO memory 238 for temporarily storing pixel data on one horizontal line, and an interpolation-component selection circuit 239.

Register group 236 has an arrangement in which nine registers, that is, 237A, 237B, 237C, 237D, 237E, 237F, 237G, 237H, 237I, are series-connected into a multiple steps through FIFO memories 238A, 238B. Each time the output pixel clock OCLK is inputted, registers 237A to 237I acquire pixel data inputted to the respective data input terminals (D), and simultaneously shift pixel data held therein from the data output terminal (Q) to the register on the next stage or FIFO memories 238A, 238B. Such a register group 236 can hold pixel data of a desired 3×3 pixel area within 1 frame or 1 field. Here, in an example shown in FIG. 27, register group 236 has 9 registers 237A to 237I; instead of this arrangement, 25 registers may be used so as to hold pixel data in a 5×5 pixel area.

Moreover, pixel data having an 8-bit length outputted from the respective data output terminals (Q) of registers 237A to 237I and a key signal having a 2-bit length are inputted to interpolation-component selection circuit 239. Interpolation-component selection circuit 239 is operated in synchronism with timing signal TI supplied from the above-mentioned output-use timing generator 229, and carries out a pixel interpolating process in accordance with the value of the key signal by using inputted pixel data in the 3×3 pixel area, and then executes a color space converting process to output three components of RGB. In the present eleventh preferred embodiment, since R field consisting of only R components, G field consisting of only G components and B field consisting of only B components are formed in the pixel interpolating process, the same pixel data from the first buffer memory 222 or the second buffer memory 223 are read out three times for each of the color fields. In this manner, interpolation-component selection circuit 239 outputs color field sequential data as shown in FIG. 46 to EVF 206.

Key-value Calculating Process and Pixel Interpolating Process

The following description will discuss the key-value calculating process in key signal calculation circuit 220B and the pixel interpolating process in interpolation-component selection circuit 239 in detail. In the above-mentioned sampling circuit 220A, data having a single component per pixel are sampled from image data having three components per pixel. Thereafter, image data having three components per pixel are restored by the pixel interpolating process by interpolation-component selection circuit 239; however, it is difficult to completely re-assemble image information that has been lost in the sampling, thereby inevitably causing degradation in the image quality. In particular, the problems with this arrangement are that a border line in the horizontal pixel direction or in the vertical pixel direction might be restored with a jagged edge and that a pattern of longitudinal stripes might be restored as a pattern of lateral stripes. In the present eleventh preferred embodiment, key signal calculation circuit 220B calculates a key signal having a value that corresponds to the correlation state of a specific pixel and surrounding pixels of image data prior to the sampling, and interpolating unit 225 individually carries out a pixel interpolating process corresponding to the value of the key signal so that it becomes possible to greatly reduce the above-mentioned problems.

EXAMPLE 1 OF KEY-VALUE CALCULATION PROCESS AND PIXEL INTERPOLATING PROCESS

In this example, key signal calculation circuit 220B is provided with a register (not shown) that temporarily stores image data of a 3×3 pixel area. FIG. 30 is an explanatory drawing that schematically shows image data 241 in the 3×3 pixel area. In FIG. 30, characters "X", "A", "B", "C", "D" and "Z" are added to the corresponding pixels respectively. In the present example, the pixel indicated by "Z" represents a specific pixel that is subjected to a sampling process and pixel data of pixels indicated by "A", "B", "C", "D" and "Z" are respectively represented by $D_A$, $D_B$, $D_C$, $D_D$ and $D_Z$.

Key signal calculation circuit 220B calculates difference values $\Delta_1$, $\Delta_2$ related to luminance components between the specific pixel and the surrounding pixels in accordance with the following equations (1) and (2):

[Equation 1]

$$\Delta_1 = ABS(D_Z - (D_A + D_D)/2) \quad (1)$$

$$\Delta_2 = ABS(D_Z - (D_B + D_C)/2) \quad (2)$$

In the above-mentioned equations (1) and (2), ABS(x) is a symbol used for finding the absolute value of a numerical value x. Difference value $\Delta_1$ shows the correlation state between the specific pixel and the surrounding pixels in the vertical direction, and difference value $\Delta_2$ shows the correlation state between the specific pixel and the surrounding pixels in the horizontal direction. In the present example, it is assumed that the smaller the difference values $\Delta_1$ and $\Delta_2$, the higher the correlation becomes. Moreover, when sampling circuit 220A samples the single component in accordance with the component array 240 shown in FIG. 29, U component or V component is sampled with respect to the specific pixel, while Y component is sampled in the surrounding pixels that are adjacent to the corresponding specific pixel in the vertical and horizontal directions. Therefore, key signal calculation circuit 220B calculates difference values $\Delta_1$ and $\Delta_2$, with respect to Y component when U component or V component has been sampled in the specific pixel.

Next, key signal calculation circuit 220B determines the inequality between the two difference values $\Delta_1$ and $\Delta_2$, and when it has been determined that the value of $\Delta_1$ is not more than $\Delta_2$ ($\Delta_1 \leq \Delta_2$), it outputs a key signal having a value of "0"; in contrast, when it has been determined that the value of $\Delta_1$ exceeds $\Delta_2$ ($\Delta_1 > \Delta_2$), it outputs a key signal having a value of "1". Therefore, in the present preferred embodiment, only the lower 1 bit of the key signal having a 2-bit length is used.

Here, interpolation-component selection circuit 239 regards pixel data outputted from the center register 237E of register group 236 shown in FIG. 27 as data of the specific pixel, while regarding pixel data outputted from registers 237B, 237D, 237F and 237H as data of the surrounding pixels, and carries out a pixel interpolating process thereon. In the case when the value of a key signal corresponding to the specific pixel is "0", interpolation-component selection circuit 239 regards the average value of data of the surrounding pixels that are adjacent in the vertical direction as interpolating data, and in the case when the value of the key signal is "1", it regards the average value of data of the surrounding pixels that are adjacent in the horizontal direction as interpolating data; thus, it carries out the corresponding calculations.

In this manner, in the present example, information of the correlation state between the specific pixel and the surrounding pixels of image data prior to the sampling is included in the key signal, and the pixel interpolating process corresponding to the value of the key signal is individually carried out so that it is possible to generate and output color field sequential data that are less susceptible to degradation in the image quality due to the sampling.

EXAMPLE 2 OF KEY-VALUE CALCULATION PROCESS AND PIXEL INTERPOLATING PROCESS

In the same manner as the above-mentioned case, key signal calculation circuit 220B is provided with a register (not shown) that temporarily stores image data 241 of a 3×3 pixel area shown in FIG. 30. Key signal calculation circuit 220B calculates difference values $\Delta_U$, $\Delta_D$, $\Delta_R$, $\Delta_L$ related to luminance components between the specific pixel to be thinned and the surrounding pixels in accordance with the following equations (3) to (6). Here, in the following equations (3) to (6), $V_K$ represents the value of key signal corresponding to each equation.

[Equation 2]

$$V_K=0: \Delta_U=ABS(D_Z-D_A) \quad (3)$$

$$V_K=1: \Delta_D=ABS(D_Z-D_D) \quad (4)$$

$$V_K=2: \Delta_R=ABS(D_Z-D_C) \quad (5)$$

$$V_K=3: \Delta_L=ABS(D_Z-D_B) \quad (6)$$

In the above-mentioned equations (3) to (6), difference values $\Delta_U$, $\Delta_D$ show the correlation state between the specific pixel and the surrounding pixels that are adjacent to the specific pixel on both of the sides in the vertical direction, and difference value $\Delta_R$, $\Delta_L$ show the correlation state between the specific pixel and the surrounding pixels located on both of the right and left sides in the horizontal direction. In the present example, it is assumed that the smaller the difference value, the higher the correlation state becomes.

Next, key signal calculation circuit 220B selects the difference value that has the minimum value among the difference values $\Delta_U$, $\Delta_D$, $\Delta_R$, $\Delta_L$. The value of the key signal is set to "0" in the case of selection of the difference value $\Delta_U$, to "1" in the case of selection of the difference value $\Delta_D$, to "2" in the case of selection of the difference value $\Delta_R$, and to "3" in the case of selection of the difference value $\Delta_L$.

Moreover, in the same manner as the above-mentioned example 1, interpolation-component selection circuit 239 regards pixel data outputted from the center register 237E of register group 236 shown in FIG. 27 as the data of the specific pixel, and also regards pixel data outputted from registers 237B, 237D, 237F, 237H as data of the surrounding pixel; thus, it carries out the pixel interpolating process. In the case of the value of key signal of "0", interpolation-component selection circuit 239 uses pixel data outputted from register 237B that is adjacent above register 237E in the vertical direction as the interpolating data, in the case of the value of key signal of "1", it uses pixel data outputted from register 237H that is adjacent below it in the vertical direction as the interpolating data, in the case of the value of key signal of "2", it uses pixel data outputted from register 237F that is adjacent on the right side in the horizontal direction as the interpolating data, and in the case of the value of key signal of "3", it uses pixel data outputted from register 237D that is adjacent on the left side in the horizontal direction as the interpolating data. In this manner, in the present example also, it is possible to generate and output color field sequential data that are less susceptible to degradation in the image quality due to the sampling.

EXAMPLE 3 OF KEY-VALUE CALCULATION PROCESS AND PIXEL INTERPOLATING PROCESS

In the same manner as the above-mentioned examples 1 and 2, key signal calculation circuit 220B is provided with a register (not shown) that temporarily stores image data 241 of a 3×3 pixel area shown in FIG. 30. Moreover, in the present example, since a key signal having 3-bits is outputted as will be described later, coupled data having an 11-bit length formed by combining an image signal having an 8-bit length outputted from sampling circuit 220A with a signal having a 3-bit length outputted from key signal calculation circuit 220B are outputted. Moreover, the first buffer memory 222 and the second buffer memory 223 respectively have storing capacities that store coupled data having an 11-bit length.

Figure 34:
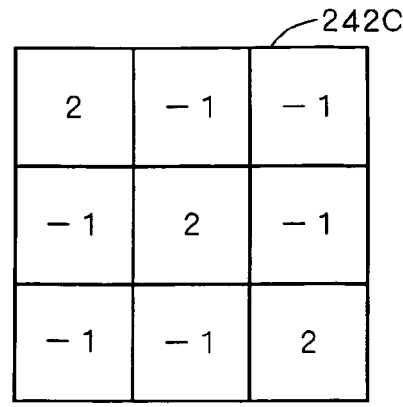
FIG. 34 is a drawing that shows an example of space filter having a coefficient value used for detecting diagonal lines slanting to the right.
Figure 35:
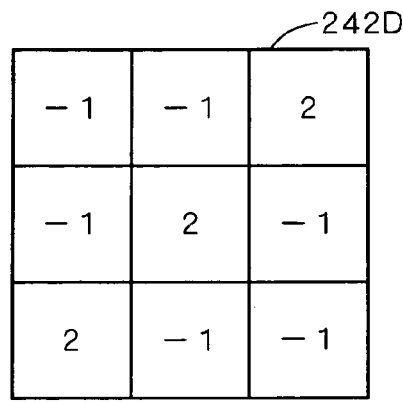
FIG. 35 is a drawing that shows an example of space filter having a coefficient value used for detecting diagonal lines slanting to the left.
Figure 36:
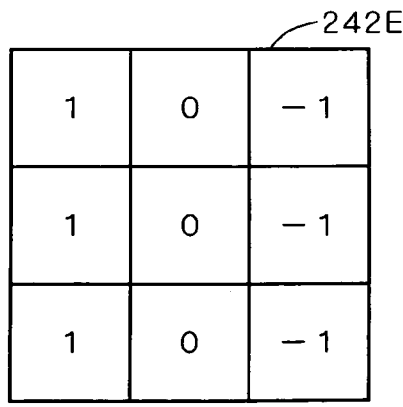
FIG. 36 is a drawing that shows an example of space filter having a coefficient value used for detecting vertical edges.
Figure 40:
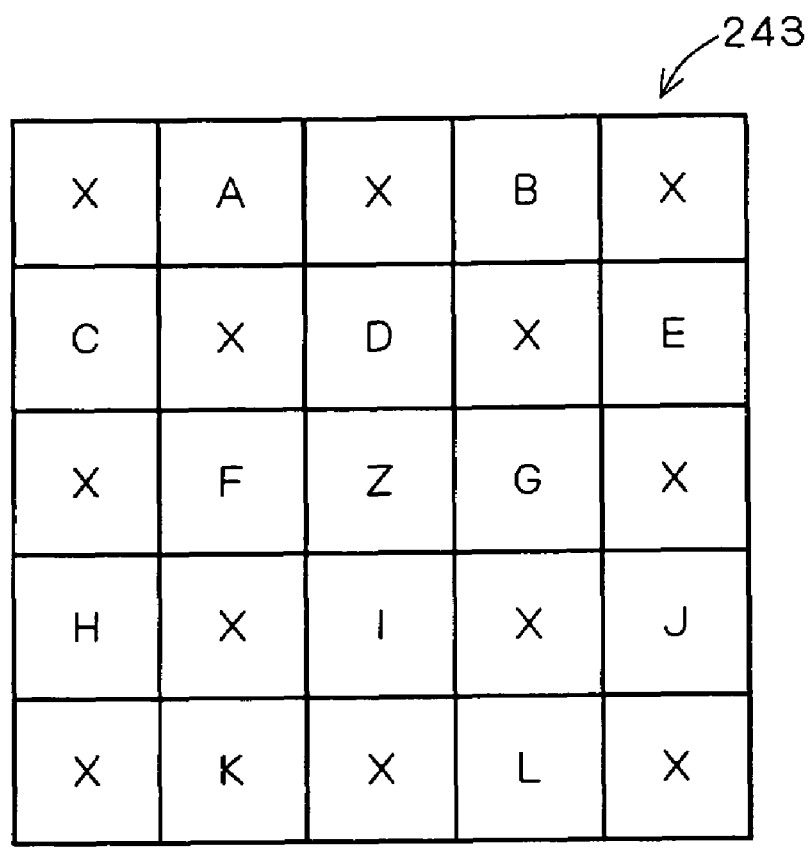
FIG. 40 is a drawing that schematically shows pixel data having 5×5 pixel area.

Key signal calculation circuit 220B carries out a space filtering process on luminance components of inputted image data (YUV data). For this reason, key signal calculation circuit 220B is provided with space filters having 3×3 pixels that respectively detect a longitudinal line in the vertical pixel direction, a lateral line in the horizontal pixel direction and a diagonal line in the diagonal direction, a border line (longitudinal edge) in the vertical pixel direction, a border line (lateral edge) in the horizontal pixel direction and a border line (diagonal edge) in the diagonal direction with respect to luminance components. As shown in FIG. 31, space filter (weighting mask) 242 has coefficient values A (i, j)(i,j are integers of 0 to 2) that have one-to-one correspondence to the respective pixel data in the 3×3 pixel area, and has a function for carrying out product-sum operations in which weighting processes (multiplication) are carried out on the pixel data corresponding to the respective coefficient values A (i, j) and the resulting values are added. FIGS. 32 to 39 are drawings that exemplify various space filters. FIG. 32 shows a space filter 242A that has a coefficient value for detecting longitudinal line, FIG. 33 shows a space filter 242B that has a coefficient value for detecting lateral line, FIG. 34 shows a space filter 242C that has a coefficient value for detecting diagonal line slanting to the right, FIG. 35 shows a space filter 242D that has a coefficient value for detecting diagonal line slanting to the left, FIG. 36 shows a space filter 242E that has a coefficient value for detecting longitudinal edge, FIG. 37 shows a space filter 242F that has a coefficient value for detecting lateral edge, FIG. 38 shows a space filter 242G that has a coefficient value for detecting diagonal edge slanting to the right, and FIG. 39 shows a space filter 242H that has a coefficient value for detecting diagonal edge slanting to the left.

Moreover, it is determined whether or not the absolute value of the product-sum outputted from each of these space filters 242A to 242H exceeds a predetermined threshold value. When the absolute value exceeds the threshold value, a key signal having a predetermined value is outputted. In the present example, the value of the key signal is set to "0" when space filter 242A (FIG. 32) detects a longitudinal line, to "1" when space filter 242B (FIG. 33) detects a lateral line, to "2" when space filter 242C (FIG. 34) detects a diagonal line slanting to the right, to "3" when space filter 242D (FIG. 35) detects a diagonal line slanting to the left, to "4" when space filter 242E (FIG. 36) detects a longitudinal edge, to "5" when space filter 242F (FIG. 37) detects a lateral edge, to "6" when space filter 242G (FIG. 38) detects a diagonal edge slanting to the right, and to "7" when space filter 242H (FIG. 39) detects a diagonal edge.

Here, instead of having a register group 236 holding pixel data of 3×3 pixels as shown in FIG. 27, it is necessary for interpolating unit 225 to have a register group holding pixel data of 5×5 pixels. FIG. 39 is a drawing that schematically shows image data 243 having a 5×5 pixel area that are held in the register group provided in interpolating unit 225. In FIG. 39, characters, "X", "A", "B", "C", "D", "E", "F", "G", "H", "I", "J", "K", "L", are added to the corresponding pixels. A pixel having character "Z" is a specific pixel that is to be pixel interpolated. Here, pixel data of the respective pixels having "A" to "L" are respectively represented by $ID_A$ to $ID_L$.

The coupled data having an 11-bit length to be inputted to interpolating unit 225 are separated to pixel data of an 8-bit length and a key signal of a 3-bit length. Interpolation-component selection circuit 239 outputs interpolating data $D_Z$ in accordance with each of the following equations (7) to (14), in response to each of the values of inputted key signals of a 3-bit length "0" to "7". In the following equations (7) to (14), $V_K$ represents the value of a key signal corresponding to each of the equations.

[Equation 3]

$$V_K=0: ID_Z=(ID_D+ID_I)/2 \qquad (7)$$

$$V_K=1: ID_Z=(ID_F+ID_G)/2 \qquad (8)$$

$$V_K=2: ID_Z=(ID_C+ID_A+ID_L+ID_J)/4 \qquad (9)$$

$$V_K=3: ID_Z=(ID_B+ID_E+ID_H+ID_K)/4 \qquad (10)$$

$$V_K=4: ID_Z=\text{Median}(ID_D+ID_F+ID_G+ID_I) \qquad (11)$$

$$V_K=5: ID_Z=\text{Median}(ID_D+ID_F+ID_G+ID_I) \qquad (12)$$

$$V_K=6: ID_Z=(ID_D+ID_F+ID_G+ID_I)/4 \qquad (13)$$

$$V_K=7: ID_Z=(ID_D+ID_F+ID_G+ID_I)/4 \qquad (14)$$

Here, functions, Median ($X_1$, $X_2$, $X_3$, $X_4$), in the above-mentioned equations (11), (12) calculate a numeric value that comes in the center (central value) when arguments $X_1$ to $X_4$ are re-arranged in the ascending order. In other words, the number of numeric values smaller than the central value is set equal to the number of numeric values greater than the central value in the numeric values $X_1$ to $X_4$. For example, Median (1, 2, 3, 4)=2.5 holds.

In this manner, in the present example, the characteristic such as a longitudinal line and a slanting line that appears in image data prior to the sampling is detected as a correlation state, and the value of the key signal is set in accordance with each characteristic so that, at the time of an interpolating process, it is possible to accurately restore the characteristic of image data prior to the sampling, and consequently to generate and output color field sequential data that are less susceptible to degradation in the image quality.

EXAMPLE 4 OF KEY-VALUE CALCULATION PROCESS AND PIXEL INTERPOLATING PROCESS

In the same manner as the above-mentioned example 3, key signal calculation circuit 220B is provided with a register (not shown) that temporarily stores image data 241 of a 3×3 pixel area shown in FIG. 30, and outputs a key signal of a 3-bit length. Therefore, coupled data having an 11-bit length, formed by coupling an image signal of an 8-bit length outputted from sampling circuit 220A with the key signal of a 3-bit length outputted from key signal calculation circuit 220B, are outputted. Moreover, the first buffer memory 222 and the second buffer memory 223 respectively have storing capacities that store coupled data having an 11-bit length.

Key signal calculation circuit 220B calculates the average data, $<V>$, $<H>$, $<O_1>$, $<O_2>$, $<O_3>$, $<O_4>$, $<O_5>$, relating to luminance components of surrounding pixels of a specific pixel to be subject to culling, in accordance with the following equations (15) to (21). Moreover, in the following equations, the value of key signal $V_K$ corresponding to each of the equations is shown.

[Equation 4]

$$V_K=0: <V>=(D_A+D_D)/2 \qquad (15)$$

$$V_K=1: <H>=(D_B+D_C)/2 \qquad (16)$$

$$V_K=2: <O_1>=(D_A+D_B)/2 \qquad (17)$$

$$V_K=3: <O_2>=(D_B+D_D)/2 \qquad (18)$$

$$V_K=4: <O_3>=(D_D+D_C)/2 \qquad (19)$$

$$V_K=5: <O_4>=(D_C+D_A)/2 \qquad (20)$$

$$V_K=6: <O_5>=(D_A+D_B+D_C+D_D)/4 \qquad (21)$$

Key signal calculation circuit 220B selects the average data that has a value closest to pixel data $D_Z$ of the specific pixel among those average data, and outputs the key signal having a value $V_K$ corresponding to the selected average data.

Here, interpolating unit 225 is provided with a register group for holding image data 243 having a 3×3 pixel area shown in FIG. 30. Interpolation-component selection circuit 239 of this interpolating unit 225 calculates interpolating data $ID_Z$ in accordance with the following equations (22) to (28) in response to the values "0" to "6" of the inputted key signal having a 3-bit length.

[Equation 5]

$$V_K=0: ID_Z=(ID_A+ID_D)/2 \qquad (22)$$

$$V_K=1: ID_Z=(ID_B+ID_C)/2 \qquad (23)$$

$$V_K=2: ID_Z=(ID_A+ID_B)/2 \qquad (24)$$

$$V_K=3: ID_Z=(ID_B+ID_D)/2 \qquad (25)$$

$$V_K=4: ID_Z=(ID_D+ID_C)/2 \qquad (26)$$

$$V_K=5: ID_Z=(ID_C+ID_A)/2 \qquad (27)$$

$$V_K=6: ID_Z=(ID_A+ID_B+ID_C+ID_D)/4 \qquad (28)$$

EXAMPLE 5 OF KEY-VALUE CALCULATION PROCESS AND PIXEL INTERPOLATING PROCESS

In the same manner as the above-mentioned examples 4, 5, key signal calculation circuit 220B is provided with a register (not shown) that temporarily stores image data 241 of a 3×3 pixel area shown in FIG. 30, and outputs a key signal of a 3-bit length. Therefore, the first buffer memory 222 and the second buffer memory 223 respectively have storing capacities that store coupled data having an 11-bit length.

Key signal calculation circuit 220B first calculates the difference value $D_Y$ between the specific pixel and the average value of the surrounding pixels, in accordance with the following equation (29), and stores the resulting value in a register (not shown) of 9-bits.

[Equation 6]

$$D_Y = D_Z - (D_A + D_B + D_C + D_D)/4 \quad (29)$$

Next, the reproducing range of the difference value $D_Y$ is limited to a range of not less than −16 to not more than 15. In other words, when the difference value $D_Y$ exceeds 12 ($D_Y > 12$), the difference value $D_Y$ is set to 12 and the bit length is shortened to 5 bits. When the difference value $D_Y$ is less than −16 ($D_Y < -16$), the difference value $D_Y$ is set to −16 and the bit length is shortened to 5 bits. Moreover, when the difference value $D_Y$ is not less than −16 and also not more 15 ($-16 \leq D_Y \leq 15$), the bit length of the difference value $D_Y$ is shortened to 5 bits. And the difference value $D_Y$ of 5 bits is then compressed down to 3-bits using a 2-bit shift to the right and then stored as the key signal $V_R$ of complement notation of 2. The following table shows the difference value $D_Y$ in decimal notation, the value $V_K$ of key signal in decimal notation, and the complement notation of 2 of the value $V_K$ of the key signal.

TABLE 1

| Difference value $D_Y$ | Value of key signal $V_K$ (Decimal number) | Complement notation of 2 of $V_K$ (Binary number: 3 bits) |
|---|---|---|
| +12 to +255 | +3 | 011 |
| +8 to +11 | +2 | 010 |
| +4 to +7 | +1 | 001 |
| 0 to +3, −1 to −3 | 0 | 000 |
| −4 to −7 | −1 | 111 |
| −8 to −11 | −2 | 110 |
| −12 to −15 | −3 | 101 |
| −16 to −256 | −4 | 100 |

In this manner, as shown in Table 1, after having calculated the difference value $D_Y$ on a pixel basis with respect to luminance components, key signal calculation circuit 220B calculates and outputs a key signal having a value $V_K$ of 3-bits corresponding to the numeric value range of the difference value $D_Y$.

Here, in the same manner as the above-mentioned example 4, interpolating unit 225 is provided with a register group holding image data 243 having a 3×3 pixel area. Since a key signal of 3-bit length is inputted to interpolation-component selection circuit 239 of this interpolating unit 225, interpolation-component selection circuit 239 expands the key signal to a 5-bit value by shifting it to the left by 2 bits, and then expands this to an 8-bit value $V_K'$ of complement notation of 2. For example, when the value $V_K$ of the key signal is "011" in binary notation ("+3" in decimal notation), the 5-bit value obtained by shifting the key signal to the left by 2 bits is "01100" in binary notation, and an 8-bit value $V_K'$ obtained by further bit-expanding this 5-bit value is "00001100" in binary notation. Moreover, when the value $V_K$ of the key signal is "110" in binary notation ("−2" in decimal notation), the 5-bit value obtained by shifting the key signal to the left by 2 bits is "11000" in binary notation, and an 8-bit value $V_K'$ obtained by further bit-expanding this 5-bit value is "11111000" in binary notation.

Interpolation-component selection circuit 239 uses such an 8-bit value $V_K'$ and the pixel data stored in the register group so as to calculate interpolation data $ID_Z$ for each luminance component in accordance with the following equation (30).

[Equation 7]

$$ID_Z = (ID_A + ID_B + ID_C + ID_D)/4 + D_Y' \quad (30)$$

The above-mentioned equation (30) makes it possible to reproduce pixel data prior to the sampling with high precision.

The above-description has discussed examples 1 to 5 of the key-value calculation process and pixel interpolating process. In the above-mentioned examples 1 to 5, the calculation method of the key signal and interpolating data has been explained only about luminance components (Y data); however, with respect to color-difference components (U data, V data), known pixel interpolating methods may be adopted. Moreover, in the above-mentioned examples 4 and 5, the key signal of 3-bits has been used; however, key signals having not less than 4-bits may be used.

Twelfth Preferred Embodiment

Figure 41:
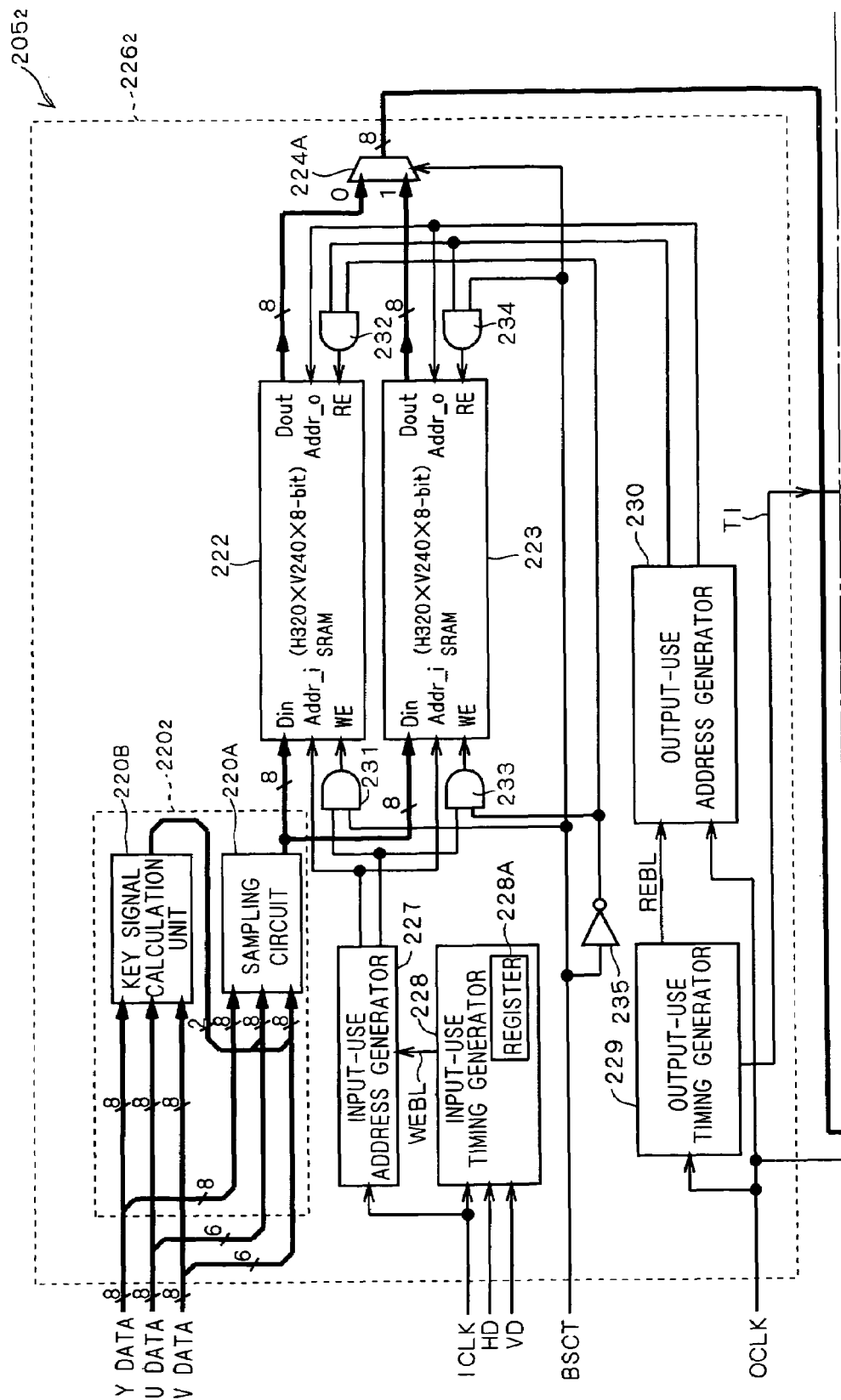
FIG. 41 is a drawing that shows a data writing and reading unit of a data conversion circuit in accordance with twelfth preferred embodiment of the present invention.
Figure 42:
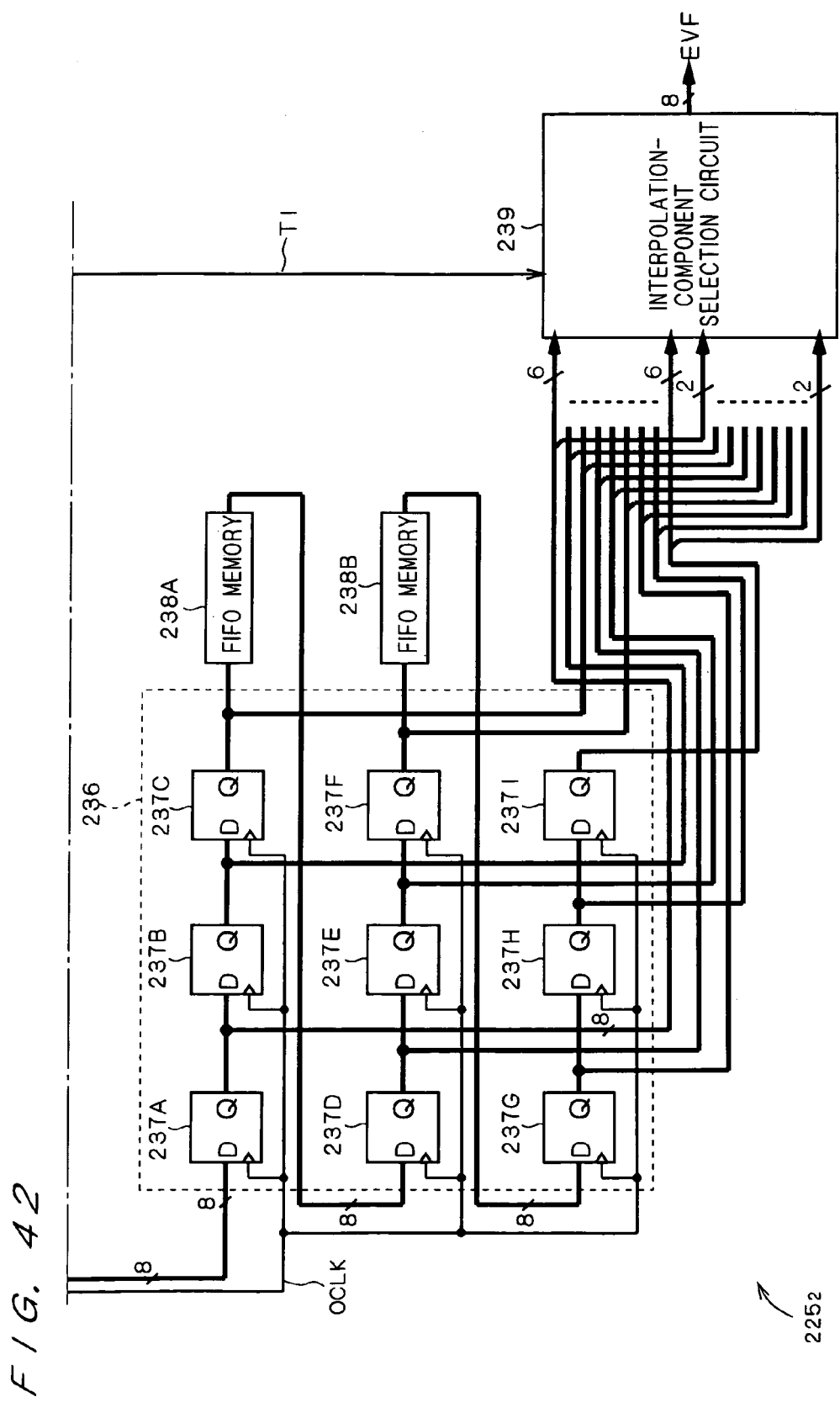
FIG. 42 is a drawing that shows an interpolating unit of a data conversion circuit in accordance with twelfth preferred embodiment of the present invention.
Figure 43:
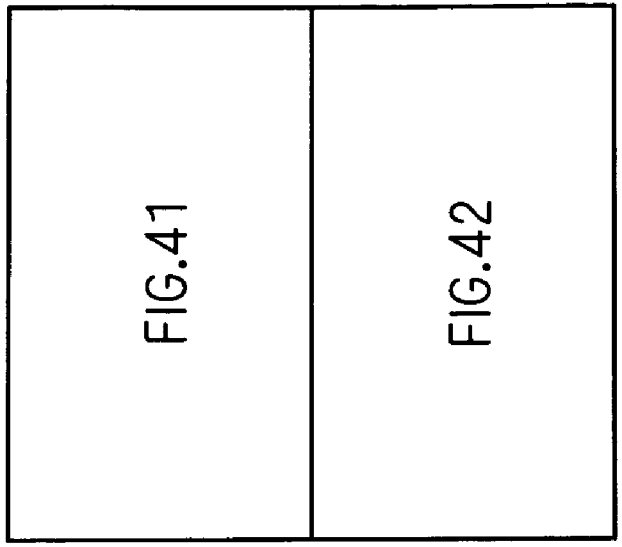
FIG. 43 is a drawing that shows a mutual positional relationship between FIG. 41 and FIG. 42.

Next, an explanation will be given of twelfth preferred embodiment of the present invention. FIGS. 41 and 42 show data conversion circuit 205₂ relating to twelfth preferred embodiment of the present invention. FIG. 41 and FIG. 42 are continued to each other through an alternate long and short dash line shown in FIG. 43. Data conversion circuit 205₂ relating to the present twelfth preferred embodiment is constituted by a data writing and reading unit 226₂ shown in FIG. 41 and an interpolating unit 225₂ shown in FIG. 42. Here, in FIG. 41 and FIG. 42, on the assumption that circuits indicated by the same reference numerals as those shown in FIGS. 26 and 27 have the same constructions and functions, the detailed explanation thereof is omitted.

In the same manner as the above-mentioned eleventh preferred embodiment, a sampling-key signal calculation unit 220₂ of data writing and reading unit 226₂ is provided with a key signal calculation circuit 220B for calculating a key signal and a sampling circuit 220A which converts inputted data to data having a single component per pixel. In the present twelfth preferred embodiment, to sampling circuit 220A are inputted Y data of 8-bits, data of 8-bits formed by combining the upper 6-bits of U data of 8-bits with the key signal and data of 8-bits formed by combining the upper 6-bits of V data and the key signal.

Here, instead of outputting the key signal of 2-bits, key signal calculation circuit 220B may output a key signal of 3-bits. In this case, 2-bits of the key signal of 3-bits are combined with the upper bits of color difference components (U data or V data), and the rest 1 bit of the key signal is combined with the upper bit of luminance components (Y data). In other words, the 2 bits of 3 bits of the key signal are stored in some bits of the color difference components, and the rest 1 bit of the key signal is stored in one bit of luminance components. Here, it is necessary to provide an arrangement in which sampling circuit 220A samples combined data of respective color components of 8-bits containing the key signal and outputs the resulting data and the first buffer memory 222 and the second buffer memory 223 store the combined data of 8-bits.

Moreover, each of the first buffer memory 222 and the second buffer memory 223 has a storing capacity for storing combined data of 320×240×8 bits. The other constructions and functions of data writing and reading unit $226_2$ is substantially the same as those in the above-mentioned eleventh preferred embodiment.

Here, interpolating unit $225_2$ shown in FIG. 42 is provided with a register group 236 for storing combined data of 8 bits in a 3×3 pixel area, FIFO memories 238A, 238B and an interpolation-component selection circuit 239. Combined data of an 8-bit length outputted from register group 236 are separated to pixel data of a 6-bit length and a key signal of a 2-bit length, and inputted to interpolation-component selection circuit 239. In almost the same manner as the above-mentioned eleventh preferred embodiment, interpolation-component selection circuit 239 individually carries out a pixel interpolating process in response to the value $V_K$ of the key signal, and outputs color field sequential data of an 8-bit length to EVF 206.

In this manner, sampling-key signal calculation unit $220_2$ of the present twelfth preferred embodiment allows the key signal to be included in the lower 2-bits of color difference components (U data, V data) that give less influence to the human visual sensitivity so that it becomes possible to reduce the storing capacity of combined data to be stored in the first buffer memory 222 and the second buffer memory 223. Consequently, it is possible to save the memory capacity, and to make the circuit scale smaller; thus, it becomes possible to achieve an inexpensive data conversion circuit with low power consumption.

The above description has discussed eleventh and twelfth preferred embodiments of the present invention. The data conversion circuit relating to the above-mentioned eleventh and twelfth preferred embodiments is applied to EVF 206 of a digital camera; however, the data conversion circuit of the present invention is not intended to be limited to the application to digital cameras, and can be applied to various interfaces, etc. that require conversion from dot sequential data to color field sequential data and frame rate conversion.

And the data conversion circuit relating to the above-mentioned eleventh and twelfth preferred embodiments can be applied to the above-mentioned first to tenth preferred embodiments. For example, it is possible to substitute the data conversion circuit 205 relating to the eleventh and twelfth preferred embodiments for the data conversion circuit 105 shown in FIG. 8. In this case, at a stage prior to the sampling key signal calculation unit 220, the data conversion circuit 205 needs to be provided with a pixel interpolating circuit for carrying out a pixel interpolating process on RAW image data outputted from the A/D conversion circuit 104, and a color-space conversion circuit for converting input data from RGB color-space to YUV color-space. This allows high-quality interpolated data to be supplied to EVF.

While the invention has been described in detail, the foregoing description is in all aspects illustrative and not restrictive. It is understood that numerous other modifications and variations can be devised without departing from the scope of the invention.

What is claimed is:

1. An image conversion device, which converts image data from dot sequential data to color field sequential data, comprising:

an image storing unit which has a first buffer area for storing either one of odd and even fields and a second buffer area for storing the other field of said odd and even fields, said odd fields consisting of odd-numbered lines of said dot sequential data, said even fields consisting of even-numbered lines of said dot sequential data;

a data transfer control circuit which carries out such controlling operations that, during a period in which said dot sequential data are written in one of said first and second buffer areas, pixel data of said even field or said odd field stored in the other buffer area are read out in a color field sequential format;

an over-sampling circuit for over-sampling color field sequential data read from said image storing unit; and a second color space conversion circuit for carrying out color-space conversion on color field sequential data outputted from said over-sampling circuit.

2. The image conversion device of claim 1, further comprising:

a color-space conversion circuit for color-space converting said dot sequential data; and a sub-sampling circuit for sub-sampling dot sequential data outputted from said color-space conversion circuit to output the resulting data to said image storing unit.

3. An image conversion method, which converts image data from dot sequential data to color field sequential data, comprising the steps of:

(a) alternately storing an odd field consisting of odd numbered lines of said dot sequential data and an even field consisting of even numbered lines of said dot sequential data respectively in first and second buffer areas; and (b) during a period in which said odd field or said even field is written in one of said buffer areas in said process (a), reading pixel data of said even field or said odd field stored in the other buffer area in a color field sequential format; and (c) generating and outputting pixel interpolating data formed by carrying out an interpolating process on color field sequential data read from said buffer area in said step (b), wherein said step (c) comprises the step of:

(c-1) over-sampling the image data read from said buffer area to color-space convert the resulting data.

4. The An image conversion method of claim 3, wherein said step (a) comprises color-space converting said dot sequential data to sub-sample and store the resulting data in said buffer areas.

5. An image conversion device, which converts image data from dot sequential data to color field sequential data, comprising:

an image storing unit which has a first buffer area for storing either one of odd and even fields and a second buffer area for storing the other field of said odd and even fields, said odd field consisting of odd-numbered lines of said dot sequential data, said even field consisting of even-numbered lines of said dot sequential data; and a data transfer control circuit which carries out such controlling operations that, during a period in which said dot sequential data are written in one of said first and second buffer areas, pixel data of said even field or said odd field stored in the other buffer area are read out in a color field sequential format;

an intra-frame determining circuit which makes a determination as to whether or not dot sequential data to be inputted to said image storing unit are coincident with dot sequential data stored in said image storing unit on a frame basis; and an operation mode control circuit which controls said data transfer control circuit based upon the results of determination of said intra-frame determination circuit, wherein under control of said operation mode control circuit, when said intra-frame determining circuit has made a determination as non-coincidence, said data transfer control circuit proceeds to a motion image display mode to carry out such a controlling operation that, during a period in which said odd field or said even field is written in one of said first and second buffer areas, said even field or said odd field stored in the other buffer area is read out in a color field sequential format, and when said intra-frame determining circuit has made a determination as coincidence, said data transfer control circuit proceeds to a still image display mode to carry out such a controlling operation that said even field and said odd field stored in said first and second buffer areas are read out in a color field sequential format on a frame basis.

6. An image conversion method, which converts image data from dot sequential data to color field sequential data, comprising the steps of:

(a) alternately storing an odd field consisting of odd numbered lines of said dot sequential data and an even field consisting of even numbered lines of said dot sequential data respectively in first and second buffer areas; and (b) during a period in which said odd field or said even field is written in one of said buffer areas in said process (a), reading pixel data of said even field or said odd field stored in the other buffer area in a color field sequential format, wherein said step (a) further comprises the steps of:

(a-2) making a determination as to whether or not said dot sequential data to be inputted are coincident with dot sequential data stored in said buffer area on a frame basis;

(a-3) upon determination as non-coincidence at said step (a-2), proceeding to a motion image display mode for executing said step (b); and (a-4) upon determination as coincidence at said step (a-2), proceeding to a still image display mode in which said even field and said odd field stored in said first and second buffer areas are read out in color field sequential format on a frame basis.

* * * * *